United States Patent
Campbell et al.

(10) Patent No.: US 8,429,234 B2
(45) Date of Patent: Apr. 23, 2013

(54) METHODS AND SYSTEMS FOR PROVIDING AN ELECTRONIC ACCOUNT TO A CUSTOMER

(75) Inventors: Leo J. Campbell, Arlington, VA (US); Jon L. Cook, Alexandria, VA (US); Wayne H. Orbke, Germantown, TN (US); Christine Ray, Washington, DC (US); Cathy M. Rogerson, Annandale, VA (US)

(73) Assignee: United States Postal Service, Washington, DC (US)

( * ) Notice: Subject to any disclaimer, the term of this patent is extended or adjusted under 35 U.S.C. 154(b) by 127 days.

(21) Appl. No.: 12/155,912

(22) Filed: Jun. 11, 2008

(65) Prior Publication Data

US 2008/0320092 A1     Dec. 25, 2008

Related U.S. Application Data

(62) Division of application No. 09/809,581, filed on Mar. 16, 2001.

(60) Provisional application No. 60/189,983, filed on Mar. 17, 2000.

(51) Int. Cl.
*G06F 15/16*     (2006.01)

(52) U.S. Cl.
USPC ............ 709/206; 709/203; 709/220; 709/224

(58) Field of Classification Search .................. 709/206, 709/220, 224, 228; 705/26, 35
See application file for complete search history.

(56) References Cited

U.S. PATENT DOCUMENTS

| | | | |
|---|---|---|---|
| 4,135,662 A | 1/1979 | Dlugos | |
| 4,309,569 A | 1/1982 | Merkle | |
| 4,574,352 A | 3/1986 | Coppola et al. | |
| 4,725,718 A | 2/1988 | Sansone et al. | |
| 4,727,368 A | 2/1988 | Larson et al. | |
| 5,043,908 A | 8/1991 | Manduley et al. | |
| 5,136,646 A | 8/1992 | Haber et al. | |
| 5,136,647 A | 8/1992 | Haber et al. | |
| 5,146,561 A * | 9/1992 | Carey et al. ................... | 709/200 |

(Continued)

FOREIGN PATENT DOCUMENTS

| | | |
|---|---|---|
| EP | 0 516 898 A1 | 12/1992 |
| JP | 10-124488 | 5/1988 |

(Continued)

OTHER PUBLICATIONS

Co-Pending U.S. Appl. No. 09/675,677; Title: Systems and Methods for Authenticating an Electronic Message, filed Sep. 29, 2000.

(Continued)

*Primary Examiner* — Khanh Dinh
(74) *Attorney, Agent, or Firm* — Finnegan, Henderson, Farabow, Garrett & Dunner LLP

(57) ABSTRACT

An electronic account is provided to a customer to enable the customer to access electronic services, such as e-mail and electronic transactions. The electronic account links an electronic address of the customer to a physical address of the customer. Using the electronic account, electronic services can be provided to the customer at either the electronic or physical address, or both. The services can be both secure and non-secure and can be provided by any service provider, such as an online merchant, a government agency, or a bank.

58 Claims, 64 Drawing Sheets

U.S. PATENT DOCUMENTS

| | | |
|---|---|---|
| 5,223,829 A | 6/1993 | Watabe |
| 5,227,778 A | 7/1993 | Vacon et al. |
| 5,341,505 A * | 8/1994 | Whitehouse .................. 708/171 |
| 5,373,561 A | 12/1994 | Haber et al. |
| 5,387,783 A | 2/1995 | Mihm et al. |
| 5,404,231 A | 4/1995 | Bloomfield |
| RE34,954 E | 5/1995 | Haber et al. |
| 5,638,446 A | 6/1997 | Rubin |
| 5,648,916 A | 7/1997 | Manduley et al. |
| 5,701,770 A | 12/1997 | Cook et al. |
| 5,710,887 A | 1/1998 | Chelliah et al. |
| 5,752,059 A | 5/1998 | Holleran et al. |
| 5,774,053 A | 6/1998 | Porter |
| 5,774,086 A | 6/1998 | Guyot |
| 5,781,629 A | 7/1998 | Haber et al. |
| 5,796,841 A | 8/1998 | Cordery et al. |
| 5,805,719 A * | 9/1998 | Pare et al. .................... 382/115 |
| 5,805,810 A | 9/1998 | Maxwell |
| 5,857,188 A | 1/1999 | Douglas |
| 5,870,549 A | 2/1999 | Bobo, II |
| 5,878,233 A | 3/1999 | Schloss |
| 5,883,810 A | 3/1999 | Franklin et al. |
| 5,910,987 A | 6/1999 | Ginter et al. |
| 5,917,411 A | 6/1999 | Baggarly |
| 5,917,925 A | 6/1999 | Moore |
| 5,943,656 A | 8/1999 | Crooks et al. |
| 5,944,787 A * | 8/1999 | Zoken .......................... 709/206 |
| 5,971,587 A | 10/1999 | Kato et al. |
| 5,979,750 A | 11/1999 | Kindell |
| 6,006,200 A | 12/1999 | Boies et al. |
| 6,028,517 A | 2/2000 | Sansone et al. |
| 6,032,133 A | 2/2000 | Hilt et al. |
| 6,035,402 A | 3/2000 | Vaeth et al. |
| 6,047,264 A | 4/2000 | Fisher et al. |
| 6,064,995 A | 5/2000 | Sansone et al. |
| 6,138,910 A | 10/2000 | Madruga |
| 6,152,369 A | 11/2000 | Wilz, Sr. et al. |
| 6,219,669 B1 | 4/2001 | Haff et al. |
| 6,233,568 B1 | 5/2001 | Kara |
| 6,233,585 B1 | 5/2001 | Lewis et al. |
| 6,243,620 B1 | 6/2001 | Robinson et al. |
| 6,246,925 B1 | 6/2001 | Robinson et al. |
| 6,259,964 B1 | 7/2001 | Robinson |
| 6,282,658 B2 | 8/2001 | French et al. |
| 6,285,777 B2 | 9/2001 | Kanevsky et al. |
| 6,285,991 B1 | 9/2001 | Powar |
| 6,289,323 B1 | 9/2001 | Gordon et al. |
| 6,308,277 B1 | 10/2001 | Vaeth et al. |
| 6,321,339 B1 | 11/2001 | French et al. |
| 6,323,782 B1 | 11/2001 | Stephens et al. |
| 6,347,737 B1 | 2/2002 | Madruga |
| 6,374,293 B1 * | 4/2002 | Dev et al. ...................... 709/220 |
| 6,438,690 B1 | 8/2002 | Patel et al. |
| 6,442,571 B1 | 8/2002 | Haff et al. |
| 6,460,020 B1 * | 10/2002 | Pool et al. ..................... 705/26 |
| 6,480,885 B1 | 11/2002 | Olivier |
| 6,493,685 B1 | 12/2002 | Ensel et al. |
| 6,496,936 B1 | 12/2002 | French et al. |
| 6,604,132 B1 | 8/2003 | Hitt |
| 6,654,448 B1 | 11/2003 | Agraharam et al. |
| 6,711,624 B1 | 3/2004 | Narukar et al. |
| 6,741,724 B1 | 5/2004 | Bruce et al. |
| 6,745,327 B1 | 6/2004 | Messing |
| 6,775,782 B1 | 8/2004 | Buros et al. |
| 6,917,948 B2 * | 7/2005 | Campbell ........................ 1/1 |
| 7,133,850 B2 * | 11/2006 | Gargiulo ...................... 705/402 |
| 7,139,731 B1 * | 11/2006 | Alvin ........................... 705/35 |
| 7,236,970 B1 | 6/2007 | Winslow |
| 2001/0011274 A1 | 8/2001 | Klug et al. |
| 2001/0020242 A1 * | 9/2001 | Gupta et al. ................ 707/501.1 |
| 2001/0032181 A1 | 10/2001 | Jakstadt et al. |
| 2002/0002590 A1 * | 1/2002 | King et al. .................... 709/206 |
| 2002/0023059 A1 | 2/2002 | Bari et al. |
| 2002/0049672 A1 | 4/2002 | Kitchen et al. |
| 2002/0069174 A1 | 6/2002 | Fox et al. |
| 2003/0065622 A1 * | 4/2003 | Gargiulo ...................... 705/60 |
| 2003/0077409 A1 | 4/2003 | Schnell |
| 2003/0187951 A1 | 10/2003 | Shen |
| 2004/0044734 A1 * | 3/2004 | Beck ............................ 709/206 |
| 2004/0128316 A1 * | 7/2004 | Campbell .................. 707/104.1 |
| 2010/0161993 A1 * | 6/2010 | Mayer .......................... 713/178 |

FOREIGN PATENT DOCUMENTS

| | | |
|---|---|---|
| WO | WO 97/12460 | 4/1997 |
| WO | WO 00/13368 | 3/2000 |
| WO | WO 01/00069 | 1/2001 |
| WO | WO 01/18718 A1 | 3/2001 |
| WO | WO 01/65444 | 9/2001 |
| WO | WO 01/99005 | 12/2001 |
| WO | WO 01/99037 | 12/2001 |
| WO | WO 02/08961 | 1/2002 |
| WO | WO 02/066344 | 8/2002 |
| WO | WO 02/079947 | 10/2002 |
| WO | WO 01/99009 | 12/2002 |

OTHER PUBLICATIONS

Co-Pending U.S. Appl. No. 09/809,325; Title: Methods and Systems for Proofing Identities Using a Certificate Authority, filed Mar. 16, 2001.

Co-Pending U.S. Appl. No. 09/809,328; Title: Methods and Systems for Establishing an Electronic Account for a Customer, filed Mar. 16, 2001.

Co-Pending U.S. Appl. No. 09/809,312; Title: Methods and Systems for Providing a Secure Electronic Mailbox, filed Mar. 16, 2001.

Co-Pending U.S. Appl. No. 09/809,326; Title: Methods and Systems for Linking an Electronic Address to a Physical Address of a Customer, filed Mar. 16, 2001.

Article 34 Amendments—Letter Accompanying Replacement Sheets from PCT/US01/19698 (published as WO 01/99009), dated Jan. 18, 2002, 2 pages.

International Preliminary Examination Report in PCT/US01//08488, mailed Jun. 11, 2003, 10 pages.

International Preliminary Examination Report in PCT/US01/19384, mailed Jan. 17, 2003, 4 pages.

International Preliminary Examination Report in PCT/US01/19421, mailed May 16, 2002, 4 pages.

International Preliminary Examination Report in PCT/US01/23177, mailed May 3, 2002, 4 pages.

International Preliminary Examination Report in PCT/US01/28001, mailed Aug. 8, 2003, 4 pages.

International Search Report in PCT/US00/27068, mailed May 4, 2001, 4 pages.

International Search Report in PCT/US01/23177, mailed Oct. 18, 2001, 4 pages.

International Search Report in PCT/US01/19384, mailed Nov. 16, 2001, 6 pages.

International Search Report in PCT/US01/19421, mailed Nov. 19, 2001, 6 pages.

International Search Report in PCT/US01/27690, mailed Nov. 19, 2001, 5 pages.

International Search Report in PCT/US01/28001, mailed Dec. 21, 2001, 7 pages.

International Search Report in PCT/US02/04866, mailed May 23, 2002, 1 page.

International Search Report in PCT/US02/09870, mailed Dec. 5, 2002, 2 pages.

PCT Written Opinion in PCT/US01/08488, mailed Oct. 28, 2002, 9 pages.

PCT Written Opinion in PCT/US01/19384, mailed Jun. 17, 2002, 4 pages.

PCT Written Opinion in PCT/US02/04866, mailed May 23, 2003, 4 pages.

PCT Written Opinion in PCT/US02/09870, mailed Mar. 6, 2003, 5 pages.

Bhushan et al., Federated Accounting: Service Charging and Billing in a Business-to-Business Environment, 2001 IEEE/IFIP International Symposium, May 14-18, 2001, pp. 107-121, 15 pages.

Czerny, Customer Account Management System for STEWEAG Key Accounts, CIRED 97, Jun. 2-5, 1997, Conference Publication No. 438, pp. 5.6.1-5,6.5, 5 pages.

Bartholomew, "The future of snail mail: the Postal Service is gearing up for competition. But can it deliver?" Information Week, Dec. 4, 1995, n556, starting p. 34, 6 pages.

FedEx® eBusiness Tools: FedEx ® Ship Manager Software, http://www.fedex.com/us/ebusiness/eshipping/ship.html, website printout dated Nov. 28, 2001, 2 pages.

FedEx® Customer Service Fast Facts, Back Issue, Oct. 11, 2000, http://www.fedex.com/us/customer/lastfacts/backissues/101100fastfacts.html, website printout dated Nov. 28, 2001, 4 pages.

Stafford et al., Delivering Marketing Expertise to the Front Lines, IEEE Expert, Apr. 1994, pp. 23-32, 10 pages.

Appendix K (USPS Burke Test Site Report), "User Interface Review of Mail Item Retrieval System (MIRS), Burke Station, Burke Virginia," Dec. 24, 1996; appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is Incorporated by reference into WO 01/99037), 14 pages.

Appendix L, "In-plant Test Report (Re-Test Failed Items), Mail Item Retrieval System (MIRS),"Oct. 21, 1998; appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into WO 01/99037), 13 pages.

Appendix M, "Heuristic Evaluation of the USPS Mail Item Retrieval System Early Prototype," by Hoffman et al, Mitretek Systems, May 11, 1998; appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into WO 01/99037), 19 pages.

"CONNECT announces OneServer interactive online application platform," Business Wire, Apr. 10, 1995, p. 4101043, retrieved from Dialog, Dialog No. 07797909 (2 pages).

International Preliminary Examination Report in PCT/US01/08487, mailed Jan. 23, 2002 (4 pages).

International Preliminary Examination Report in PCT/US01/08488, mailed Jun. 11, 2003 (11 pages).

International Search Report in PCT/US 01/08490, mailed Jan. 22, 2002 (6 pages).

"Joint Direct Bill Payment Form for Mich. Utilities," Bank Technology News, Apr. 1994, p. 8, retrieved from Dialog, Dialog No. 03302326 (1 page).

Newkirk, K.M., "Banks can slice transaction costs," Independent Banker, Dec. 1995, vol. 45, No. 12, pp. 52-53, retrieved from Dialog, Dialog No. 00276769 (3 pages).

"Recommendation F.400/X.400 message handling and directory services—operation and definition of service," Nov. 14, 1988, CCITT, Melbourne, XP002186347 (10 pages).

U.S. Patent Application Publication No. US 2001/0032181 A1, dated Oct. 18, 2001.

U.S. Patent Application Publication No. US 2002/0049672 A1, dated Apr. 25, 2002.

Final Office Action, dated Feb. 26, 2010, for U.S. Appl. No. 09/809,581, filed Mar. 16, 2001 (9 pgs.).

Office Action, dated Oct. 22, 2009, for U.S. Appl. No. 09/809,581, filed Mar. 16, 2001 (6 pgs.).

* cited by examiner

SECURE ELECTRONIC MAILBOX

004AAA0AAD2T30008

Identity Validation Form ⸺⸺⸺⸺⸺⸺⸺⸺⸺⸺⸺⸺⸺ ● STEP 1 ●⸺

Instructions Verify all the information listed in the Identity Validation Documents section below. If you find any discrepancy between information listed on this form and your actual Identity Validation Documents, please call 1-800-344-7779 and speak with a customer care agent. If all information is accurate, take the Identity Validation Documents along with this form to the post office listed below on or before 01/28/2000. You must complete the in-person validation before this date, or you will be required to restart the application process. Please do not sign, deface, bend, or otherwise mark this form except in the presence of a postal clerk at the designated post office.

For Official USPS Use Only

Place Round Date Stamp Here

Closest Post Office
UNITED STATES POSTAL SERVICE
458 LENFANT PLZ SW
WASHINGTON DC 20024-2114

Residential Address

MR. WILLY WONKA
3 2 CENTRAL PARK W APT 14U
NEW YORK NY 10025-5868

USPS EMAIL ADDRESS: demotest200

Identity Validation Documents Postmaster: The customer must provide the identity documents listed below. Verify that the bearer presents all information exactly as it appears on this form. If there is any discrepancy, this form is null and void.

|                              | Validate |                 | Validate |
|------------------------------|----------|-----------------|----------|
| DATE OF BIRTH: 01/01/1961    | ☐        | PHONE BILL:     | ☐        |
| DRIVERS LICENSE: 987654      | NY ☐     |                 |          |
| EXPIRATION: 01/01/2001       | ☐        |                 |          |

Oath and Signature I certify that the statements made by me are true and complete. I understand that furnishing false or misleading information on this form or omitting material information requested on this form may subject me to criminal sanctions (including fines and imprisonment) and/or civil sanctions (including multiple damages and civil penalties). (18 U.S.C. 1001 and 31 U.S.C. 3802)

Signature of Applicant: ⸺⸺⸺⸺⸺⸺⸺⸺⸺   Date: ⸺⸺⸺⸺⸺⸺

Privacy Statement The collection of this information is authorized by 39 U.S.C. 403 and 404. This information will be used to provide the applicant with Secure Electronic Mailbox service requested. As a routine use, the information may be disclosed to the U.S. Department of Justice or to other counsel representing the Postal Service, or may be disclosed in a proceeding before a court or adjudicative body before which the Postal Service is authorized to appear; to an expert, consultant, or other individual who is under contract to the Postal Service to fulfill any agency function, but only to the extent necessary to fulfill that function; to a Federal Records Center for storage prior to destruction.

Warning The furnishing of false or misleading information on this form or omission of material information may result in criminal sanctions (including fines or imprisonment) and/or civil sanctions (including multiple damages and civil penalties). (18 U.S.C. 1001).

UNITED STATES POSTAL SERVICE™

01/08/2000

Customer Copy - Retain For Your Records.

METHODS AND SYSTEMS FOR PROVIDING AN ELECTRONIC ACCOUNT TO A CUSTOMER

I. RELATED APPLICATIONS

This application is a divisional of U.S. patent application Ser. No. 09/809,581, filed Mar. 16, 2001, which claims the benefit of U.S. Provisional Patent Application No. 60/189,983, filed Mar. 17, 2000, both of which are expressly incorporated herein by reference.

II. BACKGROUND OF THE INVENTION

A. Field of the Invention

The present invention relates to systems and methods for providing electronic communications to a customer. More particularly, the invention relates to systems and methods for providing an electronic account and other services to a customer by linking the customer's electronic address to a physical address where the customer receives physical mail.

B. Description of the Related Art

The United States Postal Service (USPS) is an independent government agency that provides mail delivery and other services to the public. The USPS is widely recognized as a safe and reliable means for sending and receiving mail. With the steady growth of electronic communication and commerce, consumers and businesses need a secure way to communicate and conduct business electronically. Without trustworthy channels of communication, many potential participants in electronic commerce are unwilling to send sensitive information, e.g., credit card numbers, electronically, thus limiting the utility of electronic commerce to all individuals.

Electronic mail, or e-mail, is a well-known means of communication for individuals and businesses with access to computers and Internet connections. When a user establishes an account with an e-mail service provider, e.g., America Online™ or Hotmail™, the user is assigned a unique e-mail address, e.g. joesmith@aol.com. Another individual can send a message to the user by entering the user's e-mail address along with the message and sending it via the Internet. E-mail can provide almost instant message delivery among individuals and businesses over vast distances for very little or no cost. E-mail also presents an opportunity for businesses to advertise to potential customers in a new way, e.g., by sending bulk advertisements via e-mail.

Despite the advantages of e-mail, there are several drawbacks. Because e-mail is received and viewed electronically, e-mail does not reach those who are not "online." In this way, e-mail contributes to the so-called "technology gap" between individuals with access to computers and computer technology and individuals who cannot afford or who do not understand computers and computer technology.

Additionally, the simplicity and low cost of e-mail make it an easy vehicle for unwanted messages, e.g, unsolicited advertisements or "spam." Both individuals and businesses demand the capability to inhibit the receipt of unwanted e-mail.

Furthermore, e-mail messages are also insecure, and can be intercepted en route by unknown third parties. Businesses and consumers who communicate electronically need to know that their messages are private, and that they can rely on the address to correctly identify the sender and/or recipient.

Therefore, it is desirable to provide a system for communicating electronically that is available to everyone, that gives consumers control over the content of communications received, and that provides a secure and reliable way to conduct transactions electronically.

III. SUMMARY OF THE INVENTION

Systems and methods consistent with the present invention overcome the shortcomings of conventional systems by establishing an electronic account for a customer on a network, where the customer's electronic address is linked to the customer's physical address. As with a conventional electronic account, a customer is able to send and receive e-mail, as well as conduct electronic transactions. However, the electronic account ensures flexible and secure communications by linking a customer's electronic address to the customer's physical address. Systems and methods consistent with the present invention may be implemented by the USPS. Moreover, such a USPS electronic account may provide electronic access to all persons, i.e., a person with a USPS physical address may also have a USPS electronic account.

A method consistent with the present invention establishing an electronic account over a network. When a request is received from a user to initiate an electronic account over the network, a physical address of the user is matched from an address database, the physical address corresponding to a location where the user receives mail. The electronic account is linked to the physical address.

Another method consistent with the present invention establishes electronic mail services over a network using an electronic account by receiving a request for electronic mail services from a user, the request including a physical address of the user. An electronic address for the user is generated so that the user can receive electronic mail at the electronic address. An electronic account is initiated over the network for the user, wherein the electronic account has a unique electronic customer account number corresponding to the user, and the physical address is linked to the electronic address using the electronic account.

Another method consistent with the present invention processes electronic mail services over a network using an electronic account by linking the electronic account to a physical address of a user and an electronic address of the user. A request is received from a service to access the electronic account over the network, and a request is received from the user to access the service over the network via the electronic account.

Another method consistent with the present invention delivers mail. Mail is received for delivery to a customer with an electronic account. The electronic account has both an electronic address for the customer and a physical address for the customer, and both the electronic address and the physical address are linked by the electronic account. The mail is then delivered to the customer.

Another method consistent with the present invention delivers a message to a user with an electronic account by receiving the message directed to the user with the electronic account, where the message includes an electronic address and an incomplete physical address of the user. A complete physical address of the user is determined from the electronic address using an address database and the message is delivered to the user.

Another method consistent with the present invention delivers a message to a user with an electronic account when the electronic account includes a preferred delivery address. A temporary delivery address for the user and a time period corresponding to the temporary delivery address are received.

When a message directed to the preferred delivery address is received during the time period, the message is sent to the temporary delivery address.

It is to be understood that both the foregoing general description and the following detailed description are exemplary and explanatory only and are not restrictive of the invention, as claimed.

IV. BRIEF DESCRIPTION OF THE DRAWINGS

The accompanying drawings, which are incorporated in and constitute a part of this specification, illustrate several embodiments of the invention and, together with the description, serve to explain the principles of the invention.

In the drawings:

FIG. 5B illustrates an embodiment of an identity validation (IDV) form consistent with the present invention;

V. DETAILED DESCRIPTION

A. Introduction

Systems and methods consistent with the present invention provide an electronic account for a customer on a network, where the customer's electronic address is linked to the customer's physical address. As with a conventional electronic account, a customer is able to send and receive e-mail as well as conduct electronic transactions. Additionally, an electronic account consistent with the present invention ensures flexible and secure communications by linking a customer's electronic address to the customer's physical address.

Embodiments described herein include systems and methods for providing an electronic account to a customer, linking a customer's electronic address to a physical address of the customer, establishing an electronic account using an Internet Customer Registration System, providing a secure electronic mailbox, and providing a certificate authority for proofing identities.

B. Providing an Electronic Account to a Customer

Figure 1:
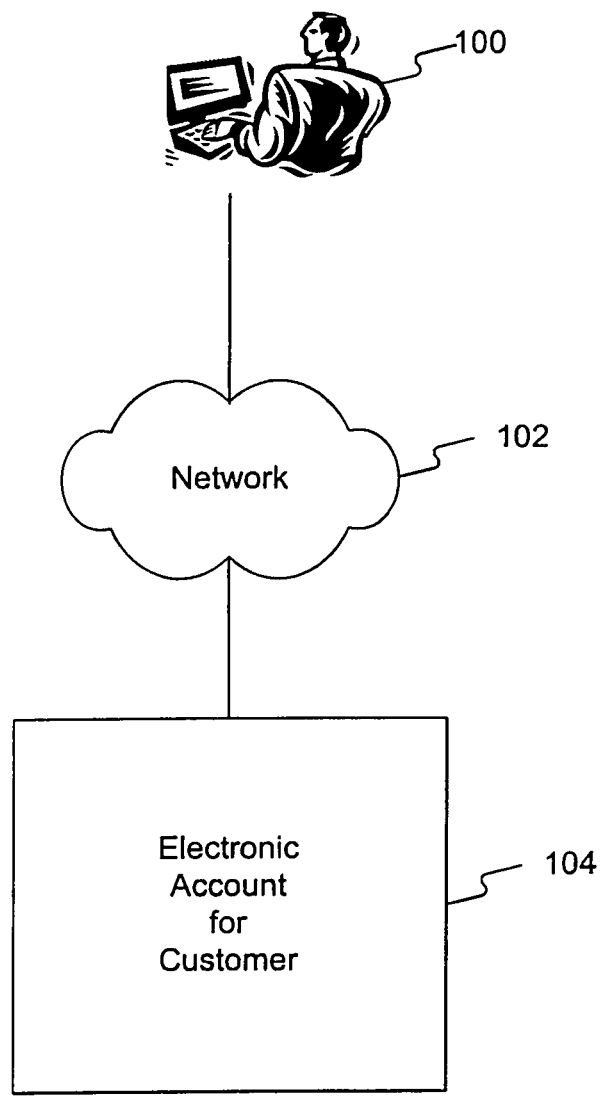
FIG. 1 is a high level block diagram of a system for providing an electronic account to a customer.

FIG. 1 is a high level block diagram of a system for providing an electronic account to a customer. A customer 100 can use a computer, e.g., a personal computer, to log onto a network 102, such as the Internet, to establish an electronic account 104. Electronic account 104 enables customer 100 to access a wealth of electronic services, including e-mail and electronic transactions. These services can be both secure and non-secure and can be provided by any service provider, such as an online merchant, a government agency, or a bank.

When electronic account 104 is established, it is linked to a physical address of customer 100. Typically, the physical address corresponds to a location where the user receives physical mail, such as via the USPS or other entity. In this way, anyone who receives mail at a physical address can establish an electronic account consistent with the present invention. The physical address can be a home address, Post Office box, business address, etc. Electronic account 104 can also include an electronic address, such as an e-mail address, for customer 100.

To provide electronic services to customer 100, a service provider can communicate with customer 100 via electronic account 104. If electronic account 104 is linked to customer 100's physical address and e-mail address, the service provider can send a communication to electronic account 104 and request delivery to either the physical address or the e-mail address, or both. If such a communication directed to customer 100 contains an incomplete address, the complete address can be determined using electronic account 104. As an added service, the sender, i.e., the service provider, could be informed of the complete address as part of an address correction service.

Electronic account 104 can allow customer 100 to receive an electronic message in physical form at a physical address. In this way, the present invention makes e-mail available even to people without regular access to a computer. For example, a customer could use a public computer, e.g., at a public library, to establish an electronic account and obtain a vanity e-mail address. Thereafter, any messages sent to the e-mail address would be received at the electronic account and could be printed and delivered to the physical address linked to the electronic account. The USPS or another company could offer this service to help bridge the technology gap.

Customer 100 can also link a temporary address, either physical or electronic, to electronic account 104 to request that messages be delivered to the temporary address for a given period of time. For example, a businessman might have an electronic account with preferred e-mail and physical addresses at his office. When he takes a two-week business trip, he can use his electronic account to have his messages delivered to a new, temporary address, such as a cellular phone or a computer in a hotel. Service providers sending the messages to the businessman would not need to know about his temporary address. All communications would still be directed to the electronic account.

C. Linking an Electronic Address to a Physical Address of a Customer

Figure 2:
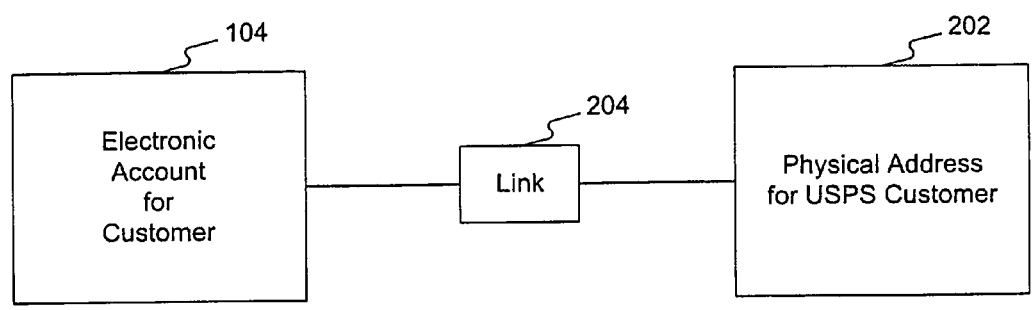
FIG. 2 is a high level block diagram of a system for linking an electronic address to a physical address of a customer.

FIG. 2 is a high level block diagram of a system for linking an electronic address to a physical address of a customer. Systems consistent with the present invention provide a link 204 between a customer's electronic account 104 and a physical address 202 of the customer. Link 202 can provide added security to protect the customer's privacy, for example, by leveraging a trusted third-party resource such as the USPS master address database.

Figure 3:
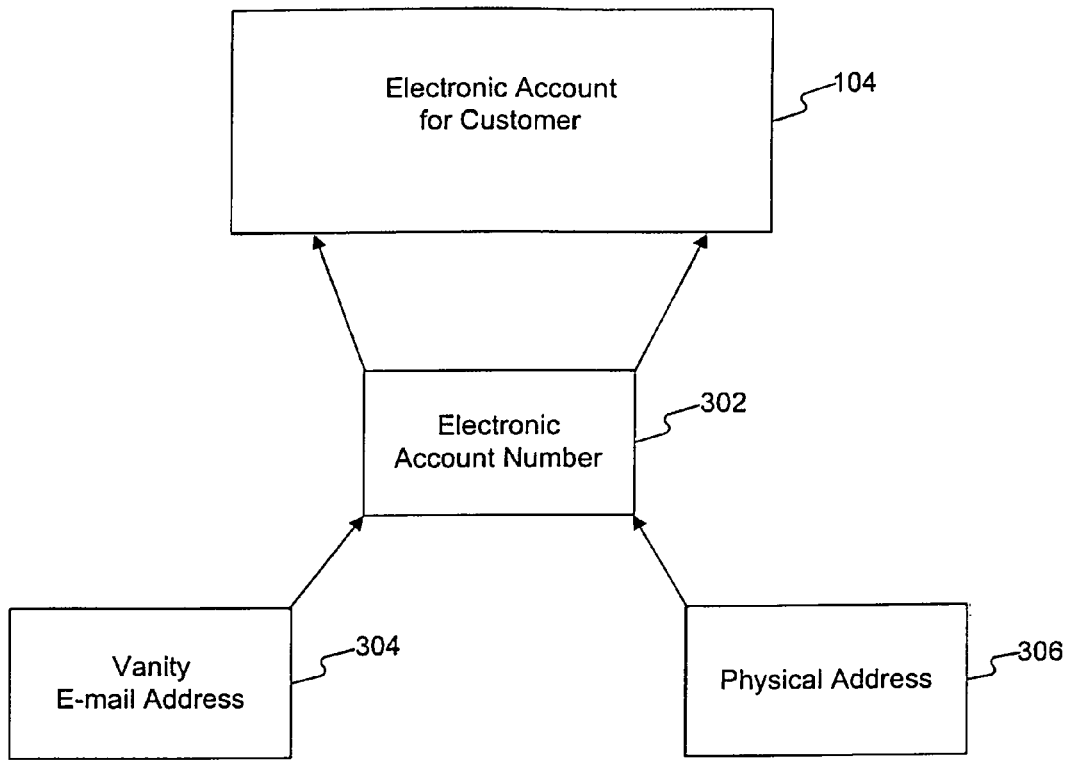
FIG. 3 depicts one embodiment of a link between an electronic address and a physical address of a customer.

FIG. 3 depicts one embodiment of a link between an electronic address and a physical address of a customer. Link 204 can be implemented using an electronic account number 302 that corresponds to electronic account 104. Electronic account number 302 can be generated when electronic account 104 is created. Electronic account number 302 can be linked to a customer's electronic address 304, e.g., a vanity e-mail address, and the customer's physical address 306. The electronic address could also be, for example, a facsimile number or telephone number. In one embodiment, a customer can choose the construction of vanity e-mail address 304 (e.g., joesmith@usps.gov). Physical address 306 is typically where the customer receives mail. For example, physical address 306 can be the customer's residence expressed as '123 Main Street, Memphis, Tenn. 38118.' Consistent with the present invention, the customer can provide the physical address to be linked to the electronic account, so a customer could select a home address or a work address, for example.

When the customer provides the physical address, the electronic account system can submit it to an address matching engine that communicates with an address database. The address matching engine submits the address as a query to the address database, which returns a standardized physical address to be linked to the electronic account. In one embodiment, the standardized physical address conforms to a pre-approved format and includes a nine-digit ZIP code. In this way, the physical address linked to the electronic account is as complete and correct as possible, even if the customer submitted only a partial address (e.g., only a 5-digit ZIP code). This address matching process is described in detail below with reference to FIG. 9.

Figure 4:
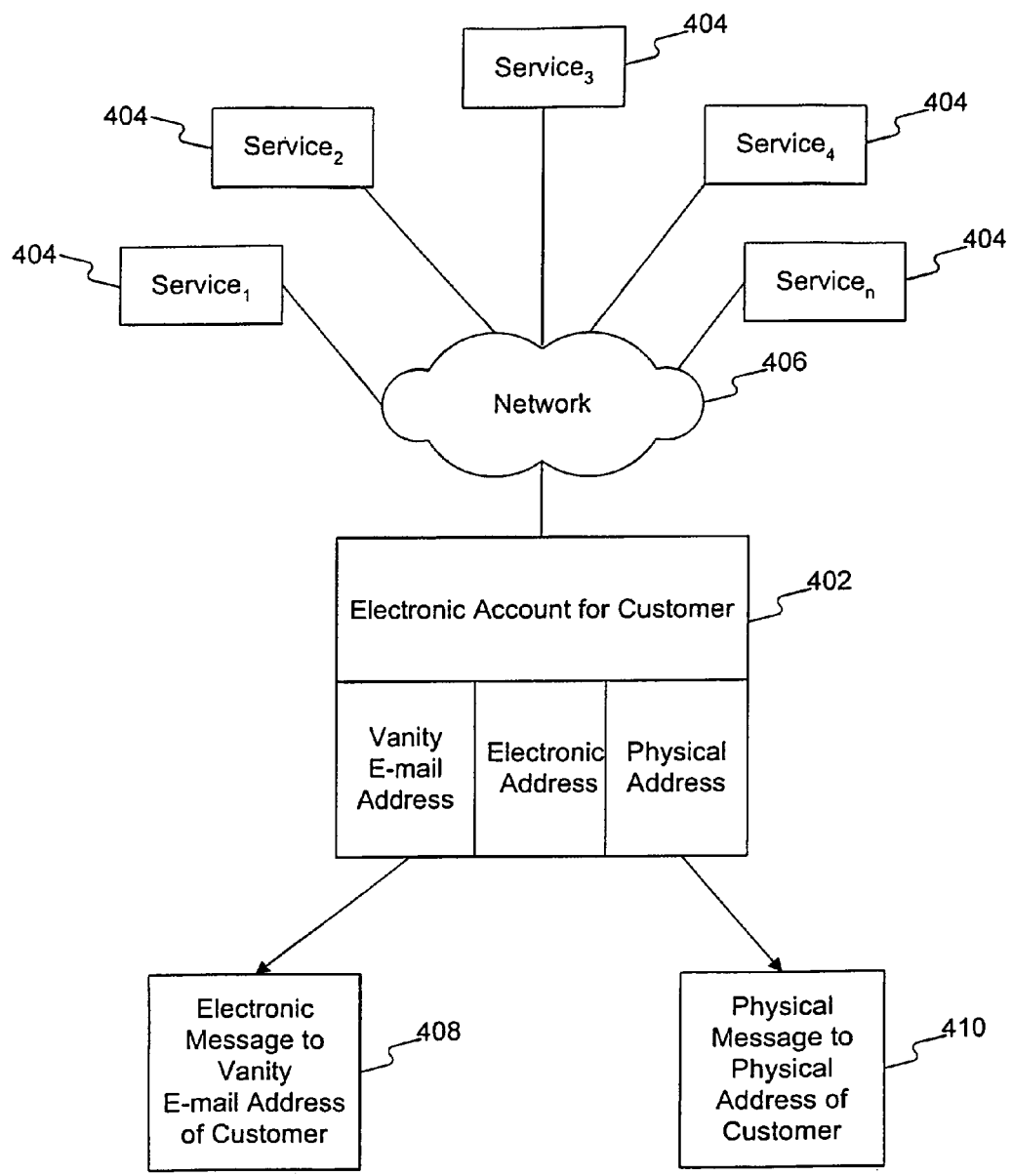
FIG. 4 is a high level block diagram of a system for providing services to a customer using an electronic account consistent with the present invention.

FIG. 4 is a high level block diagram of a system for providing services to a customer using an electronic account consistent with the present invention. An electronic account 402 for a customer links an electronic address, e.g., a vanity e-mail address, an electronic account number, and a physical address of the customer. Electronic account 402 communicates with a plurality of services 404 via a network 406. Network 406 can be, for example, the Internet. Using electronic account 402, services 404 can create physical messages to be sent to the customer's physical address as well as electronic messages to be sent to the customer's electronic address. As depicted in FIG. 4, services 404 communicate with electronic account 402, and therefore do not need to know the customer's electronic address or physical address. This enables the customer to take advantage of electronic services while protecting the customer's privacy.

A service 404 can leverage the electronic account to send a message to a plurality of customers. For example, a marketing firm could submit a physical mailpiece, e.g., a brochure, to the electronic account system along with a mailing list of physical addresses for a group of customers having electronic accounts. The electronic account system can create a mailing list of e-mail addresses corresponding to the physical addresses using each customer's electronic account. The mailpiece can be scanned or otherwise converted into electronic format and delivered to the customers' e-mail addresses. Alternatively, the message could be delivered to a different electronic address, such as a facsimile number or telephone number. This type of service is described below with reference to FIG. 12.

D. Establishing an Electronic Account using an Internet Customer Registration System (ICRS)

1. Customer Registration Process

Figure 5A:
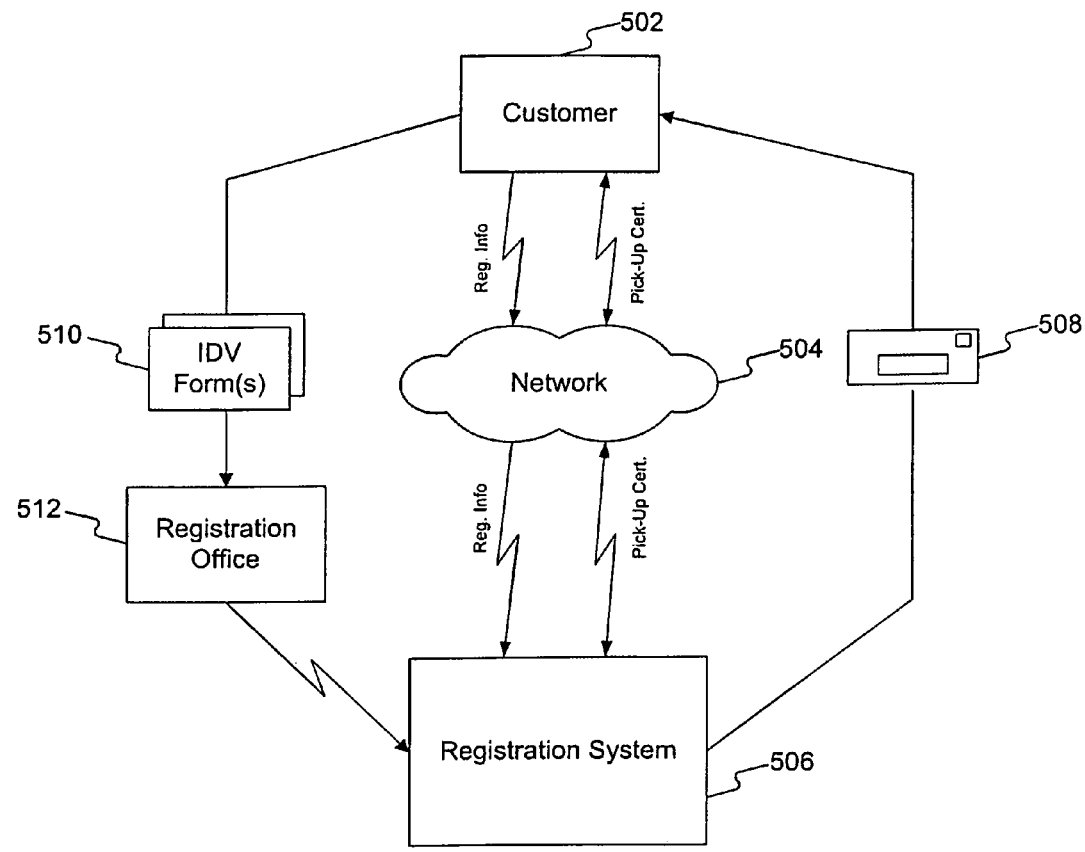
FIG. 5A is a high level block diagram of a system for establishing an electronic account for a customer.

FIG. 5A is a high level block diagram of a system for establishing an electronic account for a customer. A customer 502 at a computer, such as a personal computer, connects to a network 504 to provide registration information to a registration system 506. Network 504 can be, for example, the Internet, and registration system 506 can be, for example, the USPS Internet Customer Registration System. The registration information can include customer name, physical address, e-mail address, telephone number, a public key or other password, and a request for a personal or business electronic account.

After customer 502 provides registration information to registration system 506, a mailpiece 508, such as a confirmation letter, is created and sent to the user at a physical address. The physical address can be one provided by the customer with the registration information. Mailpiece 508 contains an identity validation (IDV) form 510, described with regard to FIG. 5B below. To complete the registration process, customer 502 takes IDV form 510 to a registration office, such as a local Post Office. There, a clerk verifies the customer's identity and uses IDV form 510 to send identification verification information to registration system 506.

FIG. 5B illustrates an embodiment of an identity validation (IDV) form consistent with the present invention. As described above, mailpiece 508 containing IDV form 510 is sent to the customer by registration system 506. When the customer takes IDV form 510 to an identity proofing location, e.g., a local Post Office, a clerk validates the customer's identity and transmits a confirmation to registration system 506.

As shown in FIG. 5B, IDV form 510 can include the customer's physical address, the customer's e-mail address, the location of the nearest registration office, and a date by which the customer must go to the registration office. IDV form 510 can also include a list of identity validation documents that the customer must present at the registration office, such as a driver's license, birth certificate, or utility bill. In one embodiment, the customer can select the identity validation documents when submitting registration information to registration system 506.

IDV form 510 can include a confirmation bar code. The confirmation bar code can be created by the registration system 506 and linked to the electronic account when IDV form 510 is created. Once a clerk validates the customer's identity, for example, by examining the identity validation documents, the clerk can scan the confirmation bar code and send it electronically to registration system 506. When registration system 506 receives the scanned confirmation bar code, the customer's electronic account can be activated. Activation can occur, for example, by sending a digital certificate, password, or other notification to the customer.

In one embodiment of the present invention, two copies of IDV form 510 are sent to the customer: one copy for the customer to take to the registration office and another copy for the customer to retain for his records. IDV form 510 can include a set of instructions and a customer care telephone number that the customer can call if he has any problems. IDV form 510 can also include a signature and date block for the customer to execute as part of the identification validation process at the registration office.

Figure 6:
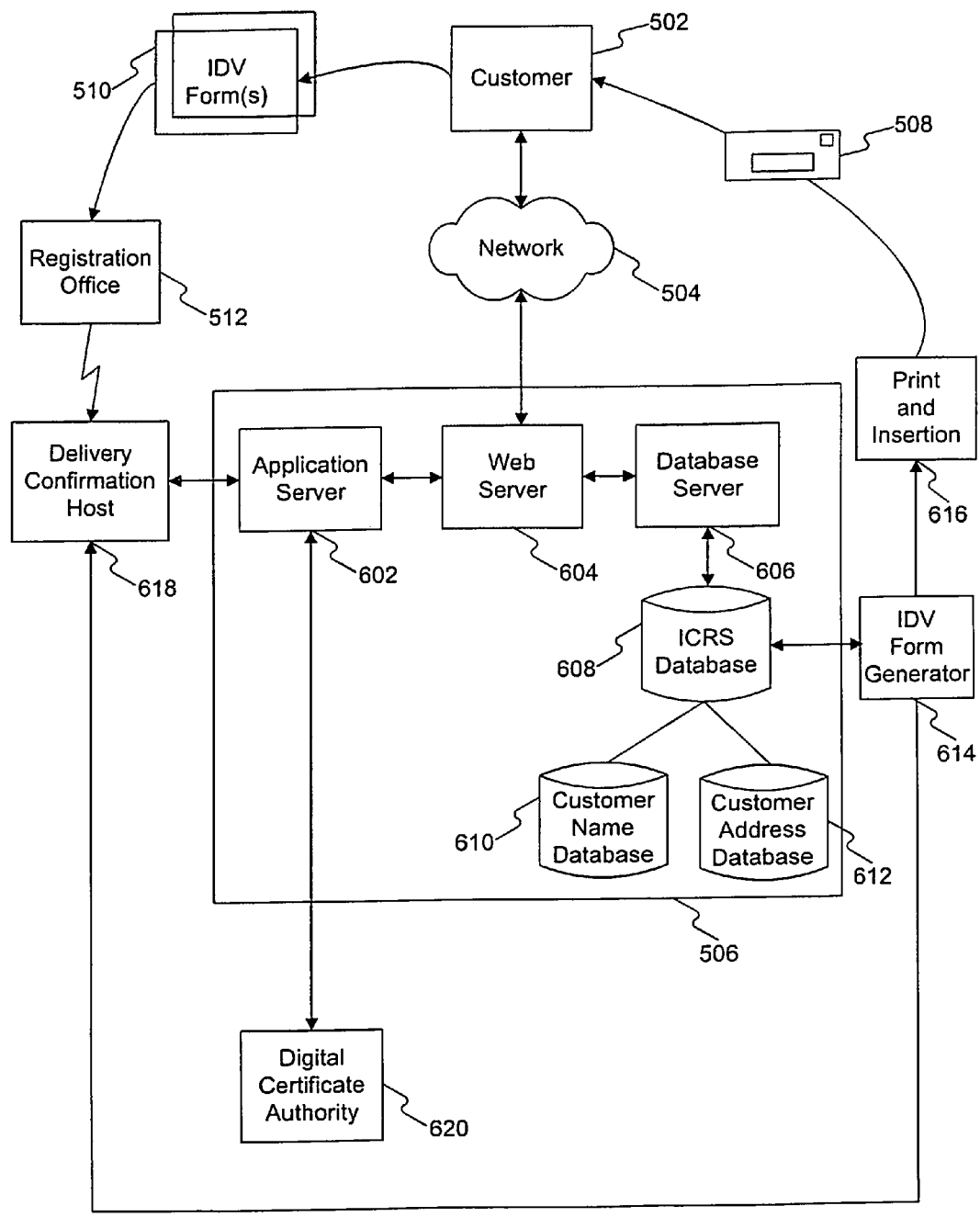
FIG. 6 is a more detailed diagram of a system for establishing an electronic account for a customer.

FIG. 6 is a more detailed diagram of a system for establishing an electronic account for a customer. As described above, customer 502 provides registration information to registration system 506 via network 504. Registration system 506 includes an application server 602, a web server 604, and a database server 606. Application server 602 includes software tools to generate dynamic content and execute applications for registration system 506. Application server 602 is described in more detail below with reference to FIG. 7. Web server 604 processes HTML requests to enable communications with customer 502 and to provide data to application server 602 and database server 606.

Database server 606 processes all communications with an Internet Customer Registration System (ICRS) database 608. In one embodiment, ICRS database 608 consists of two logical components: a customer name database 1610 and a customer address database 612. Customer name database 610 stores the registration information provided by a customer along with an electronic account number assigned to the customer. Customer address database 612 stores the customer's physical address. In this embodiment, the physical address is stored separately from the customer's name and other information to protect the security of the customer. To create a high level of security, packet filter access can be installed between customer name database 610 and customer address database 612. Consistent with the present invention, lithe ICRS database could be maintained as a single database.

When registration system 506 receives registration information from customer 502, it stores the registration information in ICRS database 608 as described above. An identification verification (IDV) form generator 614 then extracts data from ICRS database 608 and passes the data to a print and insertion function 616 that generates mailpiece 508 containing IDV form 510. Alternatively, IDV form generator 614 and print and insertion function 616 can be a single process. In one embodiment, the IDV form and mailpiece are generated within 24 hours after the customer's registration information is stored in ICRS database 608.

As described above, customer 502 takes IDV form 510 to a registration office where a clerk verifies, or "proofs," the customer's identity. The identity proofing can include comparing a photo ID to the customer in person. When the customer's identity is successfully proofed, the clerk scans a confirmation bar code from IDV form 510 and transmits the scanned bar code to registration system 506 via a delivery confirmation host 618. In one embodiment, IDV form generator 614 can send a notification to delivery confirmation host 618 when IDV form 510 is created. When this notification is received, delivery confirmation host 618 can communicate with application server 602 to provide notice that identification verification information is soon to be received. When the scanned bar code is sent to delivery confirmation host 618, application server 602 retrieves this identification verification information from delivery confirmation host 618.

Once the identification verification information is received by application server 602, a request is generated and sent to a digital certificate authority 620, such as, for example, the Certificate Authority (CA) described below with reference to FIG. 35. The request can direct digital certificate authority 620 to generate a digital certificate for customer 502. The request can include, for example, a public key and information provided by customer 502 during the registration process.

A digital certificate is a well-known tool for sending secure messages. A CA issues an encrypted digital certificate containing a customer's public key and a variety of other identification information. The Certificate Authority makes its own public key available through print or perhaps on the Internet. The recipient of an encrypted message uses the CA's public key to decode the digital certificate attached to the message, verifies the digital certificate as issued by the CA, and then obtains the sender's public key and identification information held within the certificate. With this information, the recipient can send an encrypted reply.

Figure 7:
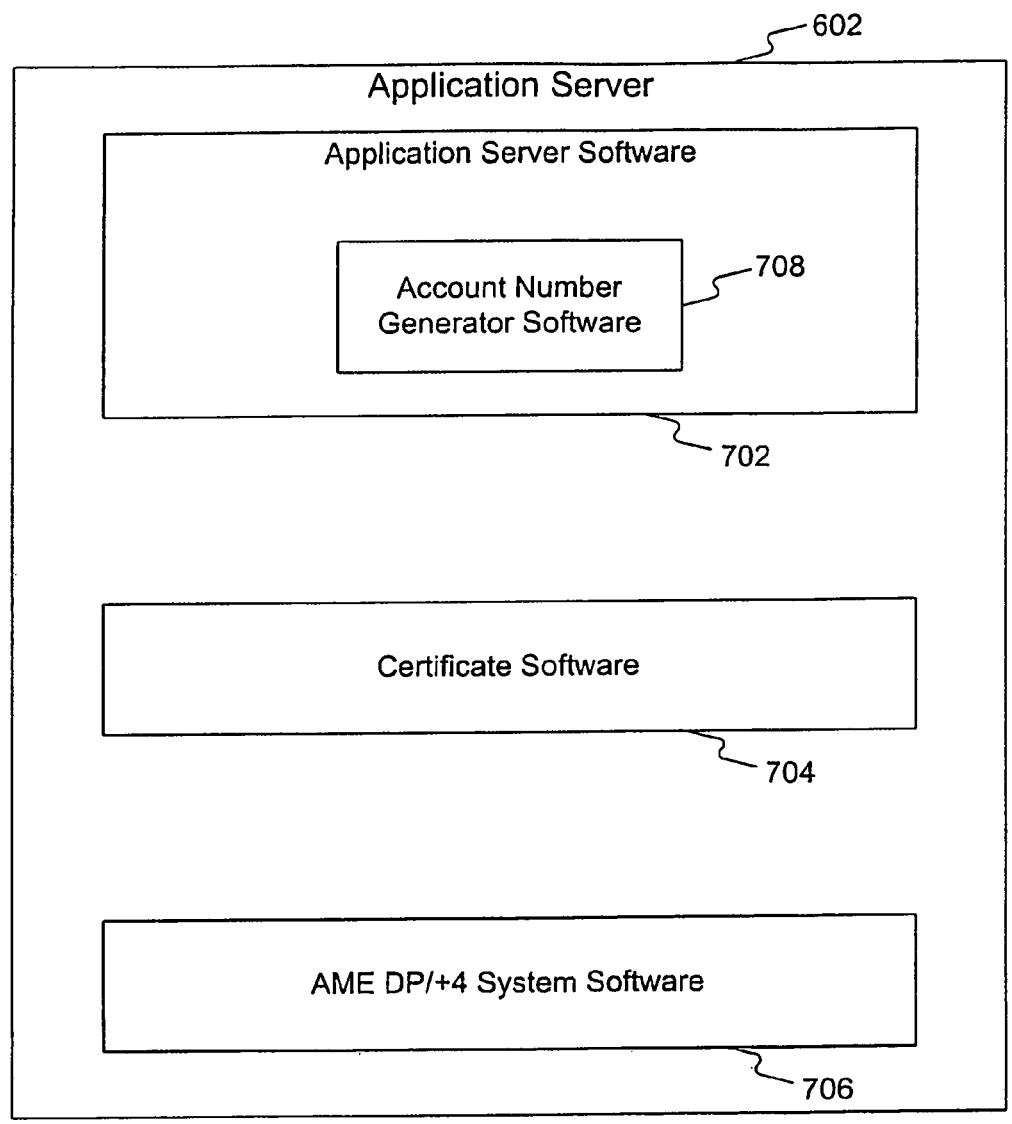
FIG. 7 is a block diagram of an application server consistent with the present invention.

FIG. 7 is a block diagram of an application server consistent with the present invention. Application server 602 includes application server software 702, certificate software 704, and address matching engine delivery point/plus 4 (AME DP/+4) system software 706. Application server software 602 processes logic and instructions to support registration system 506. Application server software 702 also includes account number generator software 708 that generates an electronic account number for a customer. In one embodiment, account number generator software 708 is embedded into application server software 702 in the form of a dynamically loadable library so that it becomes part of application server software 702 at run time. In another embodiment, account number generator software 708, can be stand-alone software for generating account numbers. The electronic account number is described in detail below with reference to FIG. 8.

Certificate software 704 is an application programming interface (API)—a tool enabling one piece of software to communicate with another piece of software. Certificate software 704 is used by registration system 506 to construct and submit requests to digital certificate authority 620 and to retrieve a customer's digital certificate from digital certificate authority 620.

AME DP/+4 system software 706 includes an interface to address matching directories and associated software to access those directories. This software can be used to resolve a physical address based on USPS delivery guidelines to create a standardized physical address. In one embodiment, a standardized physical address can meet one of four levels of address standardization. The first level of standardization is 'delivery point,' which resolves the address to an unique delivery point. The second level of standardization is 'plus 4,' which resolves the address to a valid range of addresses within a plus 4 segment of a ZIP code. The third level of standardization is '5 digit,' which resolves the address to a five-digit ZIP code area only. The fourth level of standardization is 'last line,' which resolves the address to a city, state, and ZIP code. The address matching process is described in more detail below with reference to FIG. 9.

Figure 8:
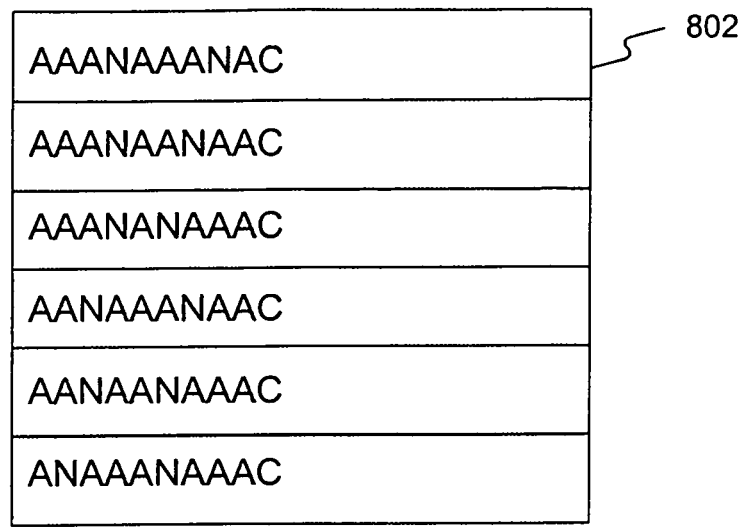
FIG. 8 depicts an embodiment of an electronic account number consistent with the present invention.

FIG. 8 depicts an embodiment of an electronic account number consistent with the present invention. In one embodiment, account number generator software 708 generates a unique electronic account number 802 consisting of ten alphabetical and numeric characters and one check digit, such as a modulus low end check digit. In this embodiment, among the ten alphabetical and numeric characters, no more than three alphabetical characters can be strung together to prevent having profanity inserted into the electronic account number.

FIG. 8 depicts six exemplary formats for an electronic account number. Consistent with the present invention, any other format providing a unique identifier can be used, including formats with fewer or more than ten characters. The electronic account number can be stored in customer name database 610 and used to link the customer's name and other information to the customer's physical address.

2. Address Matching Process

Figure 9:
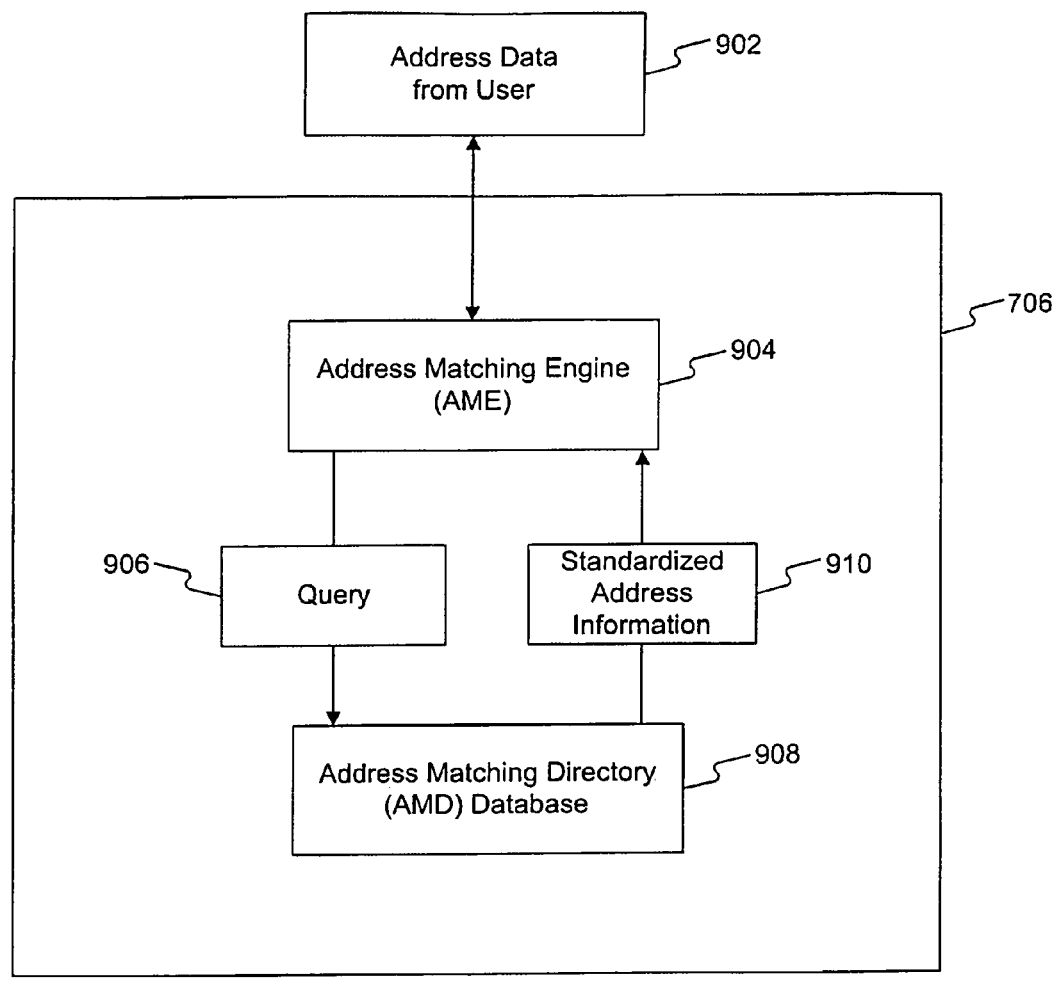
FIG. 9 is a flowchart of an address matching process performed by a registration system consistent with the present invention.

FIG. 9 is a flowchart of an address matching process performed by a registration system consistent with the present invention. A physical address 902 is received by AME DP/+4 software 706 and is passed to an address matching engine 904. For instance, the address can be received from a customer via Web server 604. Address matching engine 904 processes the physical address to create a query 906 and sends query 906 to an address matching directory (AMD) database 908. Query 906 is used to retrieve a standardized address stored in AMD database 908. Standardized address information 910 can include the standardized address and/or a corresponding delivery point identification (DPID) key that points to the location in AMD database 908 where the standardized address can be found. Standardized address information 910 is passed back to address matching engine 904, where it can be sent to ICRS database 608. If a DPID key cannot be determined via the address matching engine process, a flag can be set to send feedback to an address management office or other service personnel.

Figure 10:
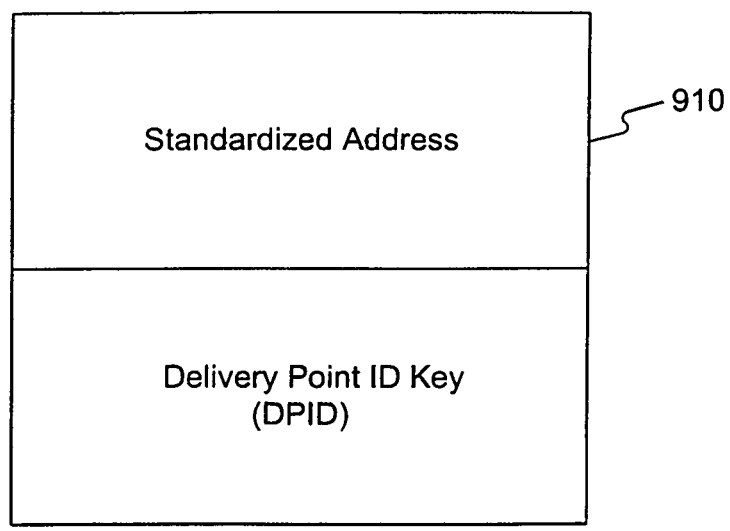
FIG. 10 is a block diagram of standardized address information processed by an address matching engine consistent with the present invention.

FIG. 10 is a block diagram of standardized address information processed by an address matching engine consistent with the present invention. Standardized address information 910 can include a standardized address and related information, including a DPID key. The DPID key can be used to access a storage location in a master address database as described below. The DPID key can be stored with the electronic account information in ICRS database 608.

Figure 11A:
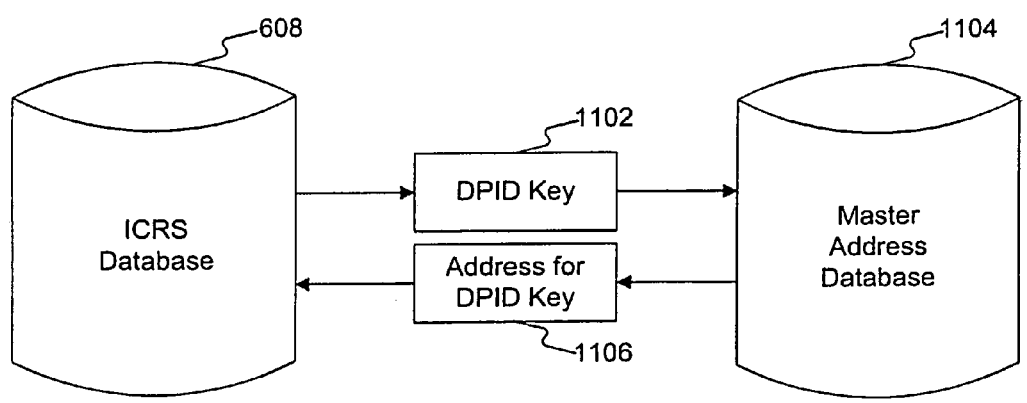
FIG. 11A depicts an embodiment of the relationship between an ICRS database and a master address database.

FIG. 11A depicts an embodiment of the relationship between an ICRS database and a master address database. ICRS database 608 can store a DPID key with a customer's electronic account information. To obtain updated address information, ICRS database 608 can use DPID key 1102 to access master address database 1104 and obtain the address 1106 corresponding to DPID key 1102. In this way, an electronic account system consistent with the present invention can perform periodic address updates and quality control processes on ICRS database 608. Using the DPID key in this embodiment keeps ICRS database 608 up-do-date with having to perform multiple address matching engine processes (as described in FIG. 9).

Figure 11B:
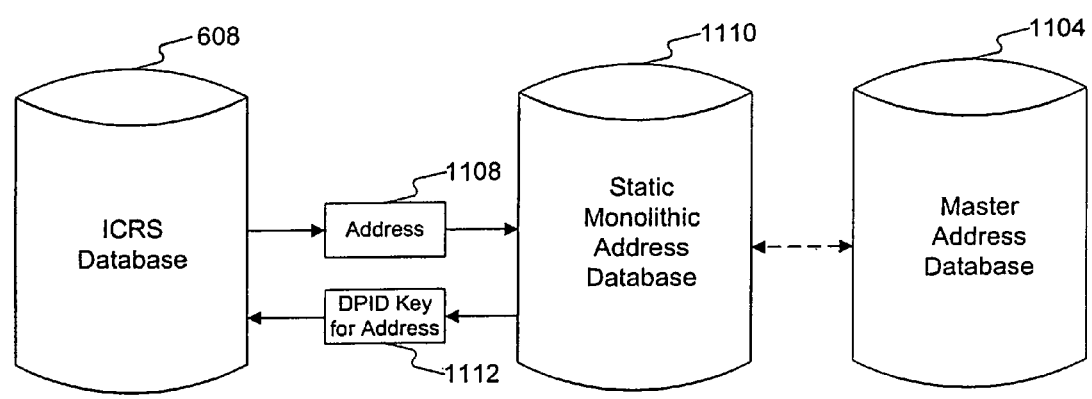
FIG. 11B depicts an alternative embodiment of the relationship between an ICRS database and a master address database.

FIG. 11B depicts an alternative embodiment of the relationship between an ICRS database and a master address database. If ICRS database 608 does not store a DPID key with a customer's electronic account information, it can obtain one by submitting a physical address 1108 to a static monolithic address database 1110. Static monolithic address database 1110 can then use an address matching engine (as described in FIG. 9) to obtain a DPID key 1112 from master address database 1104. DPID key 1112 is then returned to ICRS database 608.

Figure 11C:
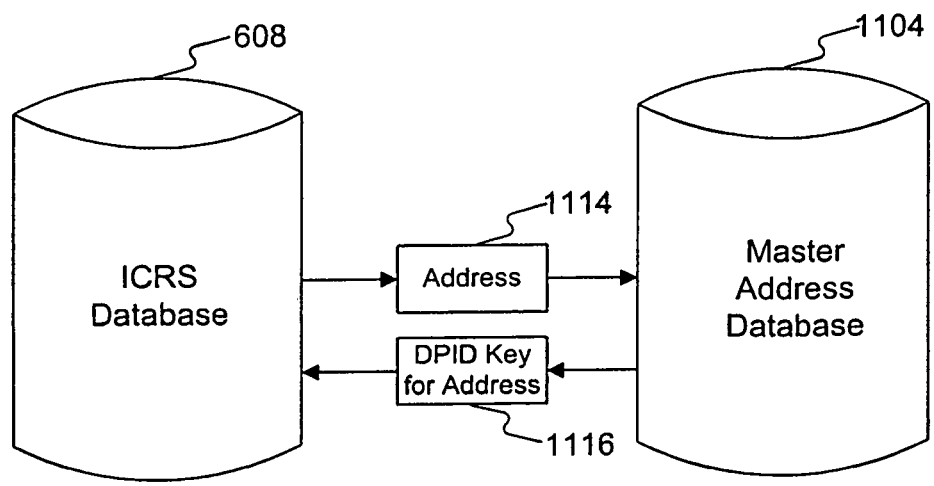
FIG. 11C depicts another alternative embodiment of the relationship between an ICRS database and a master address database.

FIG. 11C depicts another alternative embodiment of the relationship between an ICRS database and a master address database. If ICRS database 608 does not store a DPID key with a customer's electronic account information, it can send a physical address 1114 directly to master address database 1104. DPID key 1116 is then returned to ICRS database 608.

3. Services Based on Internet Customer Registration System

Figure 12:
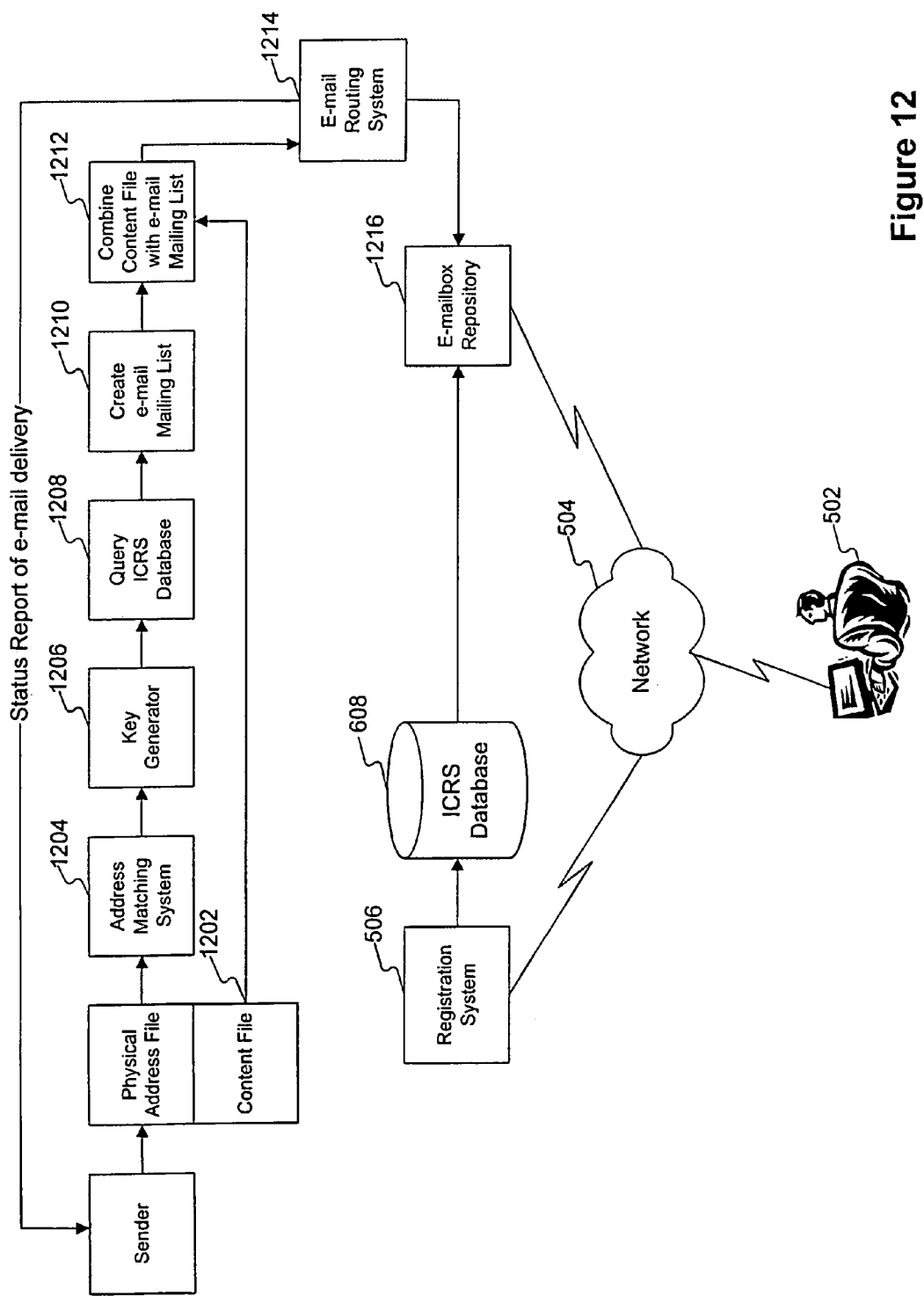
FIG. 12 is a block diagram of a bulk mailing service using an Internet customer registration system consistent with the present invention.

FIG. 12 is a block diagram of a bulk mailing service using an Internet customer registration system consistent with the present invention. As described above, customer 502 uses a computer to access registration system 506 via network 504. Registration system 506 includes ICRS database 608, which can be accessed by an e-mailbox repository 1210 to provide e-mail services to customer 502. A sender wishing to communicate with a plurality of customers having electronic accounts can submit a file 1202 containing a physical address file and a content file. The physical address file can be, for example, a mailing list, and the content file can be, for example, an advertisement.

The physical address file is processed in an address matching system 1204 as described above to obtain standardized physical addresses for the customers. The standardized physical addresses are processed by a key generator 1206 to obtain keys for accessing ICRS database 608. Using keys created by key generator 1206, ICRS database 608 is queried at 1208 to create an e-mail address mailing list 1210 corresponding to the physical address file. The content file is combined with e-mail address mailing list 1210 to facilitate an electronic mailing 1212. Electronic mailing 1212 is sent to an e-mail routing system 1214 that sends electronic mailing 1212 to e-mailbox repository 1216 for delivery to the plurality of customers. E-mail routing system 1214 may also provide a status report of e-mail delivery to the sender that provided file 1202.

Figure 13:
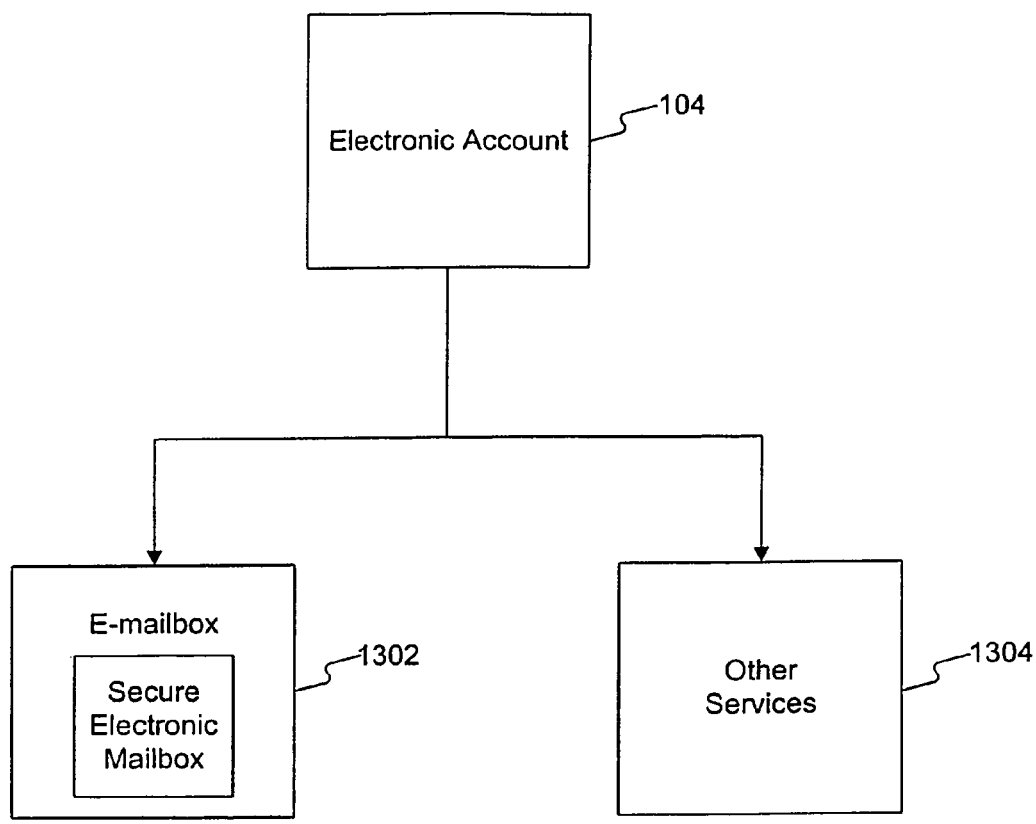
FIG. 13 is a block diagram of services using a customer registration system consistent with the present invention.

FIG. 13 is a block diagram of services using a customer registration system consistent with the present invention. Electronic account 104 and registration system 506 can enable customers to access an electronic mailbox (or e-mailbox) service 1302 and other services 1304 such as mailing online, electronic bill presentment and payment, etc. Electronic mailbox services 1302 can include a secure electronic mailbox, described in more detail below.

Figure 14:
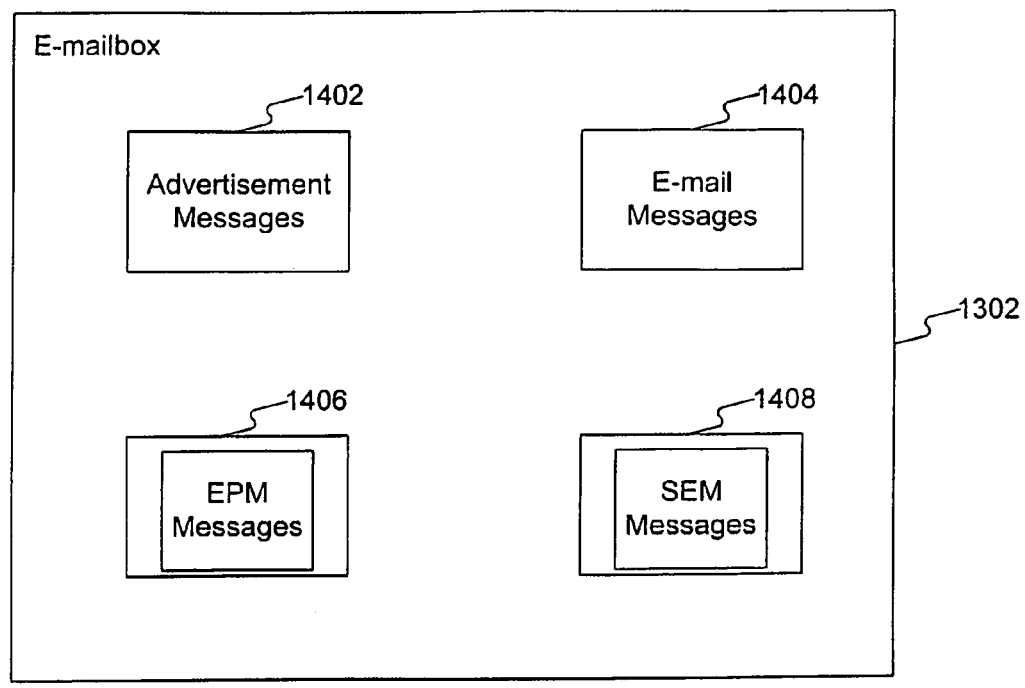
FIG. 14 is a block diagram of services that can be provided as part of an electronic mailbox consistent with the present invention.

FIG. 14 is a block diagram of services that can be provided as part of an electronic mailbox consistent with the present invention. E-mailbox service 1302 can receive and store different types of messages, including advertisement messages 1402, e-mail messages 1404, electronic postmark (EPM) messages 1406, and secure electronic mailbox (SEM) messages 1408. Other types of messages could also be received and stored consistent with the present invention. In one embodiment, some types of messages, such as EPM messages and SEM messages can be accessed only via a password or a digital certificate key. In this way, the customer can select different levels of security for different types of messages.

Figure 15:
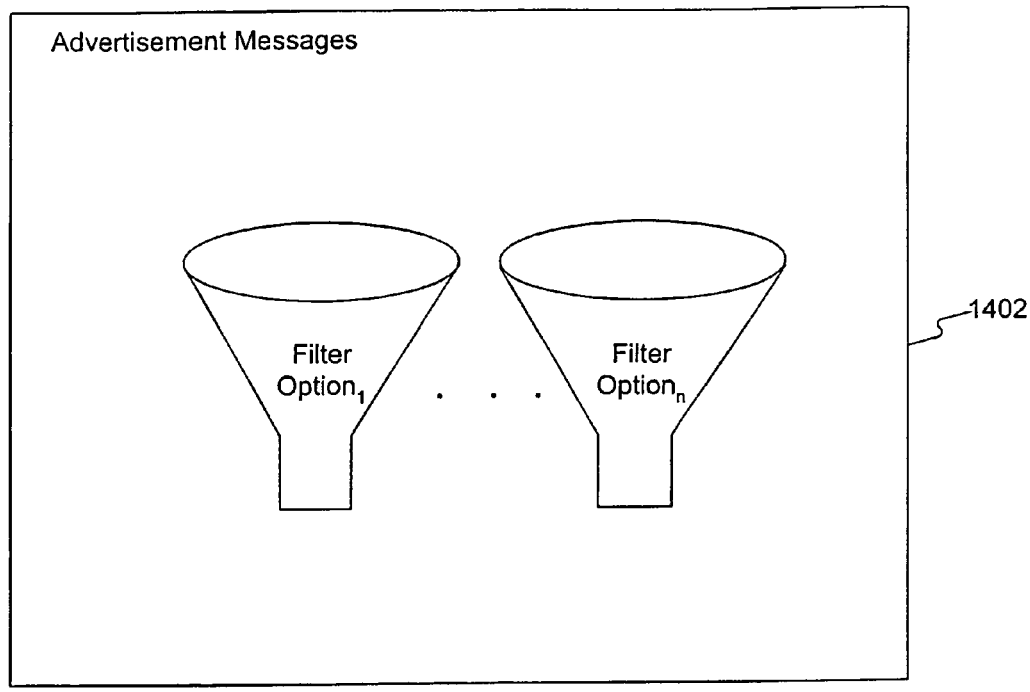
FIG. 15 is a block diagram of an advertisement filtering service that can be provided as part of an electronic mailbox consistent with the present invention.

FIG. 15 is a block diagram of an advertisement filtering service that can be provided as part of an electronic mailbox consistent with the present invention. Advertisement messages 1402 could be filtered according to the customer's preferences. A customer could specify certain types or categories of advertisement messages to be accepted by the e-mailbox. For example, a customer may wish to receive advertisement messages from automobile companies but no others or to receive no advertisements at all.

Figure 16:
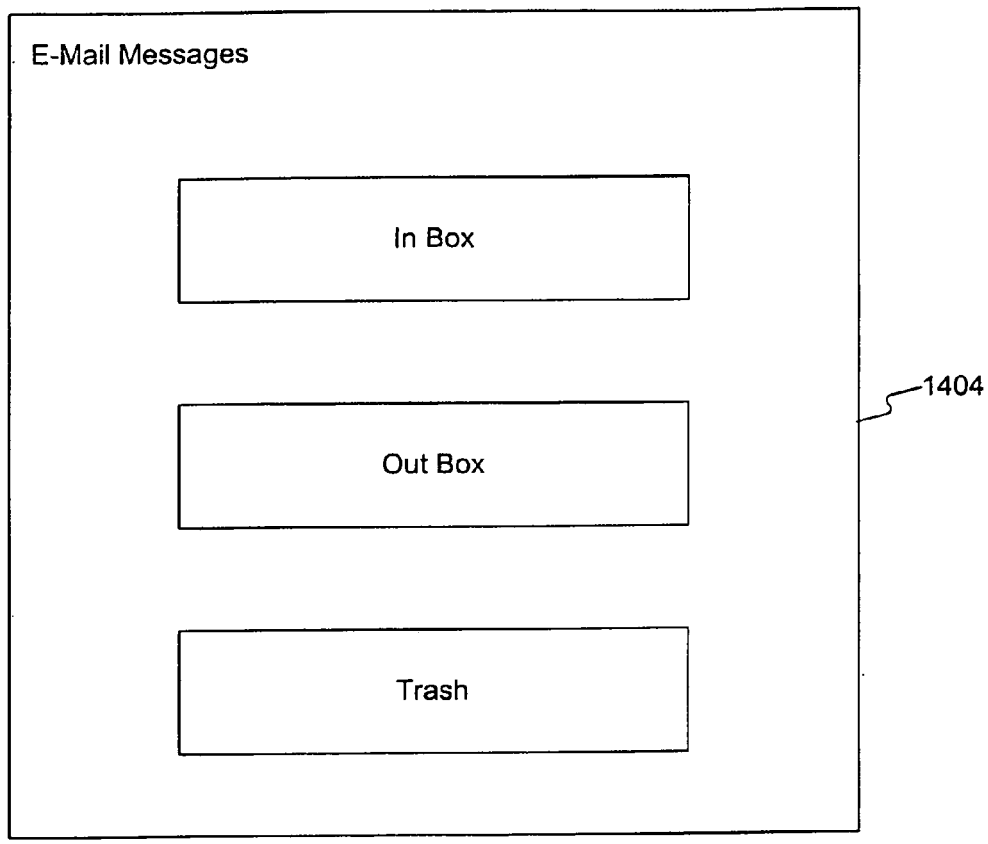
FIG. 16 is a block diagram of an e-mail service that can be provided as part of an electronic mailbox consistent with the present invention.

FIG. 16 is a block diagram of an e-mail service that can be provided as part of an electronic mailbox consistent with the present invention. Conventional e-mail messages can be received and stored in e-mail message section 1404 of e-mailbox 1302. E-mail message section 1404 can include an in-box, out-box, and trash section as found in conventional e-mail systems.

Figure 17:
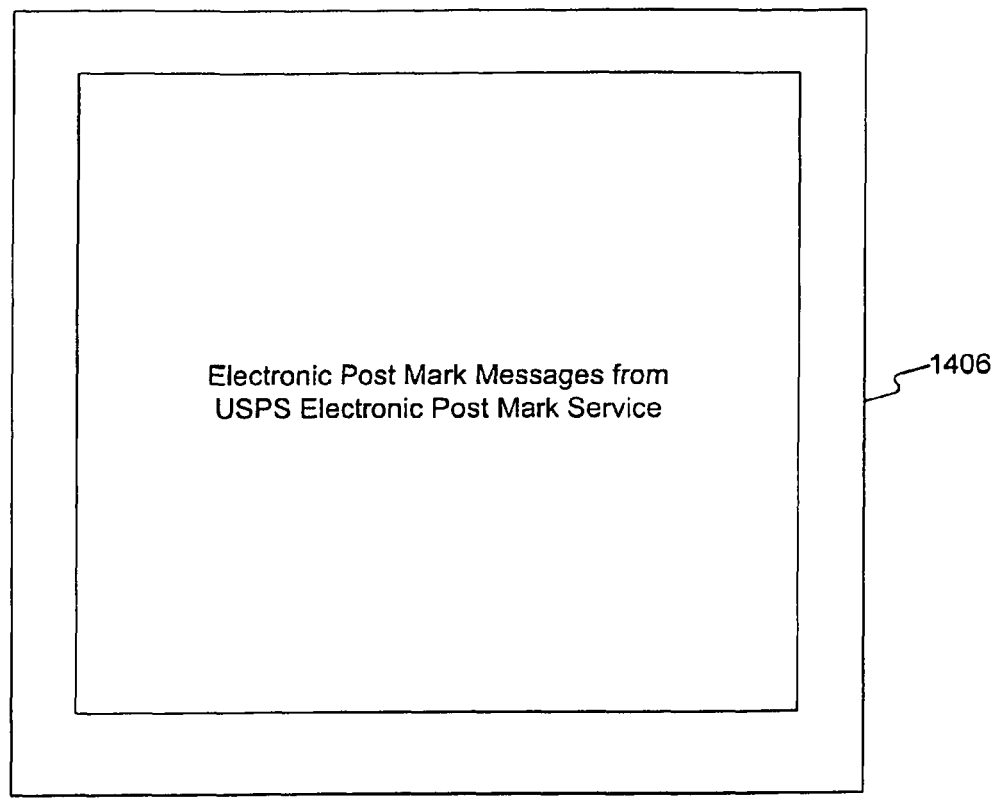
FIG. 17 is a block diagram of an electronic postmark service that can be provided as part of an electronic mailbox consistent with the present invention.

FIG. 17 is a block diagram of an electronic postmark service that can be provided as part of an electronic mailbox consistent with the present invention. An electronic postmark service is described in U.S. patent application Ser. No. 09/675,677 entitled Systems and Methods for Authenticating an Electronic Message, filed on Sep. 29, 2000 and incorporated herein by reference.

Figure 18:
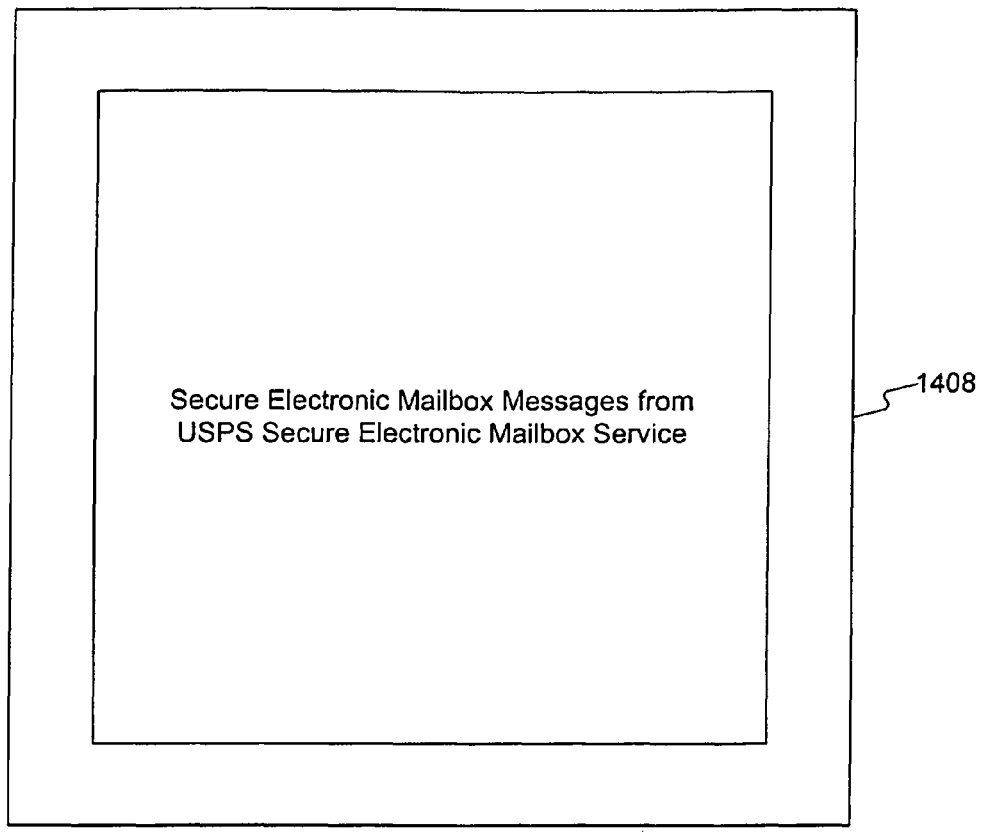
FIG. 18 is a block diagram of a secure electronic mailbox that can be provided as part of an electronic mailbox consistent with the present invention.

FIG. 18 is a block diagram of a secure electronic mailbox that can be provided as part of an electronic mailbox consistent with the present invention. The secure electronic mailbox service is described in more detail below with reference to FIG. 20.

4. User Interfaces for Internet Customer Registration System

Figure 19A:
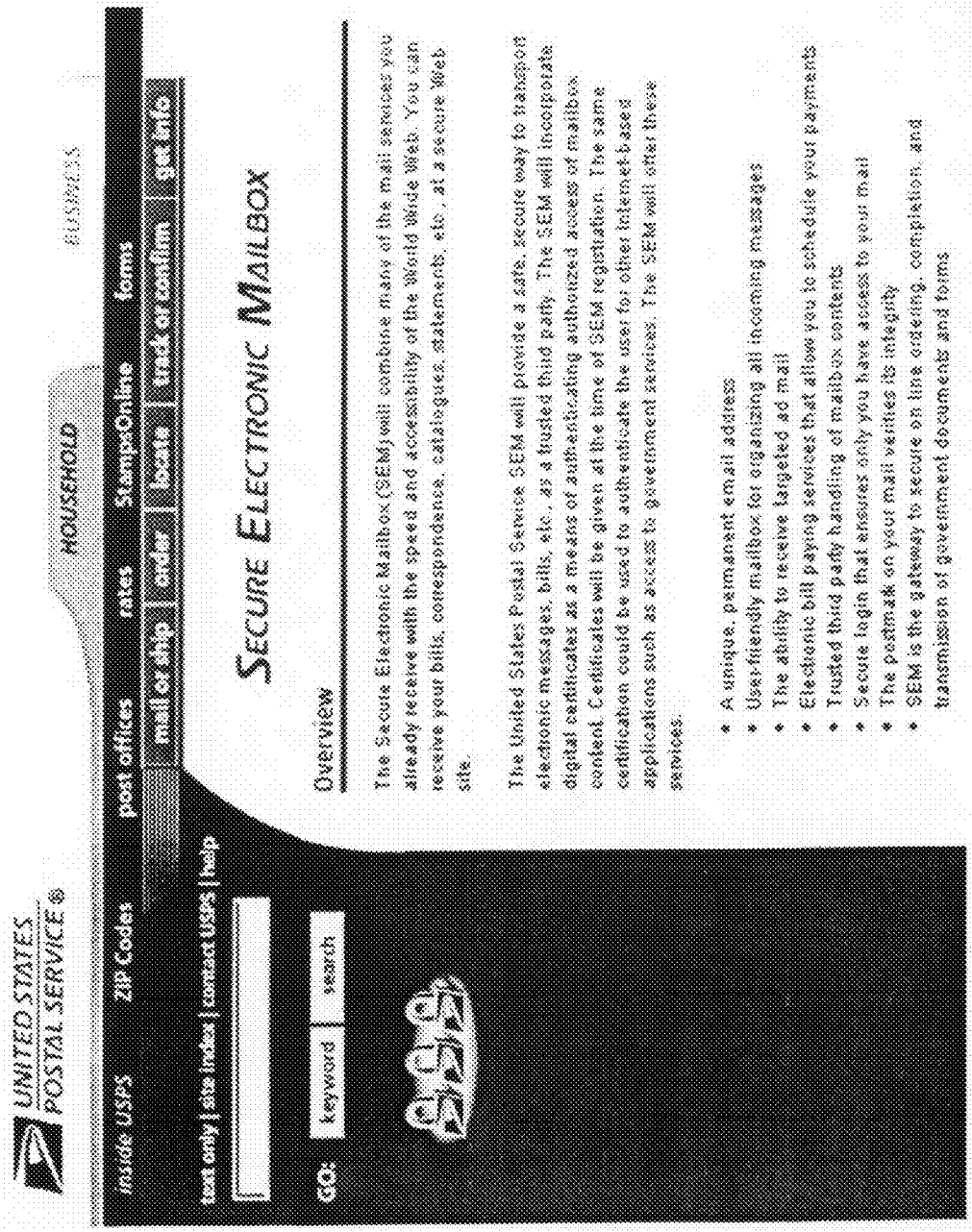
FIGS. 19A-19W are screen shots of a user interface for a registration system consistent with the present invention.
Figure 19B:
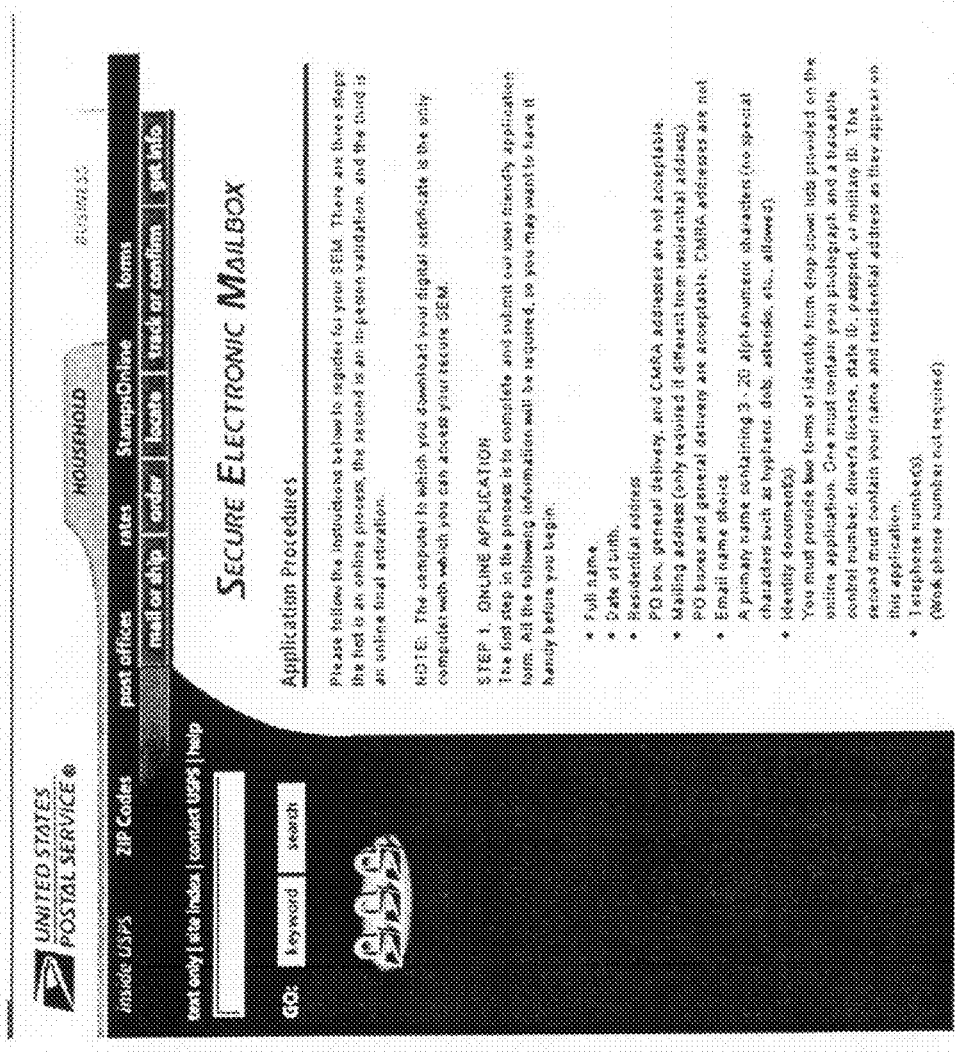
Figure 19C:
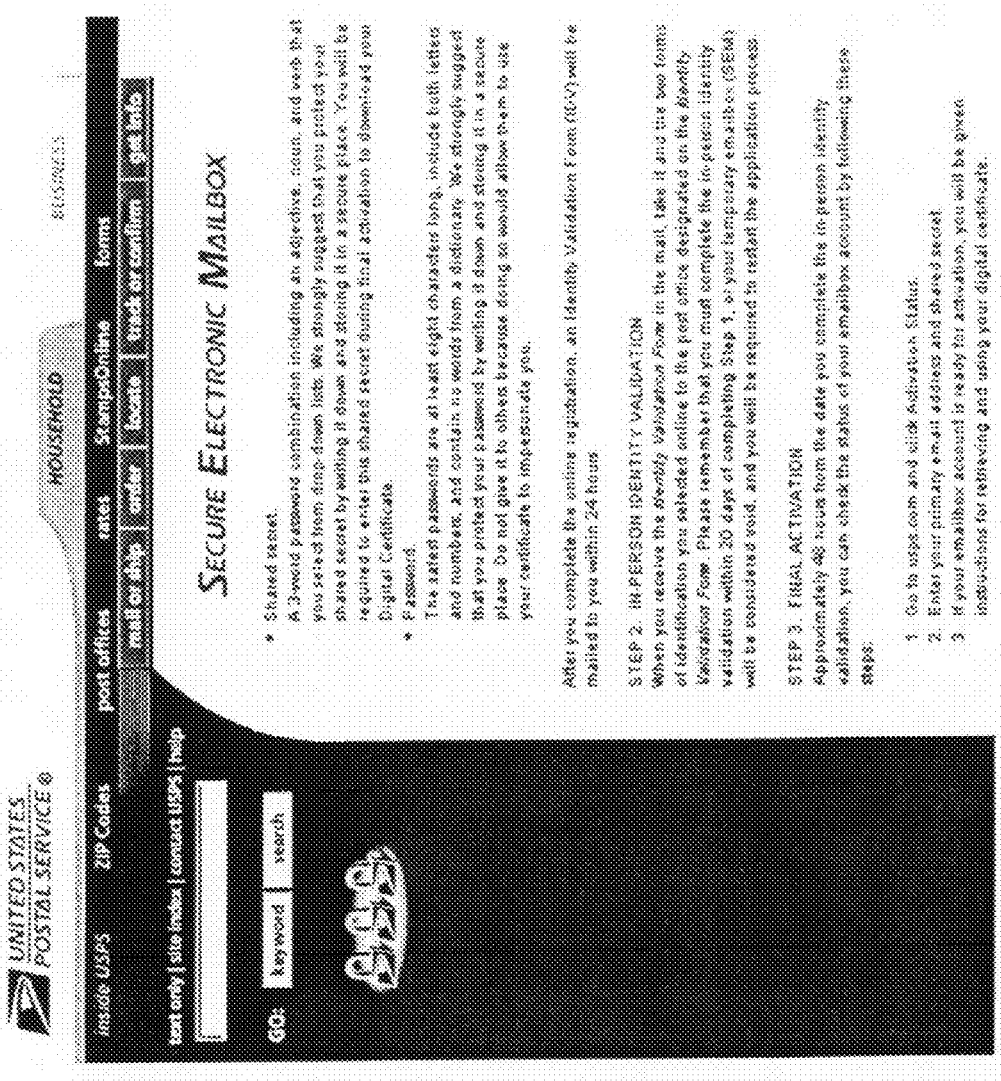
Figure 19D:
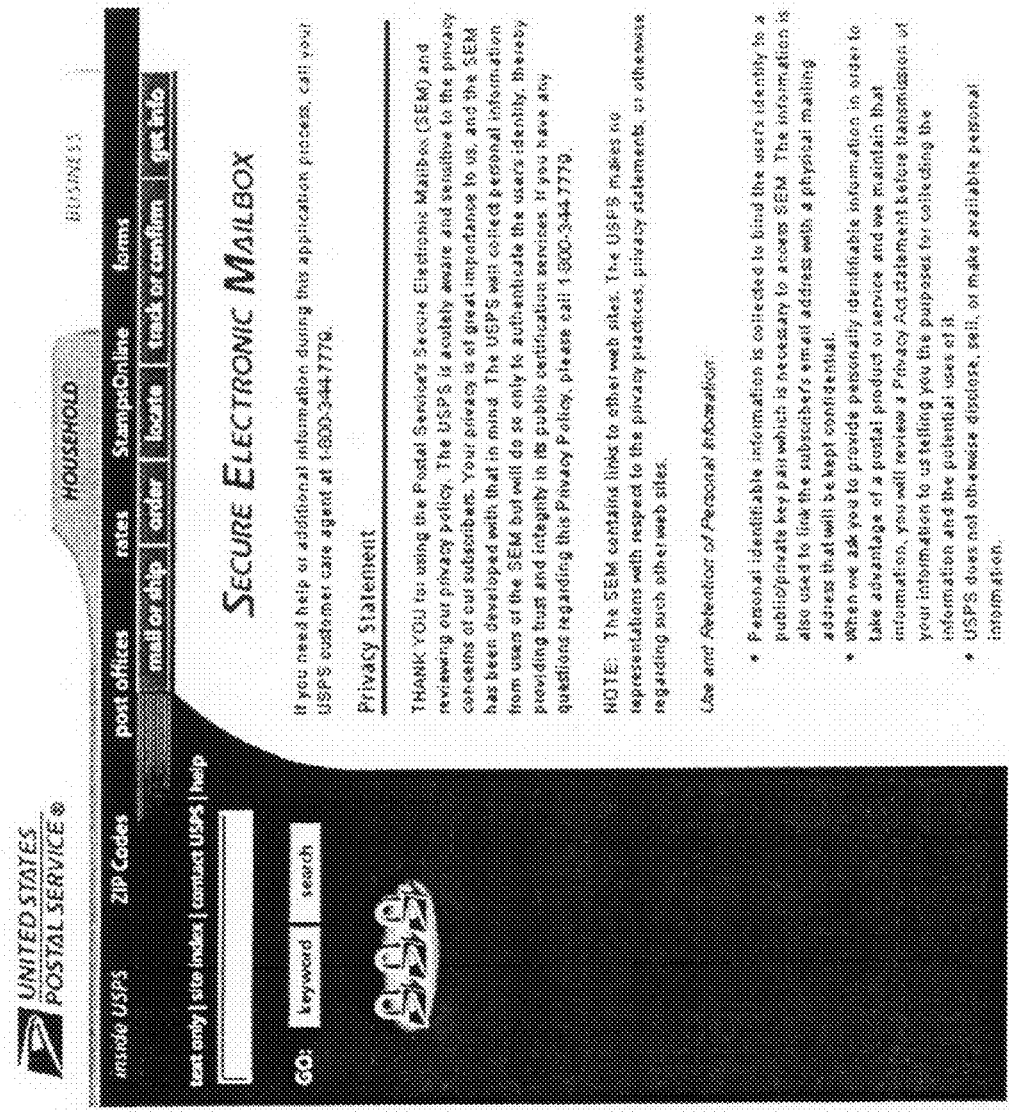
Figure 19E:
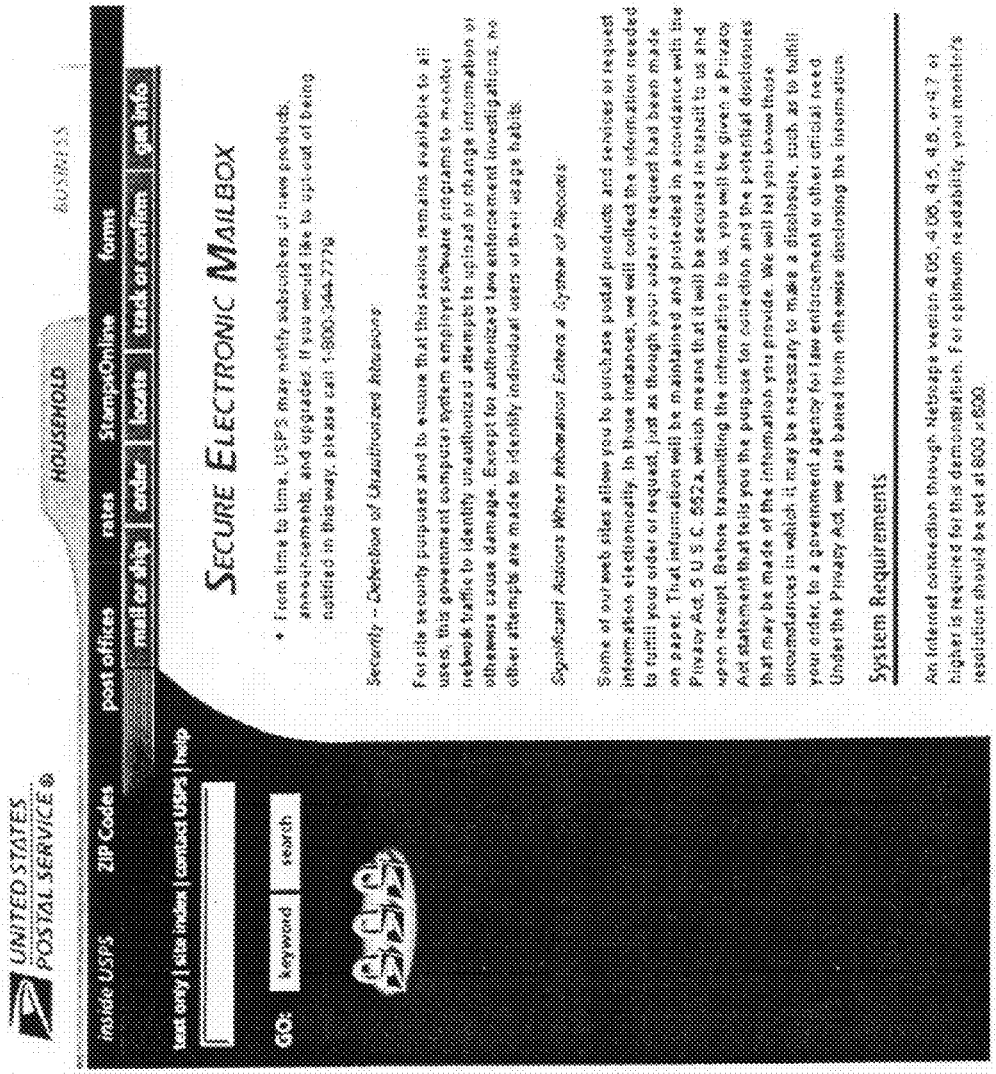
Figure 19F:
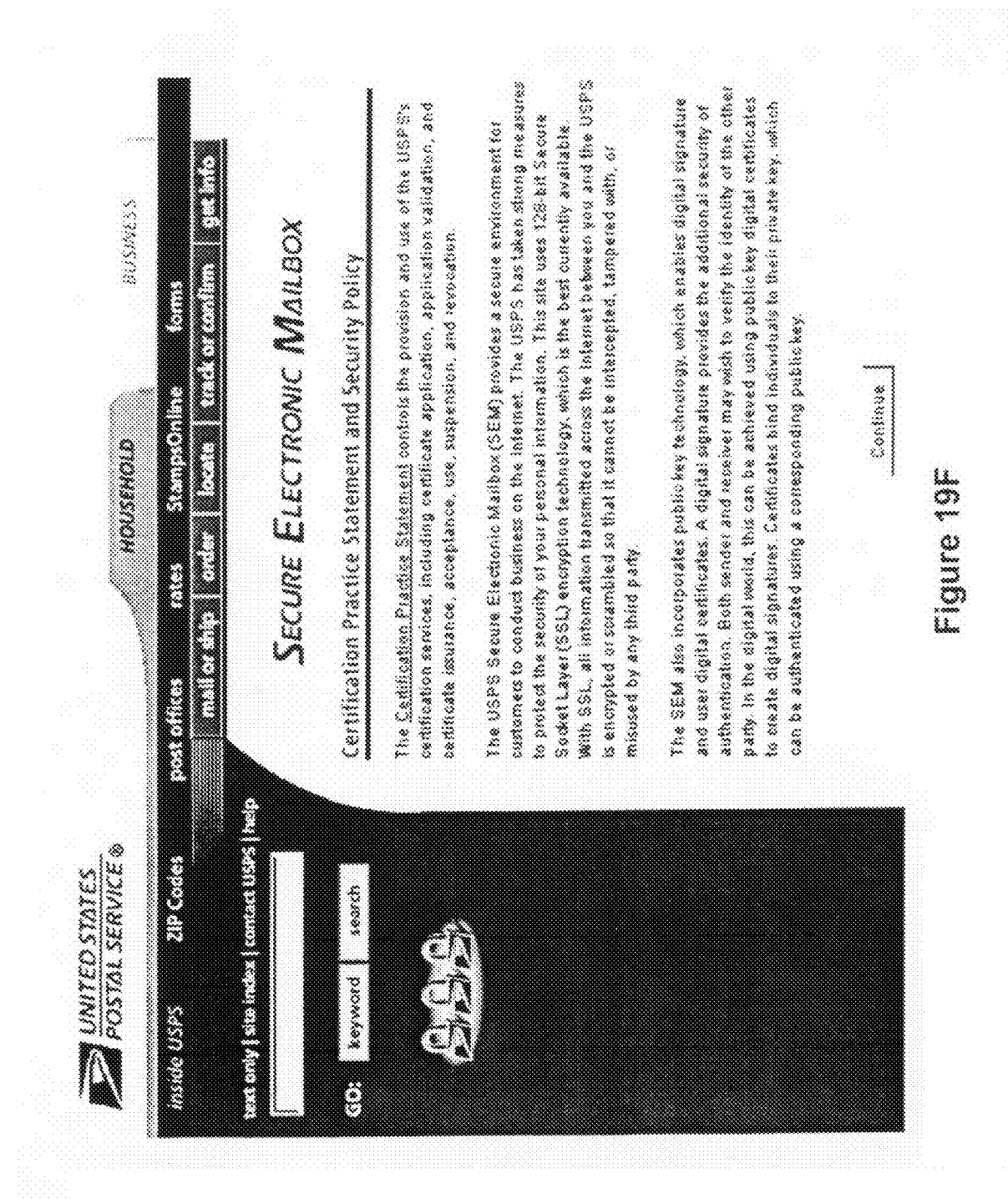
Figure 19G:
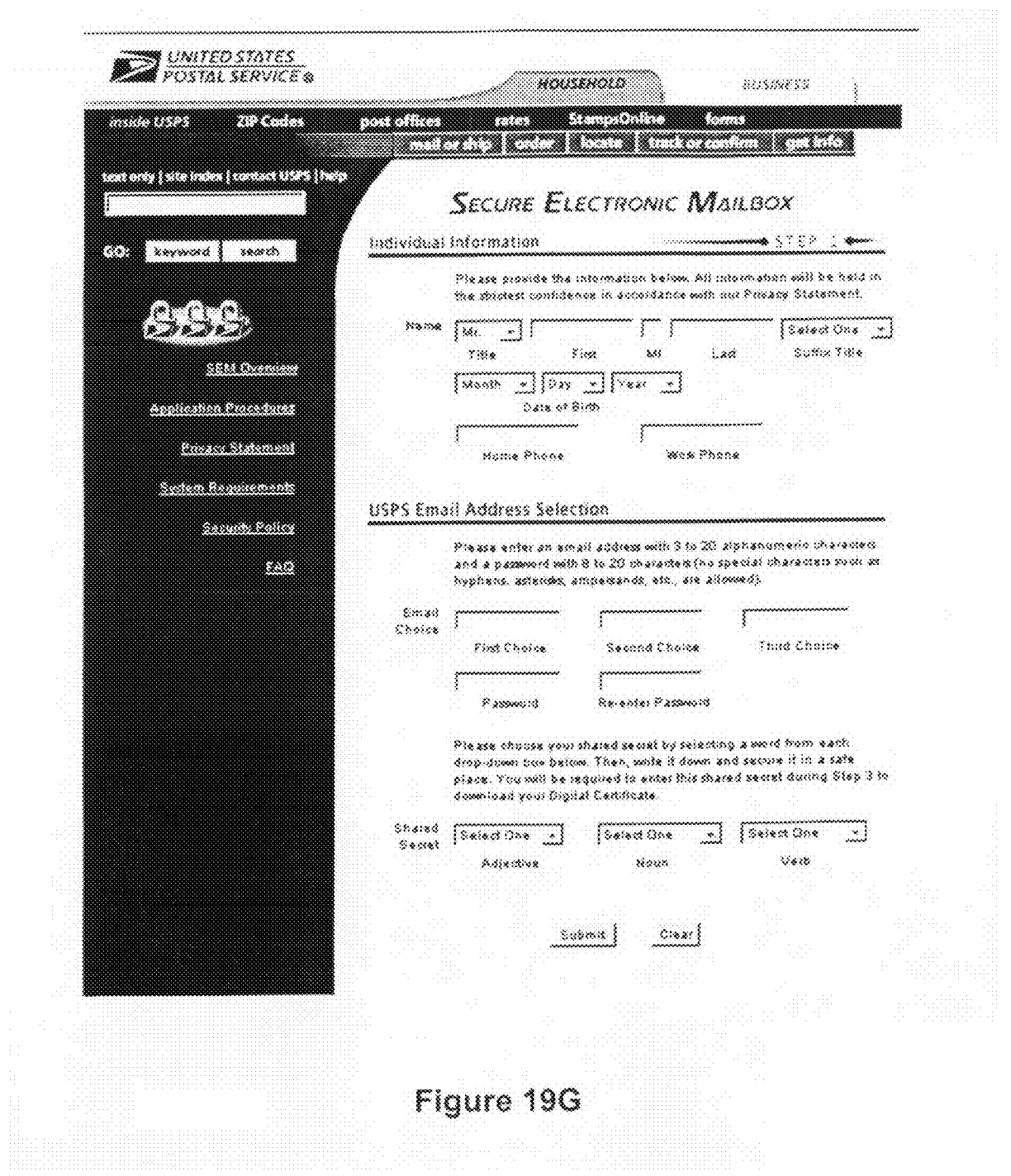
Figure 19H:
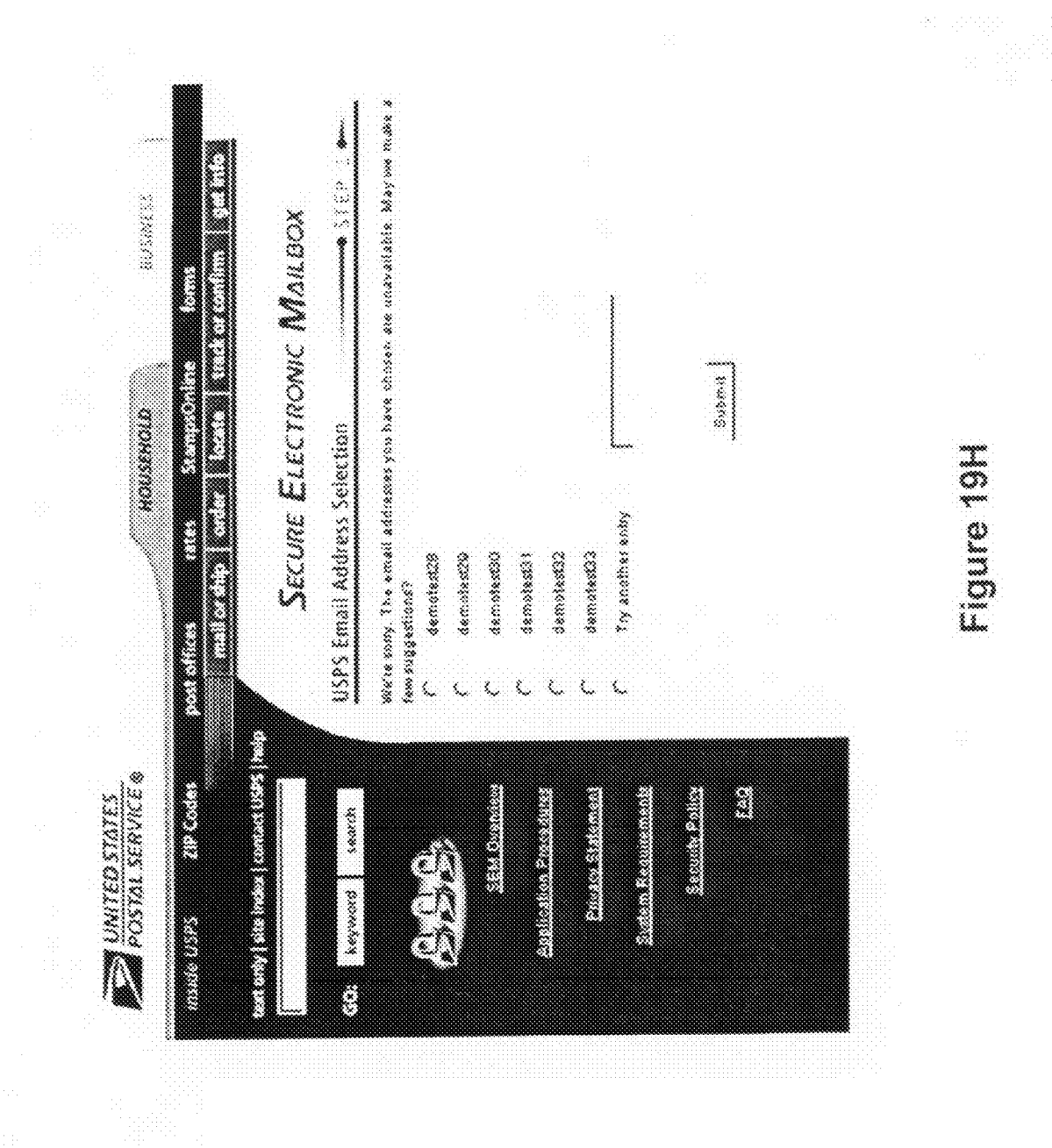
Figure 19I:
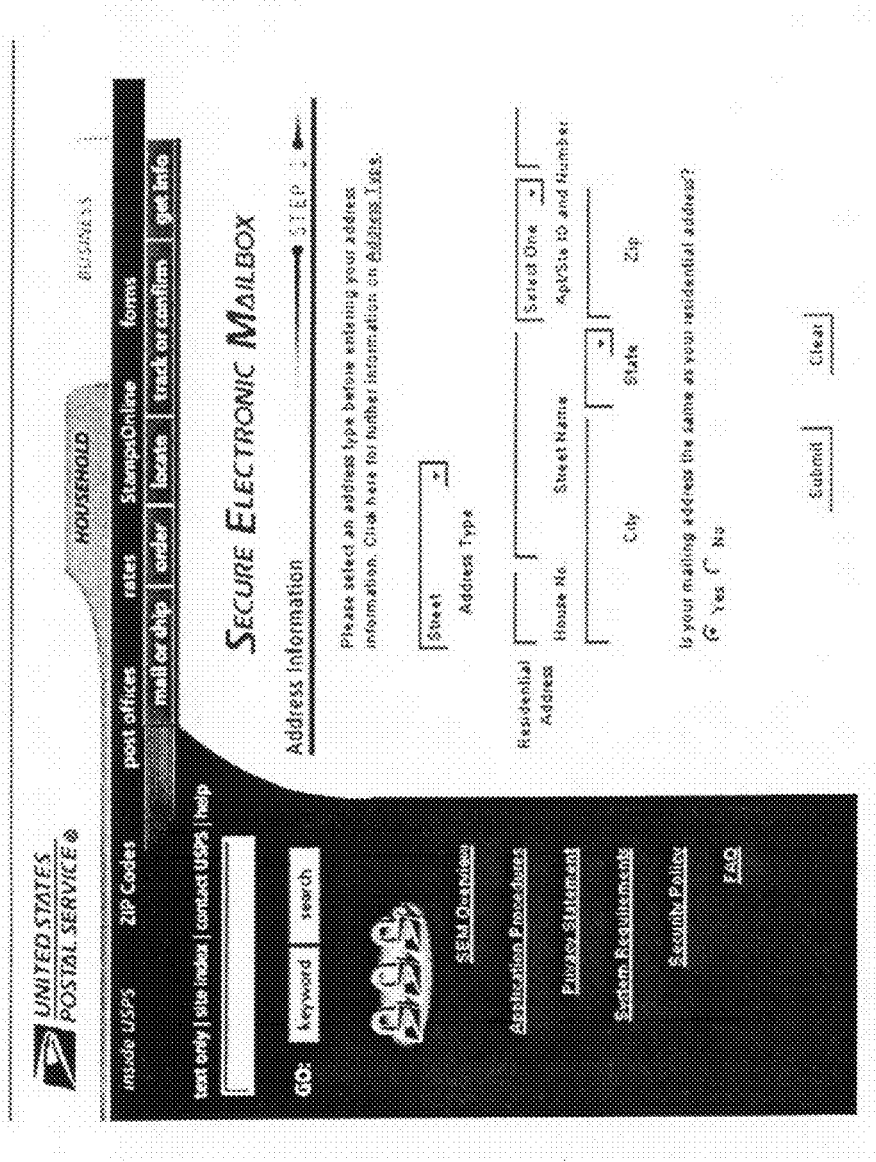
Figure 19J:
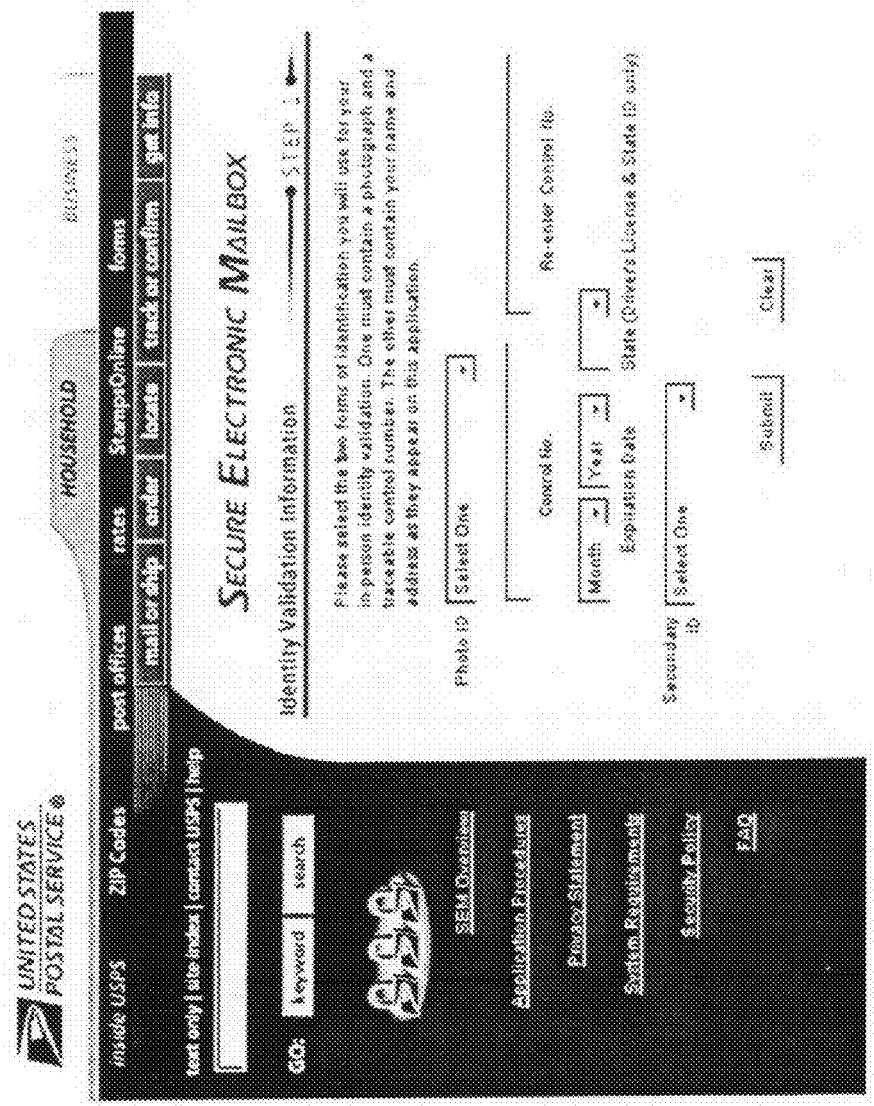
Figure 19K:
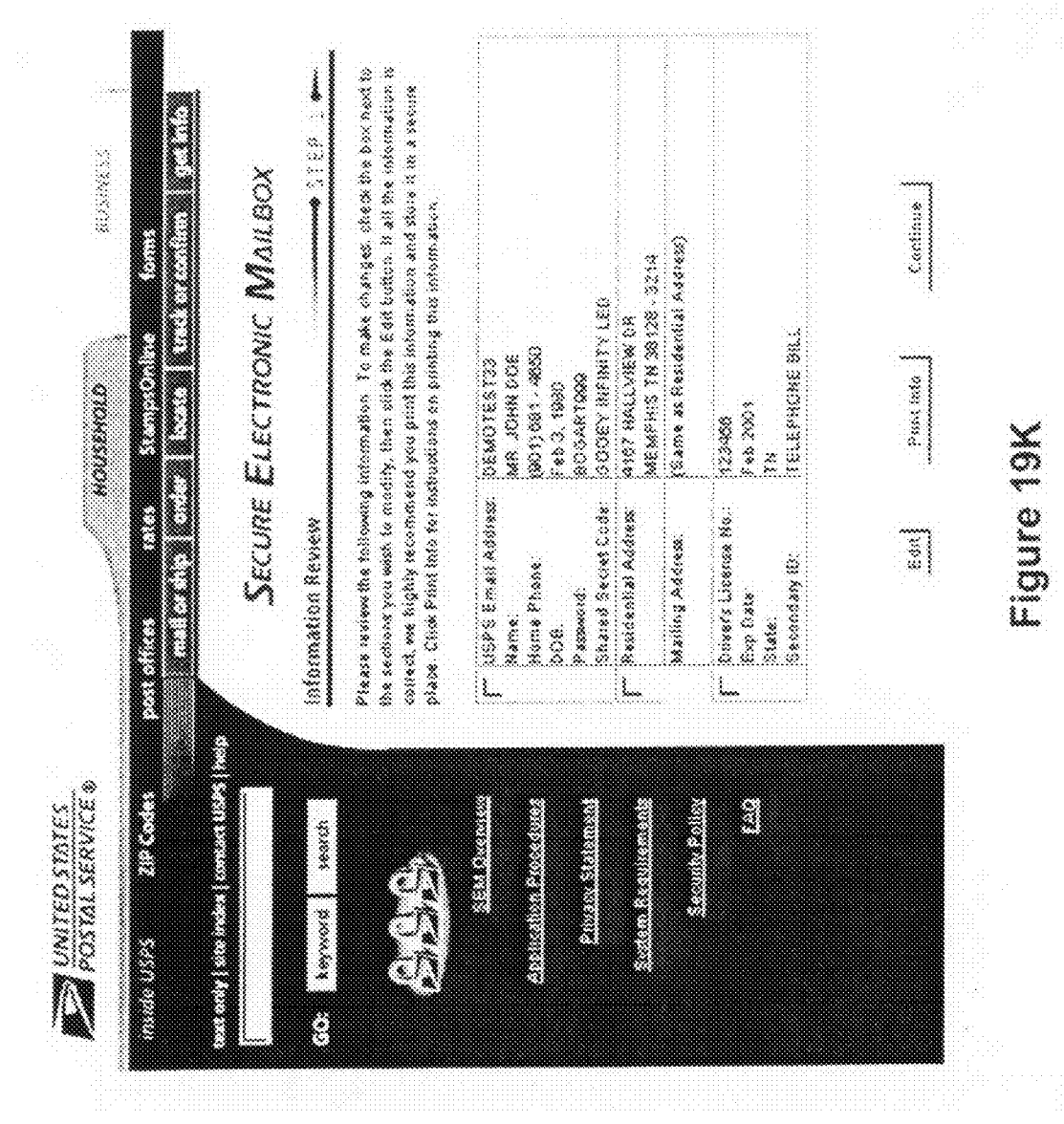
Figure 19L:
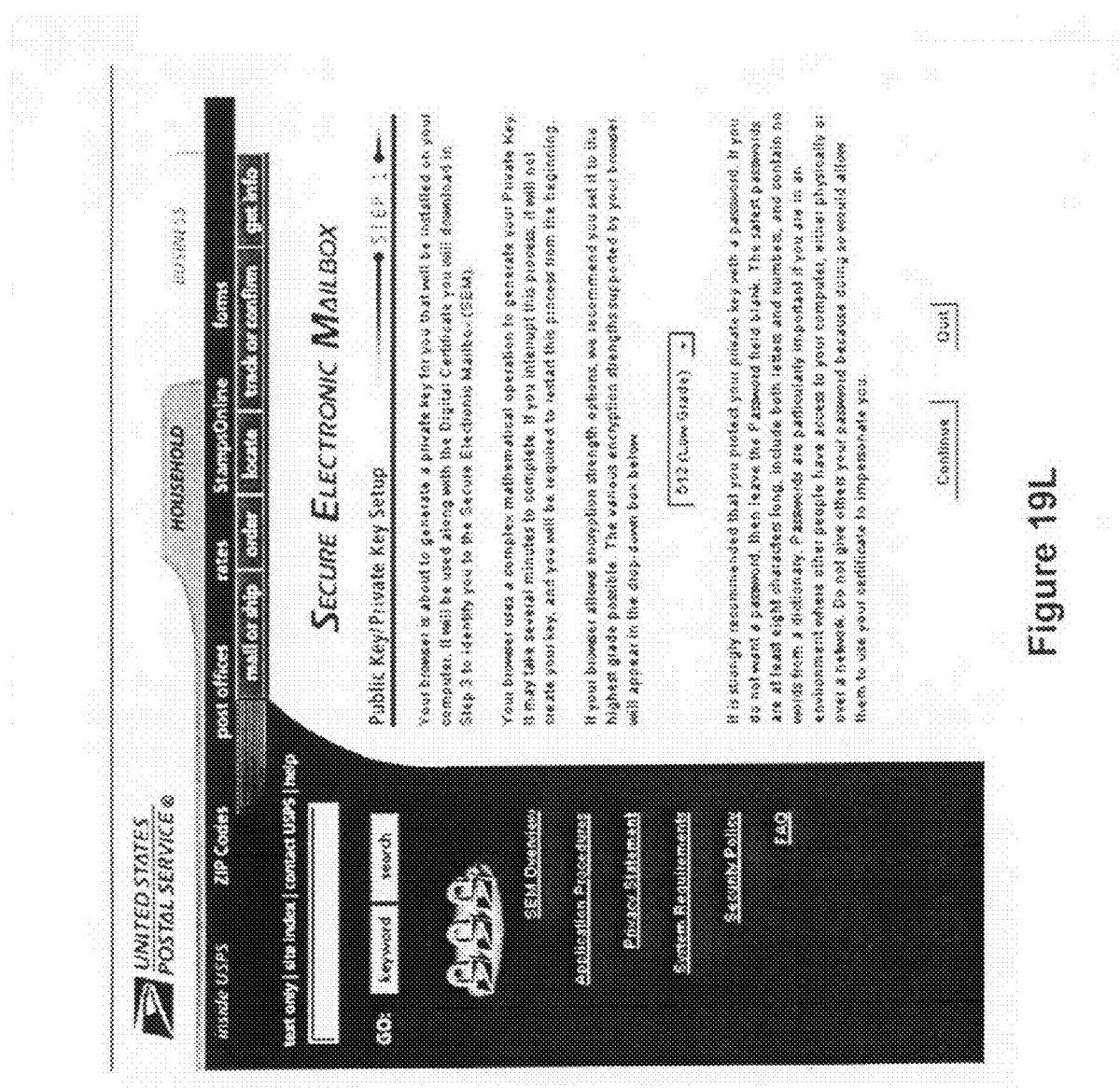
Figure 19M:
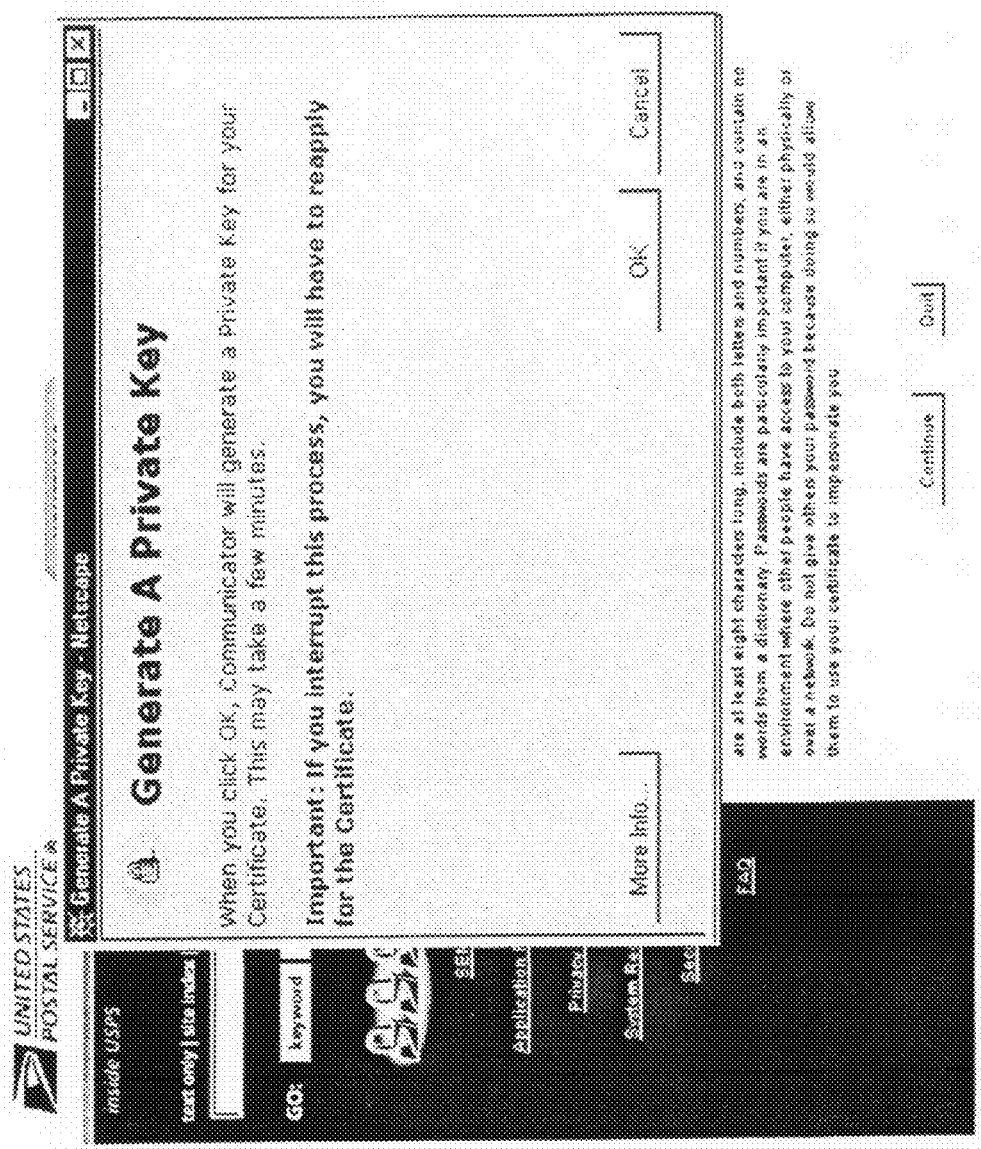
Figure 19N:
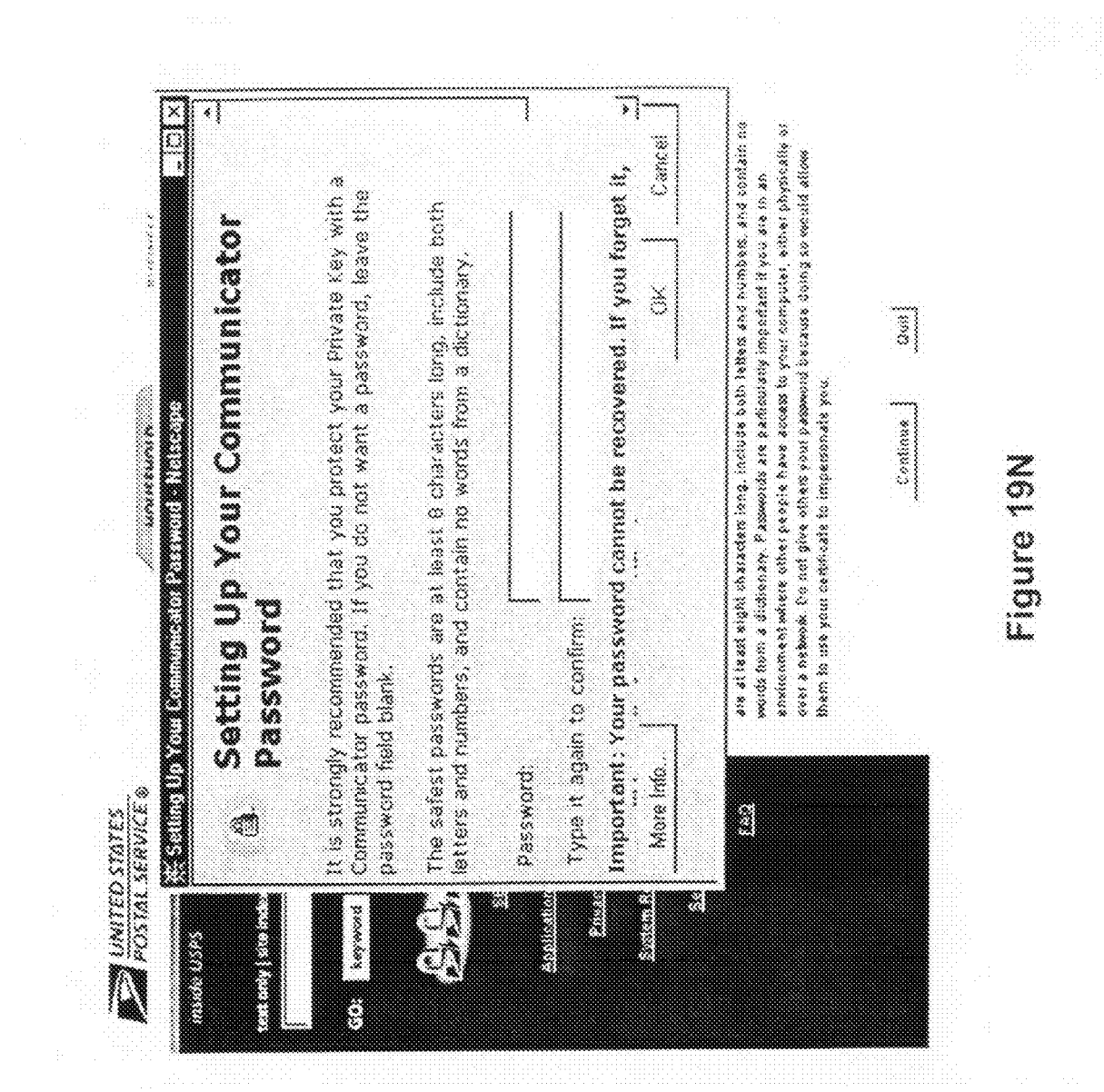
Figure 19O:
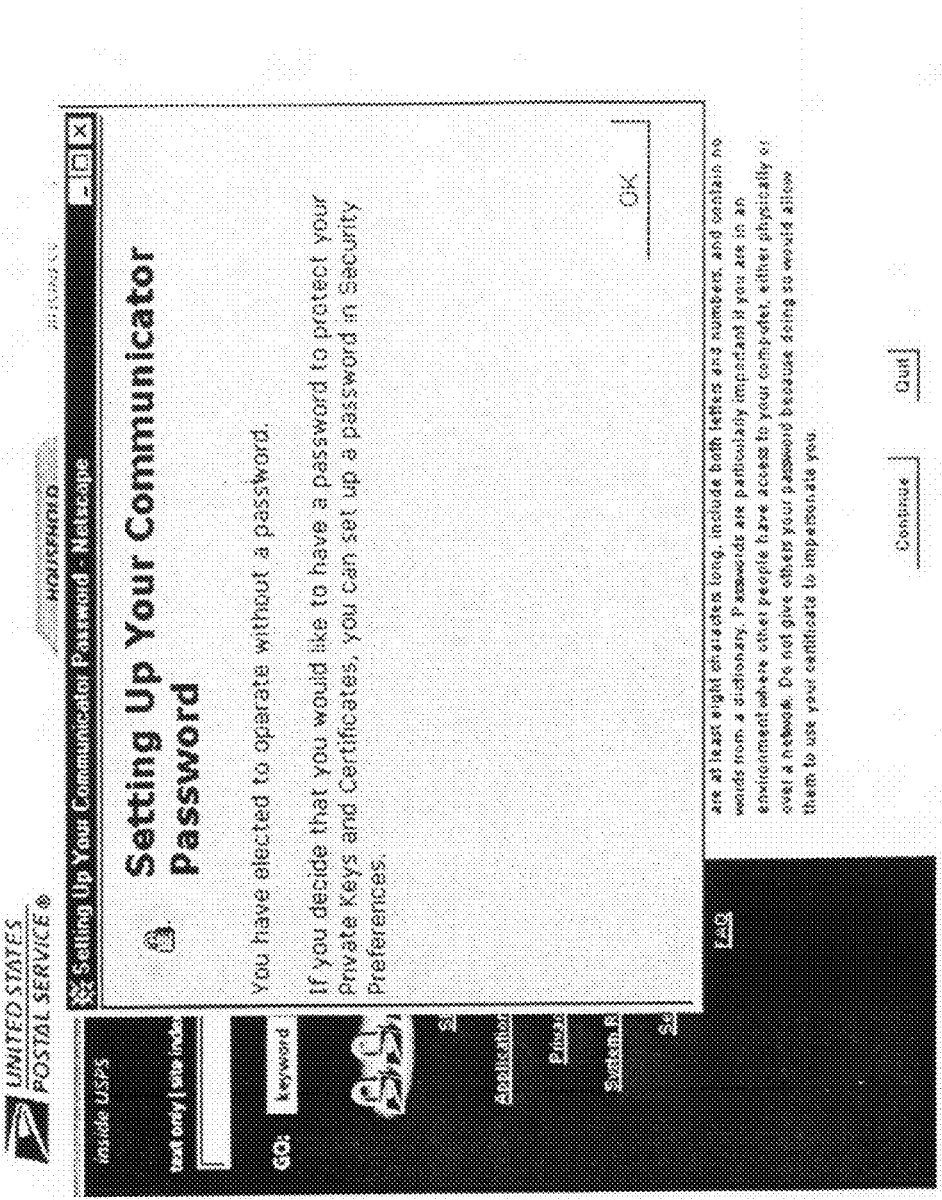
Figure 19P:
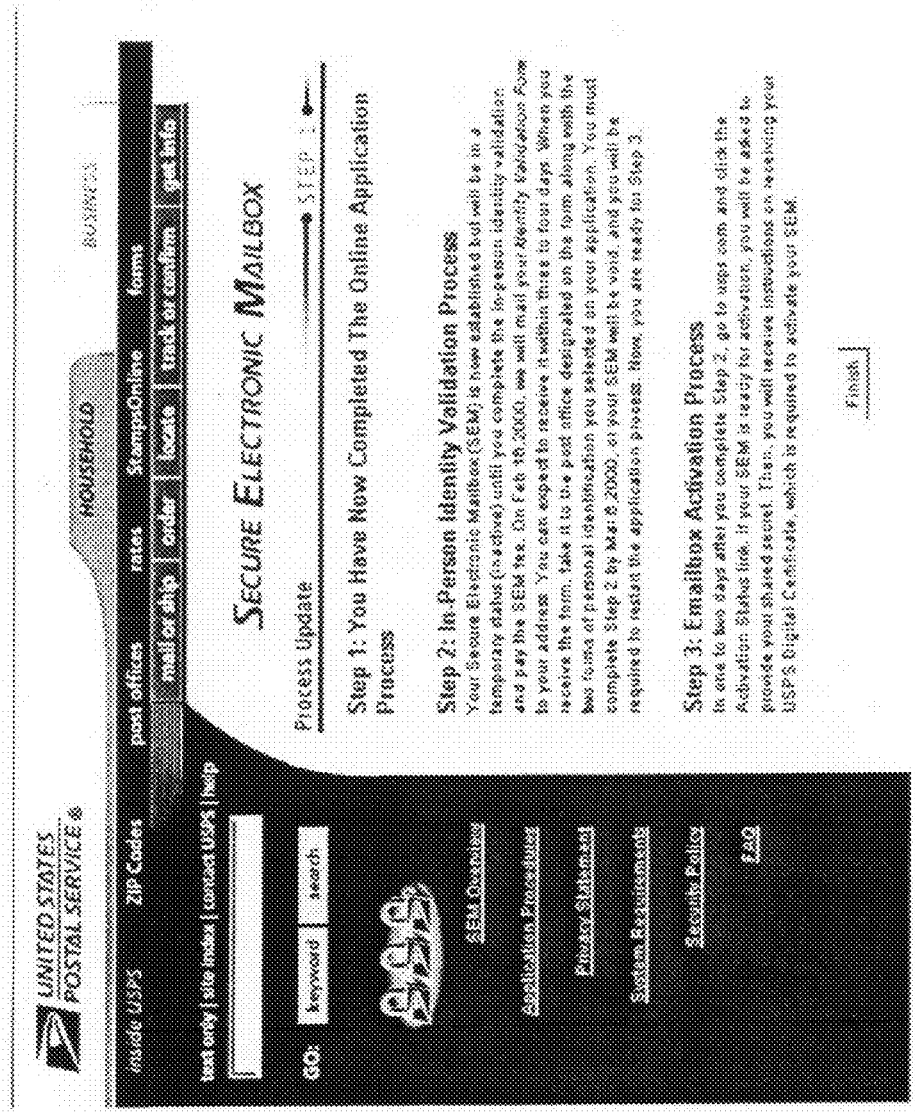
Figure 19Q:
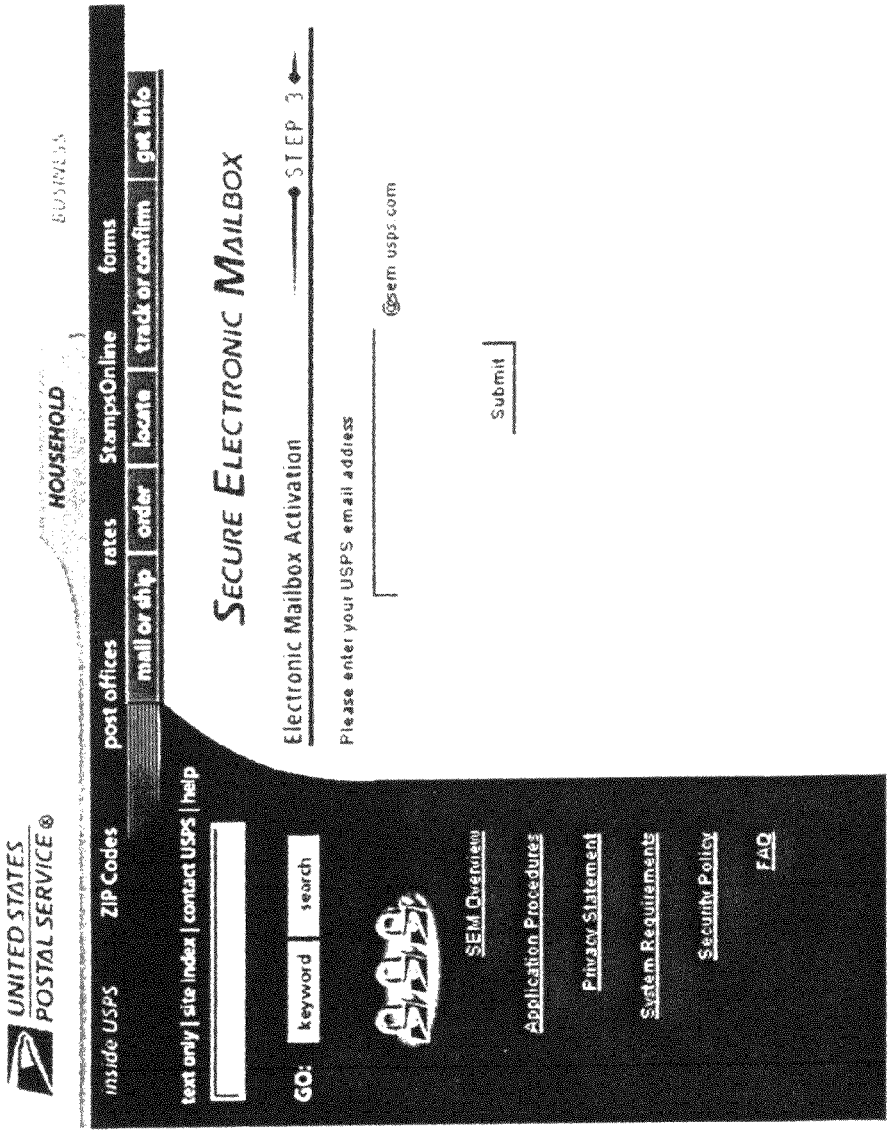
Figure 19R:
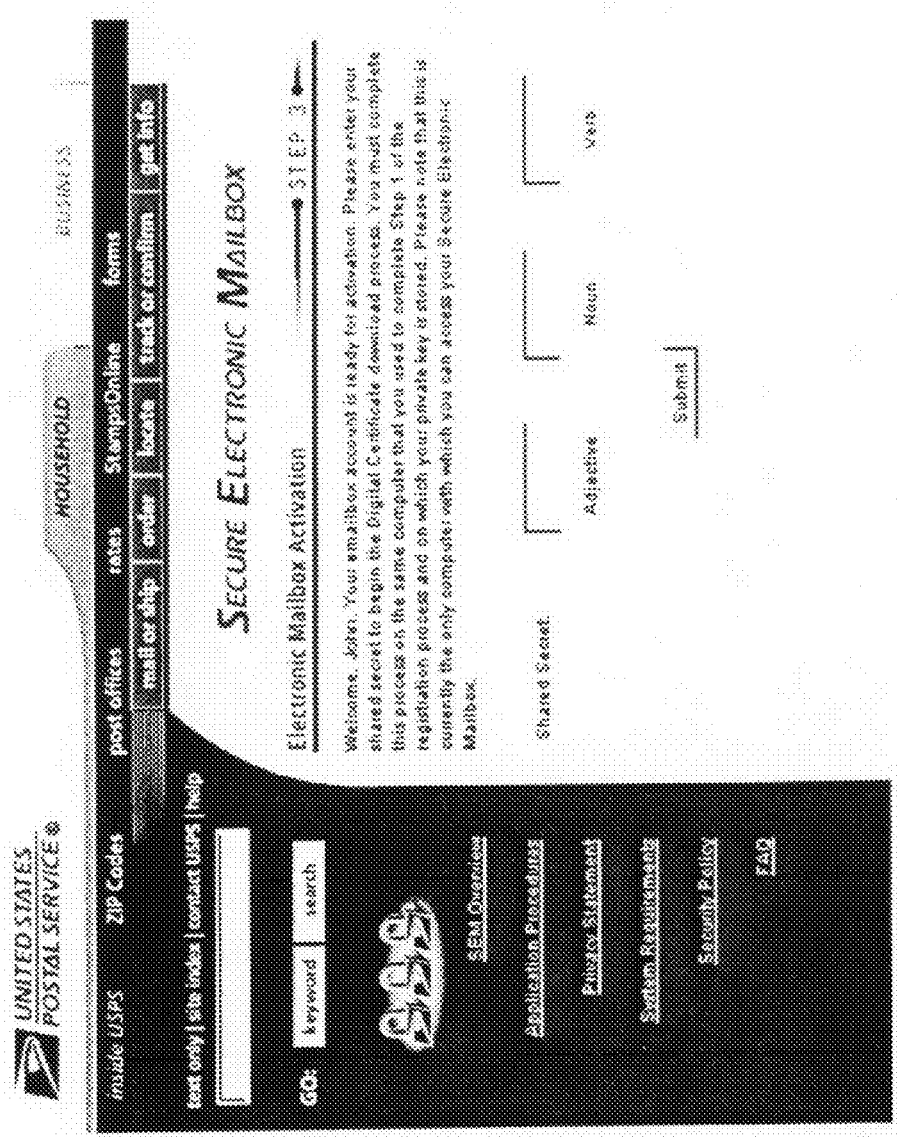
Figure 19S:
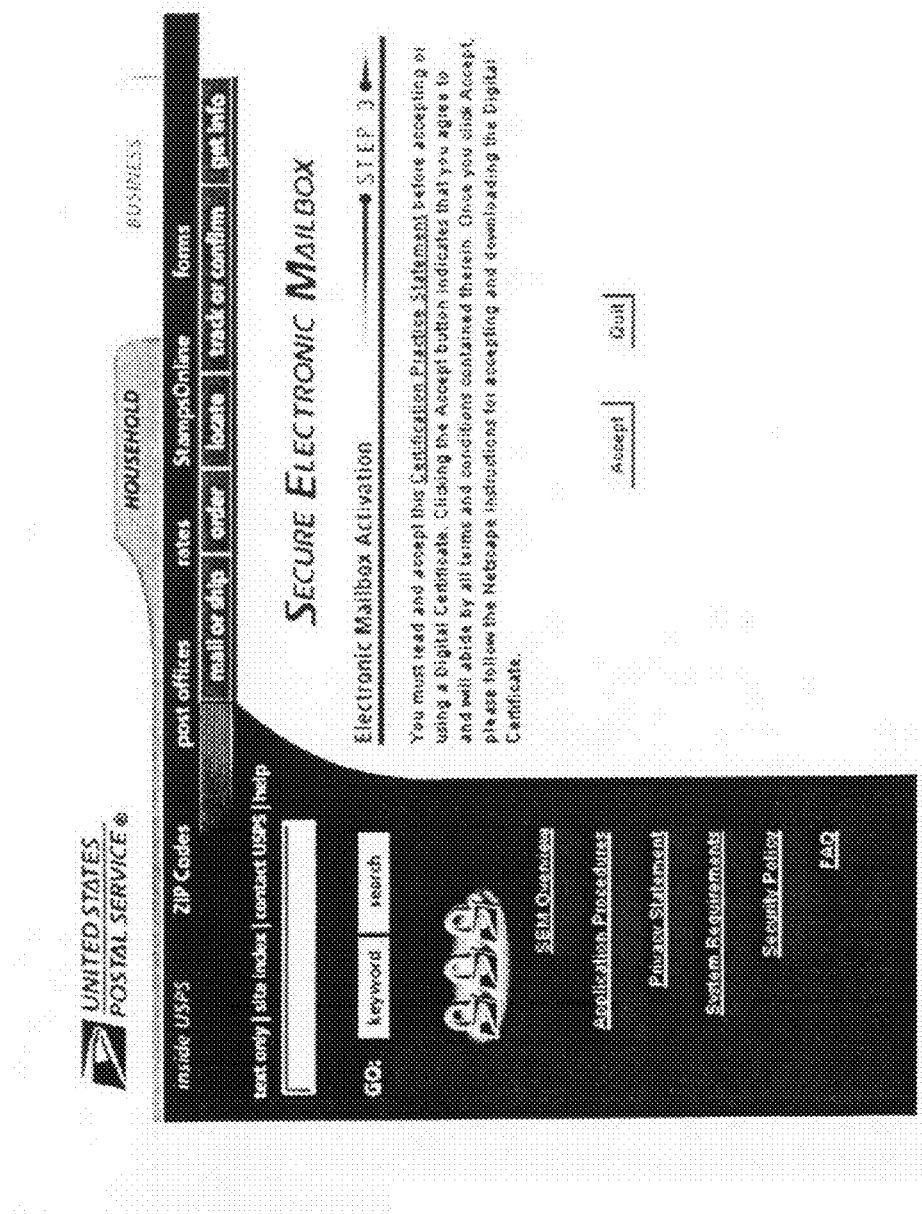
Figure 19T:
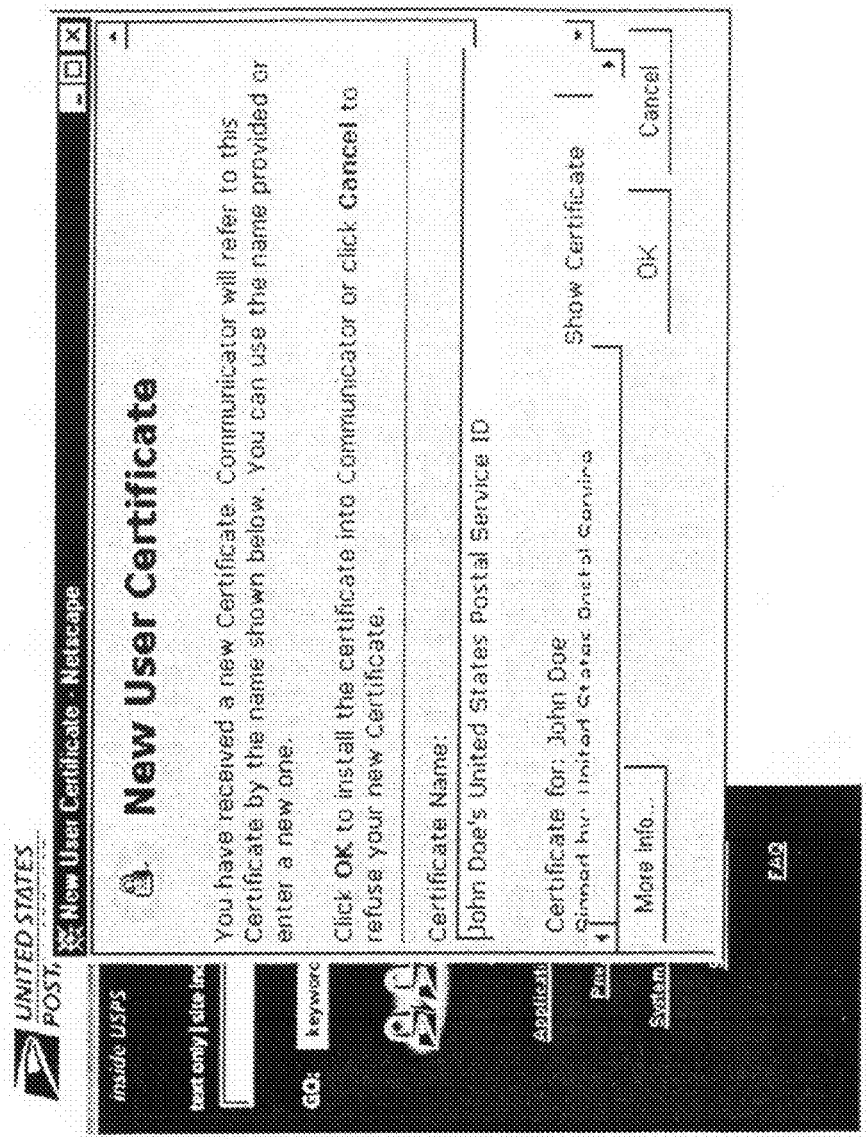
Figure 19U:
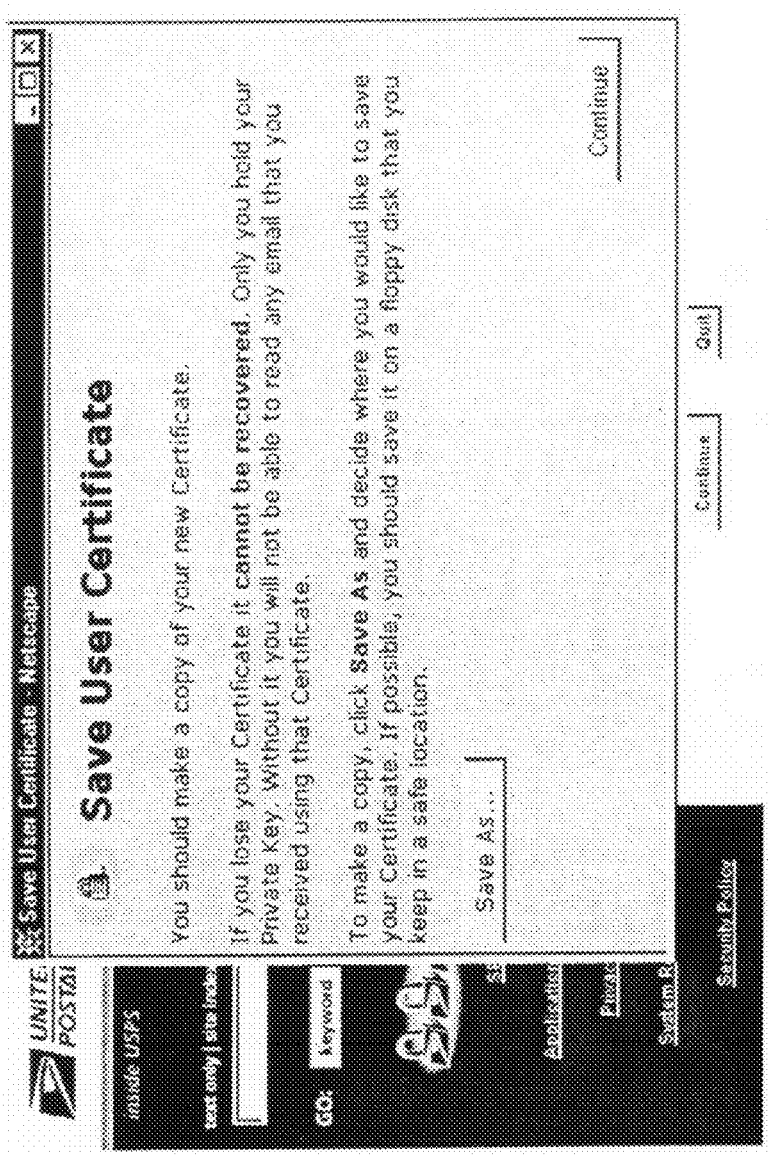
Figure 19V:
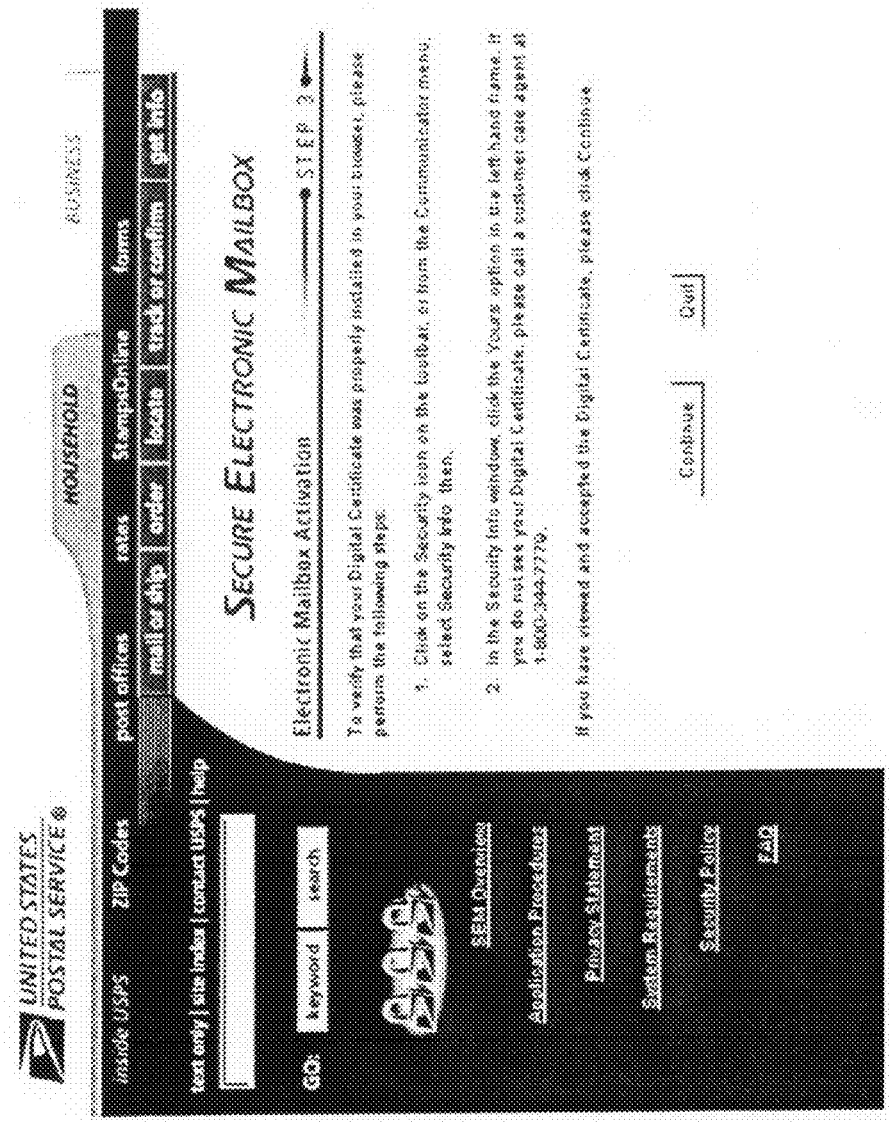
Figure 19W:
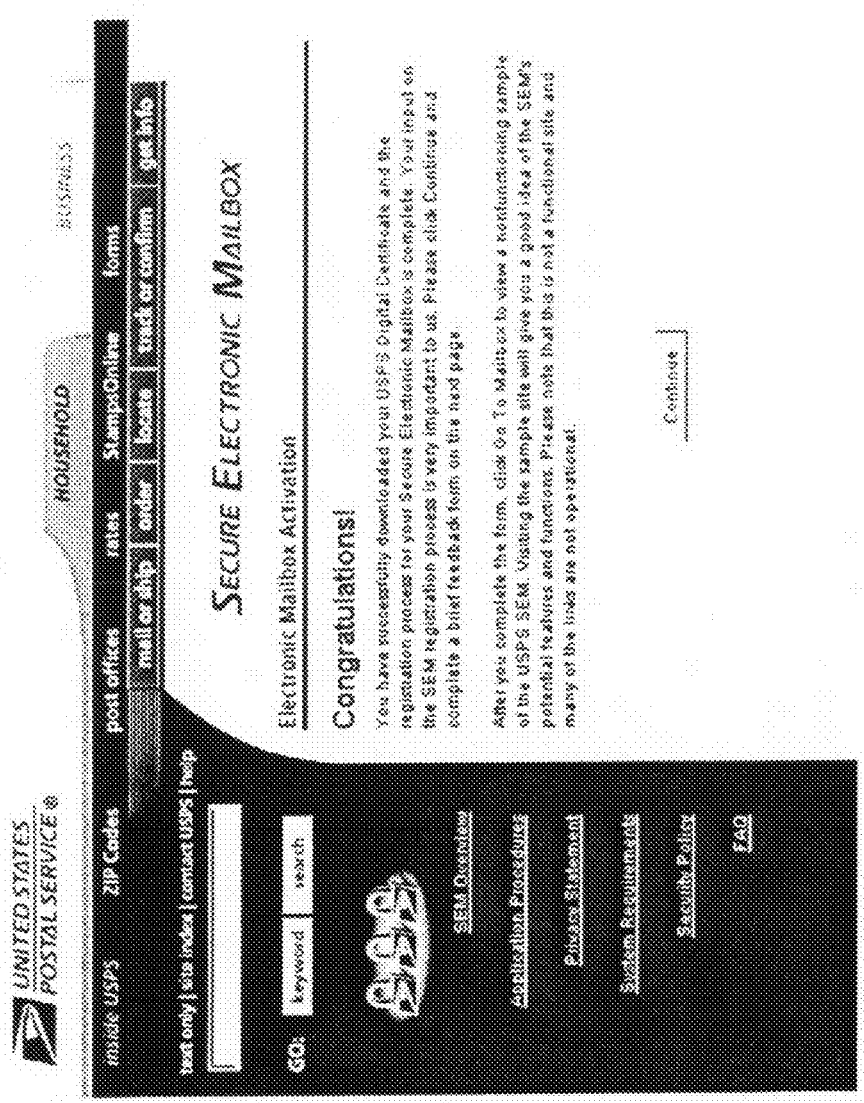

FIGS. 19A-19W are screen shots of a user interface for a registration system consistent with the present invention. These screen shots can be, for example, HTML documents stored in registration system 506 and presented by web server 604 to customer 502 at a computer running a browser. Although these user interfaces describe the registration and activation processes in terms of a secure electronic mailbox, these processes can also be used to establish an electronic account consistent with the present invention.

FIG. 19A includes an overview of a secure electronic mailbox as provided by the USPS consistent with the present invention. Although the figures describe an electronic account system provided by the USPS, the present invention could be practiced by a non-USPS entity without departing from the spirit and scope of the invention. FIGS. 19B and 19C contain instructions to the customer for establishing an electronic account using registration system 506. FIGS. 19D-19F contain a sample privacy and certification policy for use with an electronic account system.

FIG. 19G is a user interface for collecting registration information from a customer consistent with the present invention. The user interface shown has two sections: individual information and e-mail address selection. The individual information section provides text boxes and/or drop-down lists for the customer to enter: full name, including first name, middle initial, and last name; title, such as Mr. or Miss; suffix title, such as Jr., Sr., II or III; date of birth, including month, day, and year; home phone; and work phone. The e-mail address selection section includes text boxes and/or drop-down lists for the customer to enter a first, second, and third choice of a vanity e-mail address along with a password for the e-mailbox. The user interface asks the customer to reenter the password to ensure that it is accurately captured. This section also enables the customer to choose a shared secret, which can consist of an adjective, a noun, and a verb. The shared secret can serve as a master password for the registration system and helps to identify the customer in the future. For example, the shared secret can be used by the customer to gain access to the customer's digital certificate later in the registration process.

FIG. 19H is a user interface that is displayed to the customer if the vanity e-mail address selected is unavailable. The user interface can offer suggestions of available e-mail addresses and a text box to receive the customer's alternate selection.

FIG. 19I is a user interface for obtaining physical address information from the customer. The user interface provides text boxes and/or drop-down lists for the user to input a residential address, including: address type, house number, street name, apartment/suite identifier and number, city, state, and ZIP code. A set of "radio buttons" is also provided for the customer to indicate whether the mailing address (i.e., physical address) is the same as the residential address. The address type field can be used to trigger data capture tools, such as a set of templates for various address types, including Post Office box address, street address, etc.

FIG. 19J is a user interface for obtaining identity validation information from the customer. The customer is prompted to select two forms of identification to be used in the identification verification process. A drop-down list of acceptable identification documents is presented. The acceptable identification documents can include a photo identification, e.g., driver's license, passport, military ID, etc., and a secondary ID, e.g., utility bill, telephone bill, etc. Based on the type of identification document that the customer selects, different data can be captured, including a control number, expiration date, etc.

FIG. 19K is a user interface for displaying registration information to the customer. This user interface displays the information that has been provided by the customer and enables the customer to edit the information if needed and to print the information to retain for his records before proceeding with the rest of the registration process. In one embodiment, the physical address that is presented has been processed by the address matching system described above. In other words, the standardized physical address is presented. In this embodiment, if the address matching system could not resolve the physical address to a delivery point or plus 4 level, asterisks and a message can be displayed to inform the customer that the physical address is not fully resolved.

FIG. 19L is a user interface for explaining a private key system to the customer. The private key is to be generated by browser software running on the customer's computer at the direction of the registration system. The private key will be used by the customer to access the digital certificate to activate the customer's electronic account. The user interface presents a drop-down list for the customer to select an encryption strength, if the customer's browser supports different levels of encryption.

FIG. 19M is a user interface for generating a private key for the customer. This user interface enables the customer to click 'okay' to continue with the private key process or to click 'cancel' to stop.

FIG. 19N is a user interface for establishing a password for the customer's private key. Because the private key will enable access to the customer's digital certificate, and therefore the electronic account, the customer is encouraged to establish a password to protect the private key. This user interface enables the customer to select a password and enter a confirmation copy of the password before continuing.

FIG. 19O is a user interface presented to a customer declining to establish a password for the private key. This user interface informs the customer that a password can be established at a later time and enables the customer to continue the registration process without establishing a password for the private key.

FIG. 19P is a user interface for instructing the customer about the in-person identity validation process. Once the online application process, or registration process, is complete, a temporary or inactive status is assigned to the customer's electronic account. This user interface displays a date on which an identity validation form will be mailed to the customer and explains that the customer will need to take the identity validation form and the chosen identification documents to a registration office to complete the in-person identity validation process.

FIG. 19Q is a user interface for beginning the activation process for the customer's electronic account. Once the customer completes the in-person identity validation process, the customer can activate the electronic account. To begin the activation phase, the customer can use this user interface to enter the vanity e-mail address.

FIG. 19R is a user interface for capturing the customer's shared secret to activate the customer's electronic account. The customer is prompted to enter the shared secret selected during the online registration process.

FIG. 19S is a user interface for accepting a certification practice statement. A certification practice statement is a statement of rules and regulations governing the use of a digital certificate. Once the customer has read the statement, he can click the 'accept' button to continue or the 'quit' button to stop.

FIG. 19T is a user interface for presenting a digital certificate to the customer. This user interface displays a name for the digital certificate and enables the customer to provide a different name, if desired.

FIG. 19U is a user interface for saving the digital certificate. The user interface explains the importance of saving a copy of the digital certificate and enables the customer to save it in a safe location or on a floppy disk, for example. The digital certificate can be downloaded into the customer's browser, onto a Smart Card, or onto a digital certificate holding device.

FIG. 19V is a user interface for activating the electronic account. Once the customer has received the digital certificate, this user interface enables the customer to confirm that the digital certificate has been installed properly on his computer. A customer care phone number is displayed in case the customer has any problems.

FIG. 19W is a user interface for completing the electronic account registration process. This user interface displays a message informing the customer that the electronic account has been activated.

E. Providing a Secure Electronic Mailbox

1. Overview of Secure Electronic Mailbox

One of the services available through an electronic account consistent with the present invention is a secure electronic mailbox (SEM). The SEM can be provided as part of an e-mailbox linked to the electronic account as described above. Electronic messages can be sent to a customer using the SEM. Unlike a conventional electronic mailbox, the SEM can provide a number of services in addition to receiving and displaying electronic messages. For example, the SEM can enable filtering of messages, notification when a message is received and/or viewed, and electronic bill presentment and payment. The SEM can offer various levels of security using, for example, message authentication, time and date seals, and digital certificates.

Figure 20:
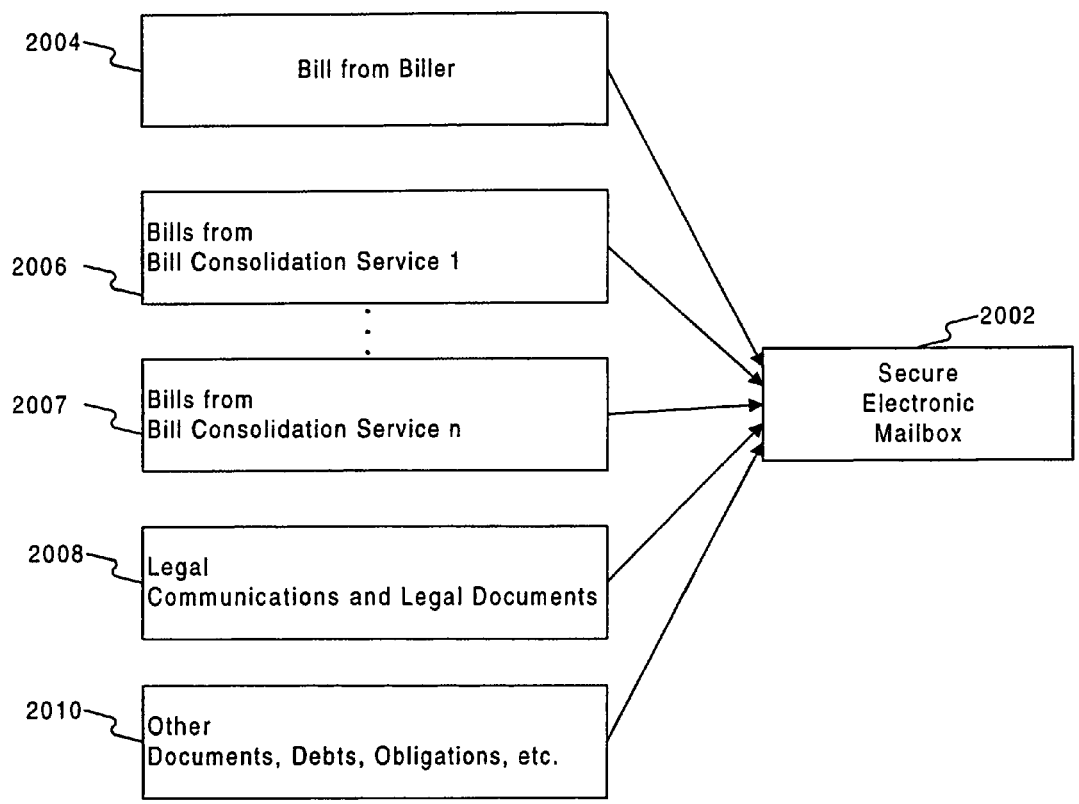
FIG. 20 depicts some classes of messages that can be processed by a secure electronic mailbox.

FIG. 20 depicts some classes of messages that can be processed by a secure electronic mailbox (SEM). SEM 2002 can process a bill, such as a mortgage bill, utility bill, etc. from a biller 2004, i.e., a biller, a biller's representative, or a biller service provider. SEM 2002 can process bills from a plurality of bill consolidators 2006 and 2008. SEM 2002 can also process legal communications and legal documents 2008, such as patent applications, wills, etc. Other documents 2010 can also be processed by SEM 2002. In one embodiment of the present invention, all of a customer's bills (regardless of their source) are consolidated and presented to the user with a single user interface, or bill manager. Similarly, payment options can be consolidated and presented to the user with a single user interface, or payment manager. In this embodiment, a customer can manage all of his bills in one, seamless interface, without having to know the source of the bills.

Figure 21:
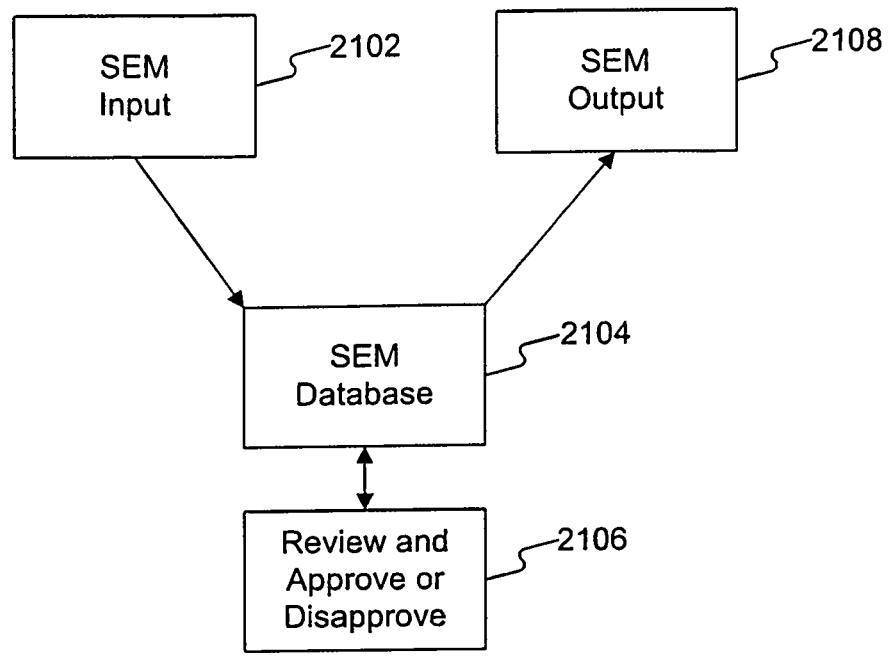
FIG. 21 is a block diagram of a system for enabling a customer to approve or disapprove electronic messages using a secure electronic mailbox.

FIG. 21 is a block diagram of a system for enabling a customer to approve or disapprove electronic messages using a secure electronic mailbox. When SEM 2002 receives SEM input 2102, such as an electronic bill or advertisement, SEM input 2102 can be stored in an SEM database 2104, as described below. By accessing SEM database 2104, a customer can view SEM input 2102 and approve or disapprove it 2106. For example, if SEM input 2102 is an electronic bill, approval might indicate that the bill should be paid using the electronic account and disapproval might indicate that the bill should not be paid. The customer communicates approval or disapproval 2106 to SEM database 2104, which in turn reports the customer's decision as SEM output 2108. SEM 2002 thus enables a customer to interact with senders of electronic messages indirectly, adding security and privacy protections.

2. Detailed Description of Secure Electronic Mailbox

Figure 22:
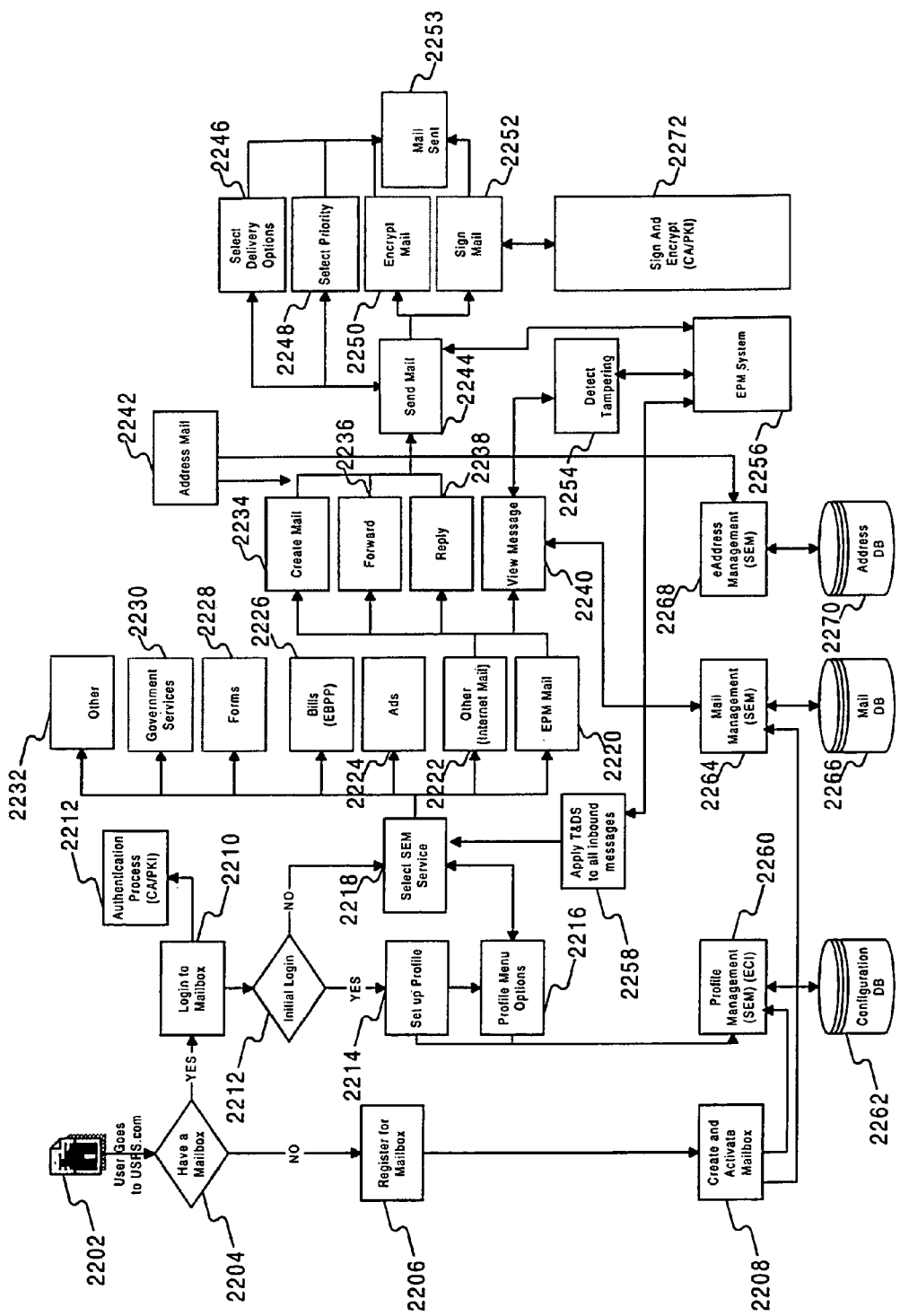
FIG. 22 is a flowchart of secure electronic mailbox processing consistent with the present invention.

FIG. 22 is a flowchart of secure electronic mailbox processing consistent with the present invention. A customer can connect to secure electronic mailbox 2002 via a website, e.g. usps.com, or other portal on a network (step 2202). If the customer does not have a mailbox, i.e., a SEM, (step 2204), then the customer will be prompted to register for an electronic account and an SEM (step 2206). The customer can then perform the registration process described above to establish an electronic account and SEM (step 2208).

If the customer has a mailbox (step 2204), the customer is prompted to login to the mailbox (step 2210) to give the customer access to SEM services. As part of the login process, the customer is authenticated by the electronic account system using, for example, a digital certificate or private key (step 2212). An embodiment of a certificate authority for performing this authentication is described in more detail below.

If this is the customer's initial login (step 2212), i.e., the first time the customer has accessed the mailbox, the customer is prompted to set up a profile (step 2214). The profile is linked to the customer's mailbox and can indicate the services the customer would like to access and other profile menu options (step 2216). The profile menu options can include screen appearance, such as background color or toolbars, and other options as appropriate.

If this is not the customer's initial login, and if the customer was successfully authenticated, then the customer is given access to the mailbox and the customer is prompted to select an SEM service (step 2218). Here the customer can select one of the different types of services available through the customer's electronic account and SEM including: EPM mail, Internet mail, advertisements, bill payment, forms, government services, etc.

The different services can be provided using, for example, different storage folders within the SEM. The customer can select an EPM mail folder (step 2220) that contains mail having an electronic postmark (EPM). The customer can select an Internet mail folder (step 2222) that contains Internet mail and may or may not include security. An advertisement, or ads, folder that contains advertisements can be chosen (step 2224). The advertisements can be, for example, targeted advertisements sent by an advertiser. The advertisements may be filtered, as described above with reference to FIG. 15.

The customer can select a bills folder (step 2226) that contains bills from billers and/or bill consolidators that participate in an electronic bill presentment and payment (EBPP) system via the SEM. The customer can select a forms folder (step 2228) containing electronic forms from companies and/or government agencies, such as tax forms or driver's license renewal forms. The customer can select a folder of government services (step 2230) containing, for example, links to government sites such as the Internal Revenue Service. The customer can also access other services (step 2232) consistent with the present invention.

When the customer selects either Internet mail (step 2222) or certified mail (step 2220), the customer has a selection of actions to choose from. The customer can choose to create mail (i.e., an electronic message) (step 2234). As part of the mail creation process, the customer may add attachments to the mail or use a spell-checking program. The customer can choose to forward mail (step 2236) or reply to the sender of a message (step 2238). The customer can also choose to view a message (step 2240). This action allows the customer to view the contents of a message and open or save attachments. If the customer chooses to create mail (step 2234), forward mail (step 2236), or reply to mail (step 2238), the customer is prompted to address the mail (step 2242) by selecting a name from an address book or otherwise providing an address for the message. The sender can use the secure electronic mailbox to send a message to a recipient at a physical and/or electronic address. Once the message is addressed (i.e., to either a physical or an electronic address), the user can send the message (step 2244).

To send the message, the customer can select delivery options (step 2246), including options such as "delivery notification" or "electronic delivery." If the addressee of the message has an electronic account, the customer can choose "physical delivery" and the message will be printed and delivered in physical form to the addressee's physical address. In addition to delivery options, the customer can select a priority (step 2248) such as "high priority" or "urgent." The customer can choose to postmark the message with an EPM. The customer can also choose to encrypt the message (step 2250) before it is sent. This allows the customer to encrypt a message for privacy and to prevent a third party intercepting the message from reading it. The user can choose to sign the message (step 2252), for example, by attaching a digital signature to the message. Then, the message is sent (step 2253).

If the customer chooses to view a message (step 2240), the customer can select a service to detect tampering (step 2254). This allows the customer to verify whether a message has been tampered with since it was signed by the sender. The tampering detection process can access a secure time and date seal function (step 2256) such as an electronic postmark (EPM) system as described in U.S. patent application Ser. No. 09/675,677, entitled Systems and Methods for Authenticating an Electronic Message, filed on Sep. 29, 2000. The customer can also choose to apply a time and date seal (e.g., an EPM) to all inbound messages (step 2258). This option will direct the SEM to automatically attach a time and date seal (e.g., an EPM) to a message when it is received by the SEM. The customer can have the option to use the time and date seal (e.g., the EPM) as a filter for received mail, for example by setting this as a profile menu option (step 2216).

Several components of the electronic account system can be used to perform the tasks depicted in FIG. 22. A Create and Activate Mailbox component 2208 contains a registration system such as the Internet Customer Registration System described above. Create and Activate Mailbox component 2208 can automatically create a mailbox once the customer has completed the online registration process. The mailbox can be created, for example, by designating an electronic storage location for the customer. In one embodiment, the mailbox will remain inactive until identification verification is performed as described above. A Profile Management component 2260 can be used to manage the profile information of the customer. This profile information and profile menu options can be stored in a configuration database 2262.

A Mail Management component 2264 can manage messages received by the SEM and allow customers to retrieve, view, save, archive and sort messages. Mail Database 2266 is a storage location for the messages of the SEM. An eAddress Management component 2268 manages a customer's electronic address books, which can be stored in an Address Database 2270. An electronic postmark (EPM) system 2256 can be used to enable the customer to attach a time and date seal (e.g., an EPM) to a message and to detect when a message with a time and date seal (e.g., an EPM) has been tampered with. A Sign and Encrypt component 2272 can be used to enable a customer to digitally sign messages.

3. Electronic Bill Presentment and Payment

A secure electronic mailbox consistent with the present invention supports many services in addition to electronic message handling. A customer with an electronic account can use an electronic bill presentment and payment (EBPP) service to receive and pay bills electronically. Billers, such as utility companies or credit card companies, can join the EBPP system and submit bills, bill summaries, bill histories, etc. to the customer (i.e., the payer) using the electronic account and SEM systems. An EBPP system consistent with the present invention improves upon conventional electronic bill payment systems in several ways. First, the present invention uses an EBPP system to improve communication and feedback between a biller and a payer. Second, an EBPP system consistent with the present invention is linked to a physical address of the payer enabling flexible communications including physical and electronic mail. Third, because an EBPP system consistent with the present invention is linked to a payees electronic account, the biller knows that the identity of the payer was verified in person and therefore can be more confident in sending bills and receiving payment via the EBPP system. Fourth, bills from several sources can be consolidated for viewing seamlessly, i.e., without indicating the source of the bill. Payment can be provided to the appropriate biller seamlessly, i.e., without indicating the payment destination to the customer.

Figure 23:
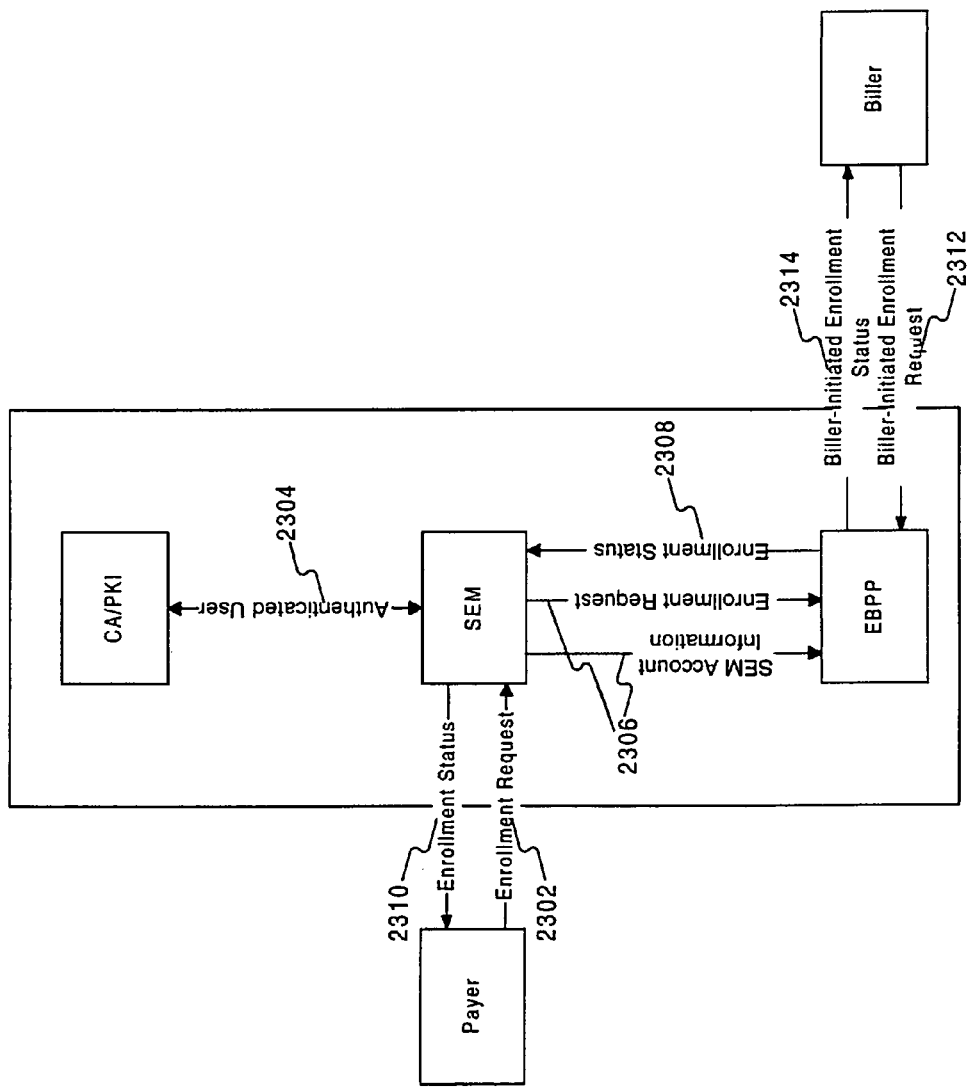
FIG. 23 is a flowchart of a process for a customer to enroll in an electronic bill presentment and payment system consistent with the present invention.

FIG. 23 is a flowchart of a process for a customer to enroll in an electronic bill presentment and payment system consistent with the present invention. A payer having an electronic account can send a message requesting enrollment in an electronic bill presentment and payment (EBPP) system (step 2302). The enrollment request can be sent to a secure electronic mailbox (SEM) system consistent with the present invention. If the enrollment request includes a reference to a bank account of the customer, then the EPBB system can access that bank account to automatically pay bills for the payer. The SEM system authenticates the payer using, for example, the digital certificate from the payer's electronic account (step 2304). The authentication process is described in more detail below. When the payer is authenticated, the SEM system retrieves information about the payer, for example, from the payer's electronic account, and sends the enrollment request and payer information to an EBPP system (step 2306). In one embodiment, the EBPP system can send the enrollment request and payer information to a biller and receive an enrollment status from the biller. Once the EBPP system establishes and activates an EBPP account for the payer, the enrollment status is sent from the EBPP system to the SEM system (step 2308) and then to the payer (step 2310).

In an alternative embodiment, the enrollment request can also be initiated by a biller. For example, a payer could sign up for the EBPP system at a biller's web site. The biller-initiated enrollment request would then be sent from the biller to the EBPP system (step 2312) and the biller-initiated enrollment status can be returned to the biller (step 2314).

Figure 24:
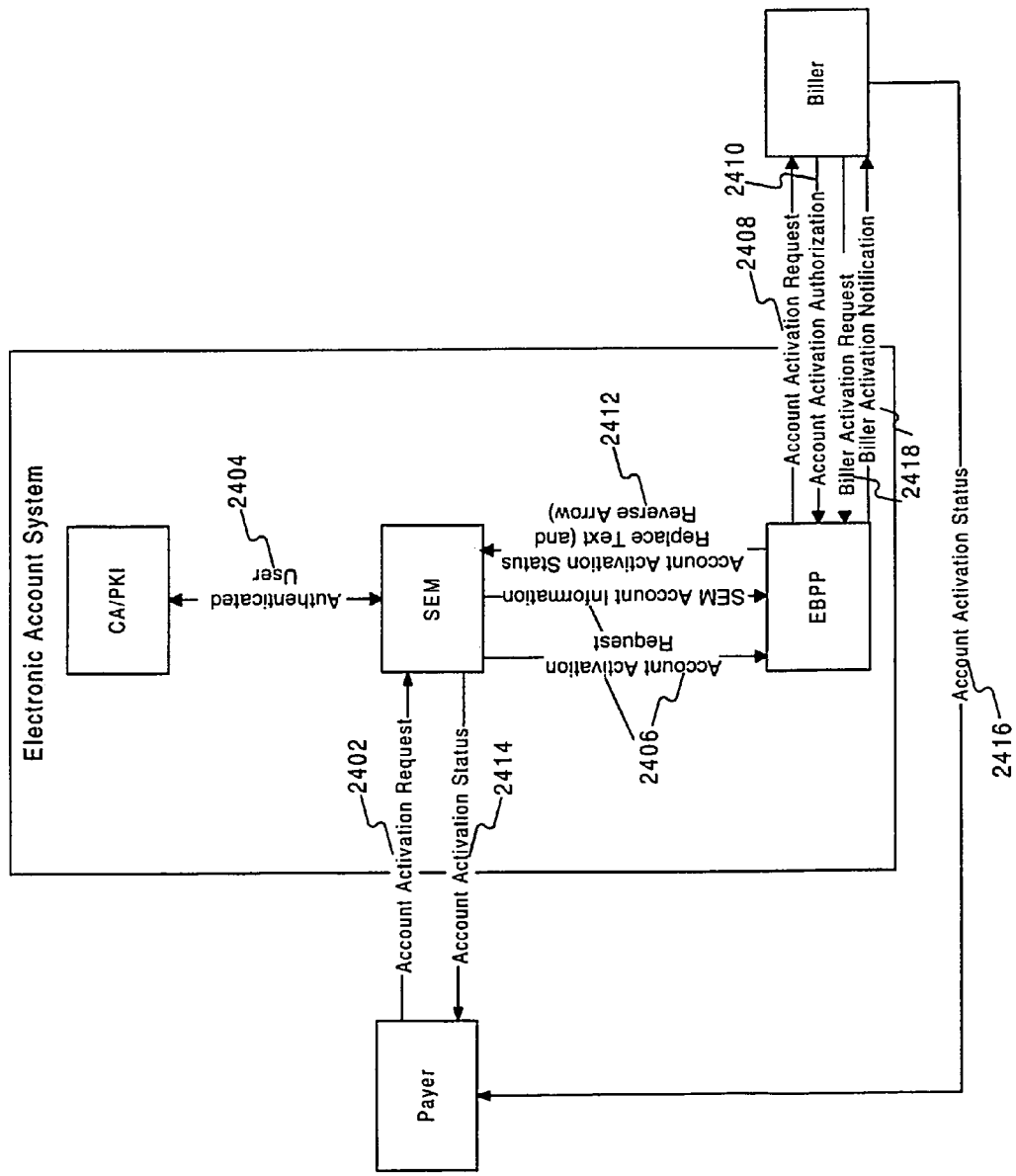
FIG. 24 is a flowchart of a process for a customer to activate an electronic bill presentment and payment account consistent with the present invention.

FIG. 24 is a flowchart of a process for a customer to activate an electronic bill presentment and payment account consistent with the present invention. After the enrollment process, the payer can request activation of the EBPP account by sending an account activation request to the SEM system (step 2402). Before processing the request, the SEM system can authenticate the user with a certificate authority as described below (step 2404). Once the payer is authenticated, the account activation request is sent from the SEM system to the EBPP system along with information from the payers electronic account (step 2406). The account activation request is then sent to a biller (step 2408). When the biller activates the payer's account, a response is sent from the biller to the EBPP system (stem 2410). The EBPP system sends the account activation status to the SEM system (step 2412) and the SEM system sends it to the payer (2414). The biller could also send out a physical notification of the account activation status directly to the payer (step 2416). In an alternative embodiment, account activation could be initiated by the biller and the biller can be notified of the account activation (step 2418).

Figure 25:
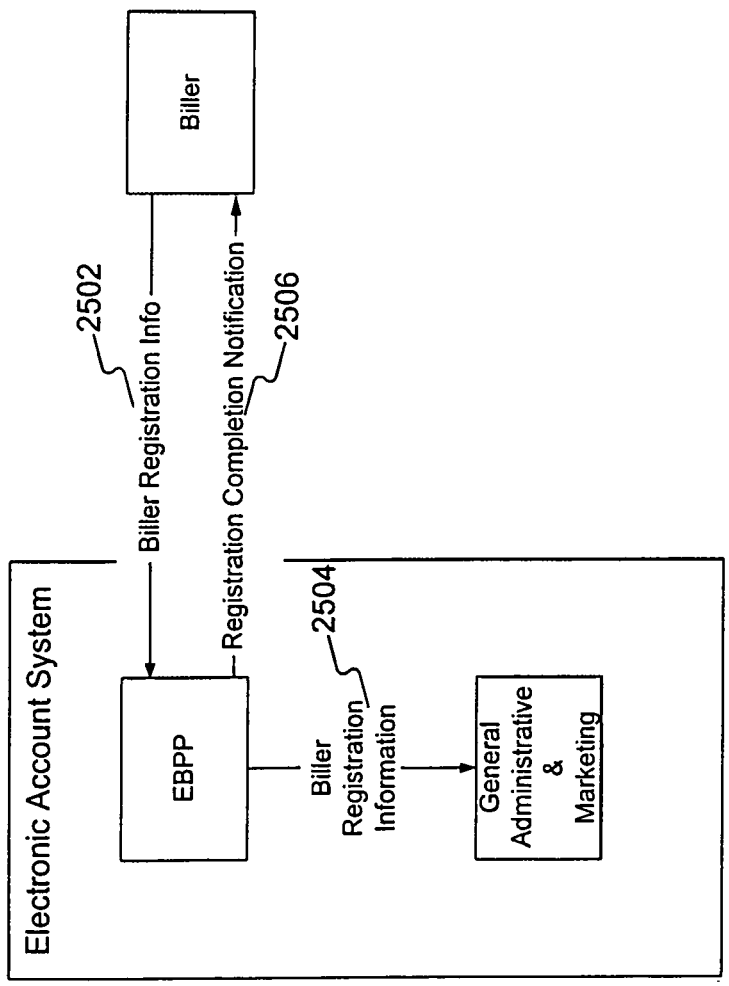
FIG. 25 is a flowchart of a process for a biller to register for an electronic bill presentment and payment system consistent with the present invention.

FIG. 25 is a flowchart of a process for a biller to register for an electronic bill presentment and payment system consistent with the present invention. To register, a biller sends biller registration information to the electronic bill presentment and payment (EBPP) system (step 2502). The EBPP system processes the biller registration information and sends it through general administrative and marketing processing (step 2504). This step may include, for example, verifying the biller's taxpayer ID number or other identifier or evaluating the biller's accounting software. Once the biller is registered, the EBPP system sends a registration completion notification to the biller (step 2506). Marketing or advertisements can also be sent from the EBPP system to the biller.

Figure 26:
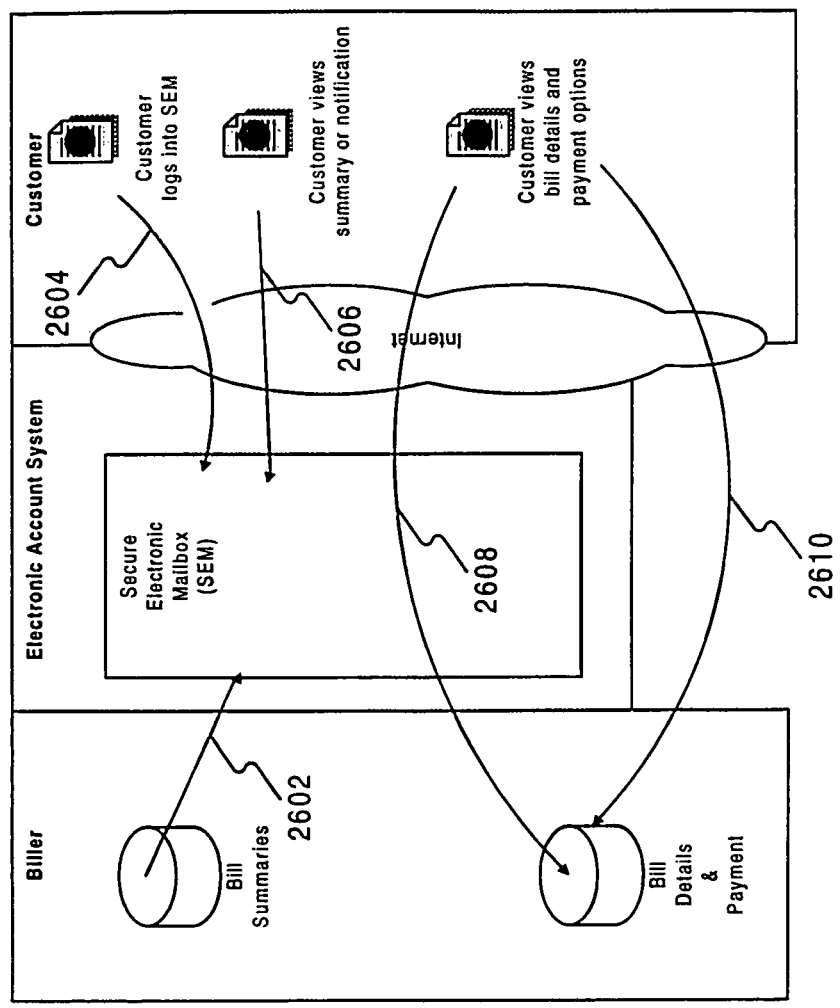
FIG. 26 is a flowchart of a process for presenting bills to a customer using the electronic-account system.

FIG. 26 is a flowchart of a process for presenting bills to a customer using the electronic account system. In one embodiment, a biller can submit bill summaries for multiple customers to the electronic account system (step 2602) via a network such as the Internet. Each bill summary may be marked with an EPM and can be stored in a SEM corresponding to a specific customer. When a customer logs into his SEM (step 2604), the customer can view the bill summary (step 2606). The bill summary may be marked with an EPM. The customer can then request, via the SEM system, to view bill details (step 2608). The bill details may be marked with an EPM. The customer can also link directly with the biller to exchange information or pay a bill (step 2610). Using the electronic account system, the customer can submit payment instructions, such as a bank account to be debited or a credit card account to be charged. The electronic account system can notify the biller when a customer has viewed the bill summary and/or bill detail. In an alternative embodiment, the customer can pay view payment information via the SEM system and submit payment instructions directly to the SEM.

Figure 27:
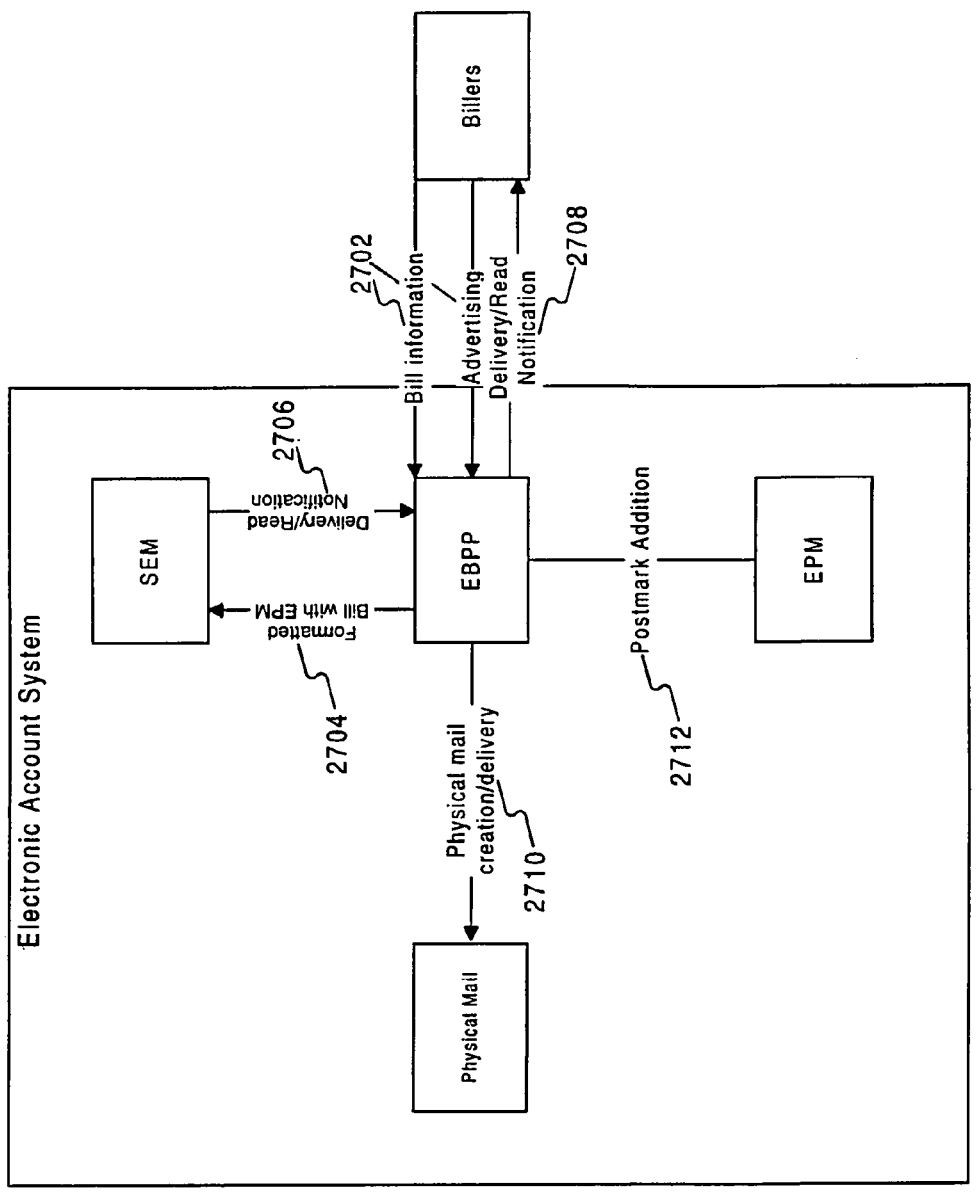
FIG. 27 is a flowchart of bill delivery notification consistent with the present invention.

FIG. 27 is a flowchart of bill delivery notification consistent with the present invention. A biller can send bill information for a payer having an electronic account to an EBPP system (step 2702). The biller can also send other information for the payer, such as advertisements. The EBPP system formats a bill using the bill information and stores it in the payer's secure electronic mailbox (step 2704). The formatted bill can include an EPM. The SEM can send a notification to the EBPP system when the bill is delivered, i.e., stored in the payer's SEM (step 2706). The SEM can send another notification when the payer views the bill in the SEM. The EBPP system then sends these notifications to the biller (step 2708). In one embodiment, EBPP system can use the bill information from the biller to generate a physical mail piece that is sent to the payer via U.S. mail (step 2710). The EBPP system can also use an electronic postmark (EPM) system to attach an EPM to the bill before it is stored in the payer's SEM (step 2712).

There are many alternative embodiments for storing and presenting bill information to the payer. The electronic account system can store all bill information in the EBPP system (e.g., to bill for SEM services). Alternatively, the EBPP system may store only bill summary information and the payer can communicate directly with a biller to obtain bill details. In another embodiment, the EBPP system may be provided by a third party and offered to the payer via the electronic account system.

Figure 28:
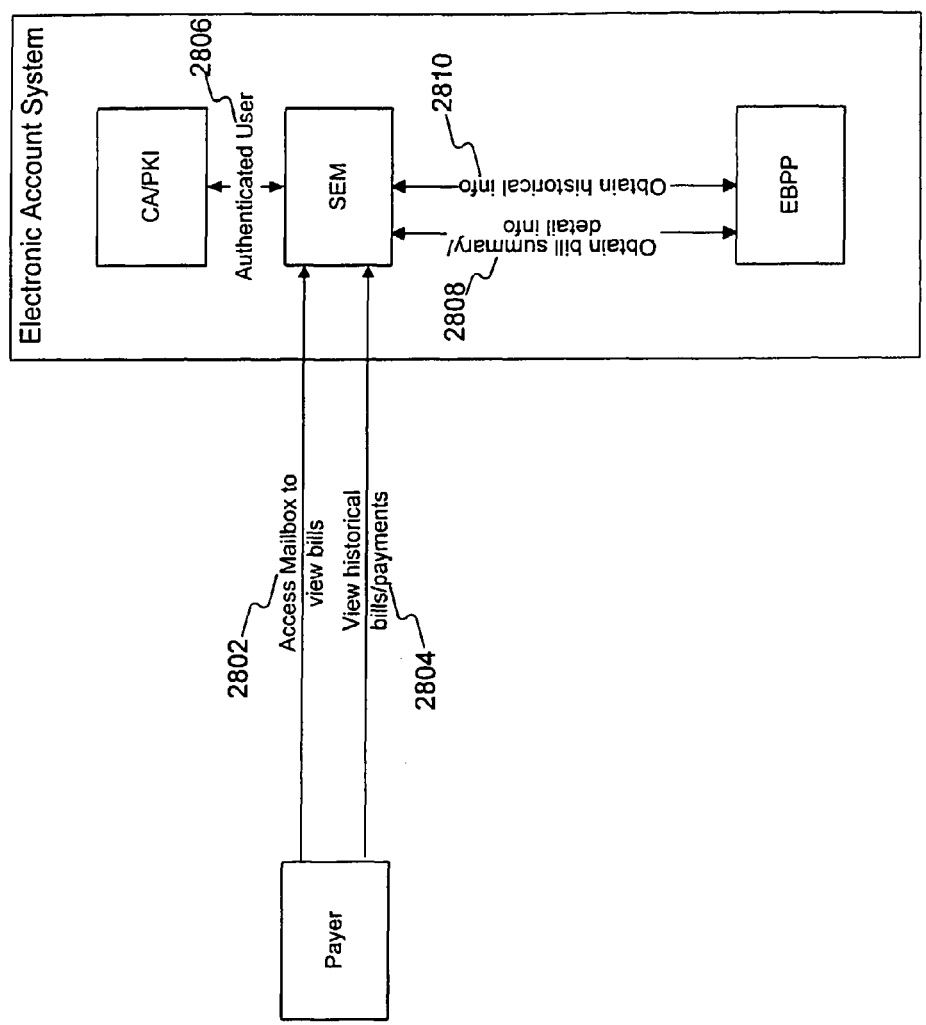
FIG. 28 is a flowchart of an embodiment in which the EBPP system stores bill summaries and bill details.

FIG. 28 is a flowchart of an embodiment in which the EBPP system stores bill summaries and bill details. The payer can access his SEM to view bill summaries (step 2802) and to view bill details, historical bills, and/or payment information (step 2804). When the payer accesses the SEM, the payer will be authenticated using, for example, a certificate authority (step 2806). In this embodiment, the SEM obtains bill detail (i.e., line by line bill details) and bill summary information (e.g., overall balance due, biller identifier, etc.) from the EBPP system, stored within the electronic account system (steps 2808, 2810). The payer can also obtain historical information such as payment history and past bills.

Figure 29:
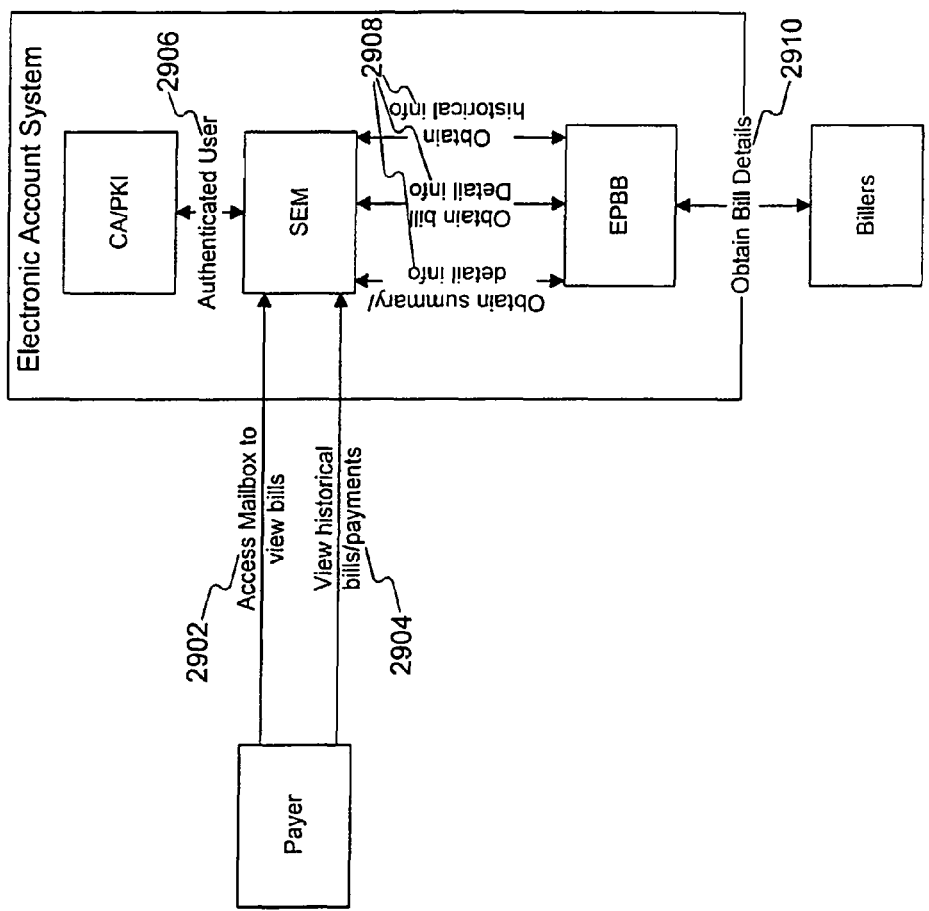
FIG. 29 is a flowchart of an embodiment in which the biller stores bill details.

FIG. 29 is a flowchart of an embodiment in which the biller stores bill details. The payer can access his SEM to view bill summaries (step 2902), bill detail, historical bills and/or payment information (step 2904). When the payer accesses the SEM, the customer will be authenticated using, for example, a certificate authority (CA/PKI) (step 2906). In this embodiment, the SEM obtains bill detail (i.e., line by line bill details) and bill summary information (e.g., overall balance due, biller identifier, etc.) from the EBPP system (step 2908), which in turn obtains bill details from a remote biller, e.g., via a network. (step 2910). The payer can also obtain historical information such as payment history and past bills.

Figure 30:
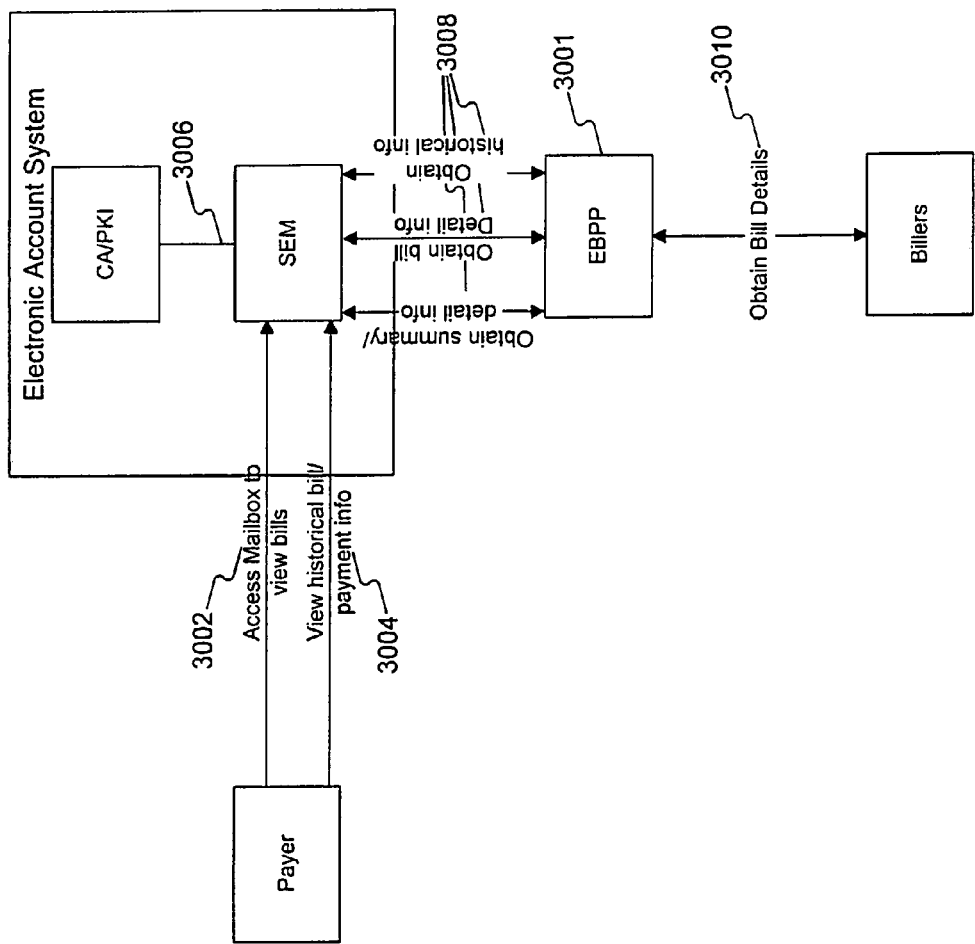
FIG. 30 is a flowchart of an embodiment in which an EBPP system is provided by a third party and offered to the payer via the electronic account system.

FIG. 30 is a flowchart of an embodiment in which an EBPP system is provided by a third party 3001 and offered to the payer via the electronic account system. The payer can access his SEM to view bill summaries and bill detail (step 3002) and to view historical bills and/or payment information (step 3004). The bills may be issued by a plurality of billers, but the bills can be consolidated and presented to the payer using a single, seamless user interface. When the payer accesses the SEM, the customer will be authenticated using, for example, a certificate authority (step 3006). In this embodiment, the SEM obtains bill detail (i.e., line by line bill details) and bill summary information (e.g., overall balance due, biller identifier, etc.) from a third-party EBPP system (step 3008), which in turn obtains bill details from a remote biller, e.g., via a network. (step 3010). The payer also can also obtain historical information such as payment history and past bills.

Figure 31:
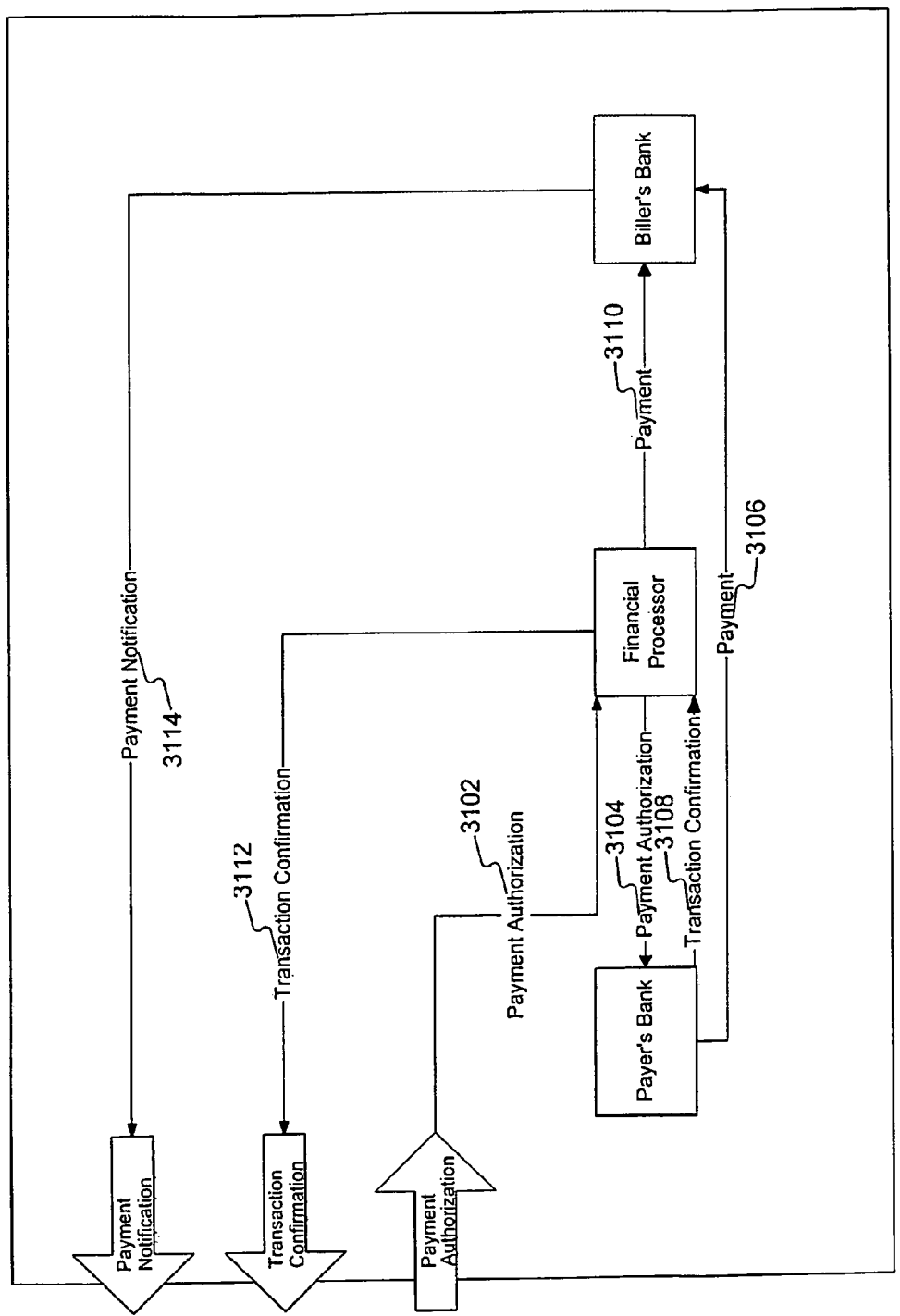
FIG. 31 is a flowchart for processing an electronic payment consistent with conventional systems.

FIG. 31 is a flowchart for processing an electronic payment consistent with conventional systems. To pay a bill electronically, a payer sends payment authorization to a financial processor such as, for example, Checkfree (step 3102). The financial processor sends the payment authorization to the payer's bank (step 3104). The payment authorization can include a payer's bank account designation and a biller's bank account number. The payer's bank can send payment to the biller's bank (step 3106), e.g., by electronically transferring money to the biller's bank account. The payer's bank can then send a transaction confirmation to the financial processor (step 3108). Alternatively, the financial processor can send payment directly to the biller's bank (step 3110). The financial processor can send the transaction confirmation to the payer (step 3112). Once payment is received, the biller's bank can send payment notification to the payer (step 3114).

Figure 32:
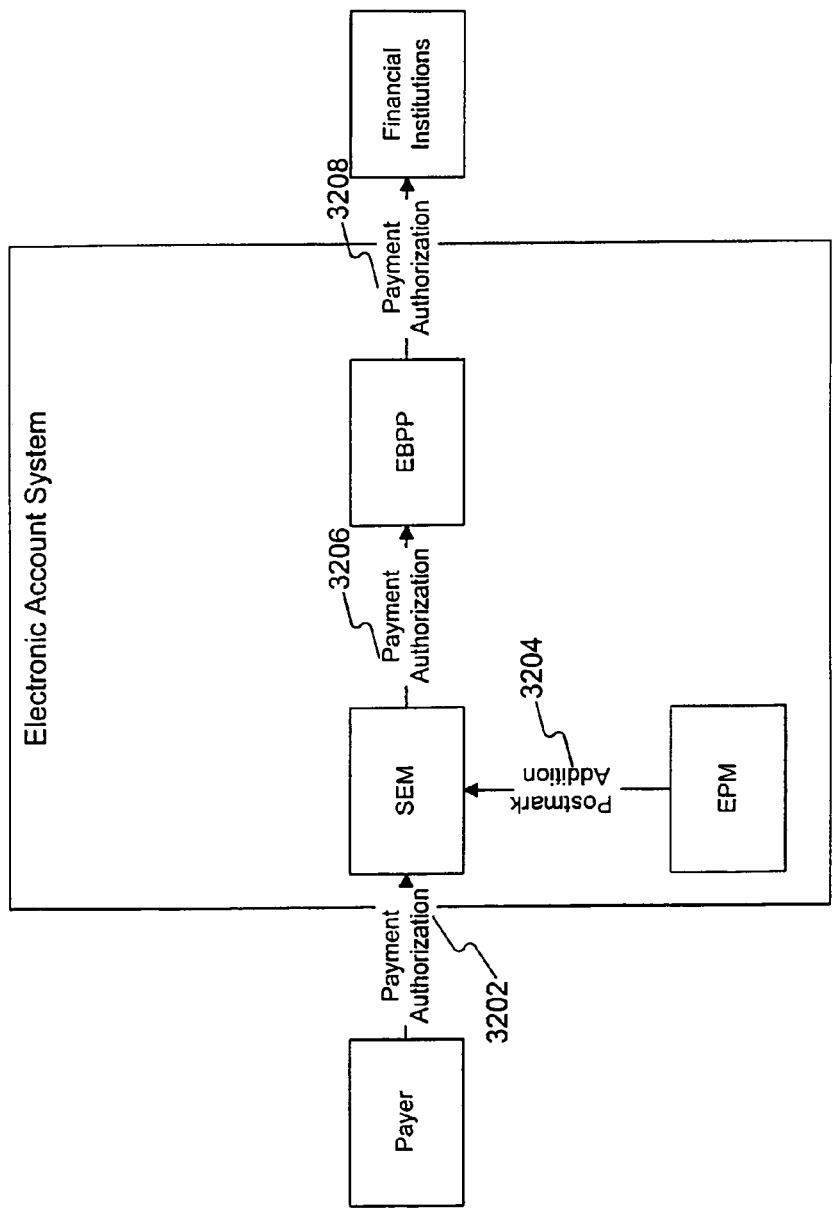
FIG. 32 is a flowchart of one embodiment of a method for processing an electronic bill payment method using the present invention.

FIG. 32 is a flowchart of one embodiment of a method for processing an electronic bill payment method using the present invention. A payer sends payment authorization to his SEM (step 3202). The SEM can apply an electronic postmark (EPM) to the payment authorization for added security (step 3204). The SEM sends the payment authorization to the EBPP system (step 3206), which is part of the electronic account system in this embodiment. The EBPP system in turn sends the payment authorization to a financial institution (step 3208). This method is an improvement over conventional systems in many ways. The inclusion of an EPM on the payment authorization enhances security for both payer and biller. Because the identity of the payer is validated before the SEM is activated, the biller has increased confidence when sending bills and receiving payment.

Figure 33:
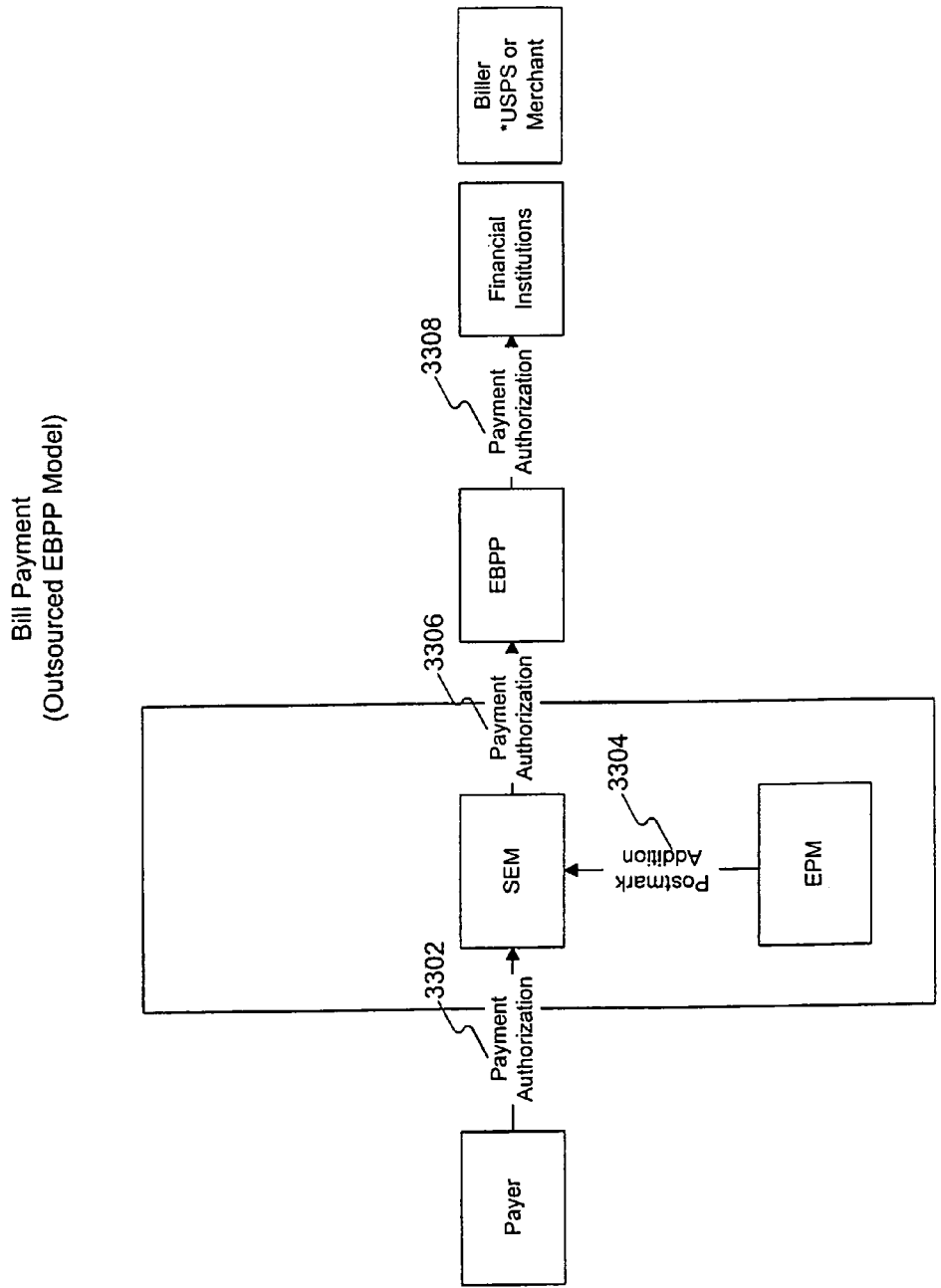
FIG. 33 is a flowchart of another embodiment of an electronic bill payment method consistent with the present invention.

FIG. 33 is a flowchart of another embodiment of an electronic bill payment method consistent with the present invention. A payer sends payment authorization to his SEM (step 3302). The SEM can apply an electronic postmark (EPM) to the payment authorization for added security (step 3304). The SEM sends the payment authorization to the EBPP system (step 3306), which is not part of the electronic account system in this embodiment. The EBPP system in this embodiment could be offered by a third party to the payer via the electronic account system. The EBPP system sends the payment authorization to a financial institution (step 3308).

Figure 34:
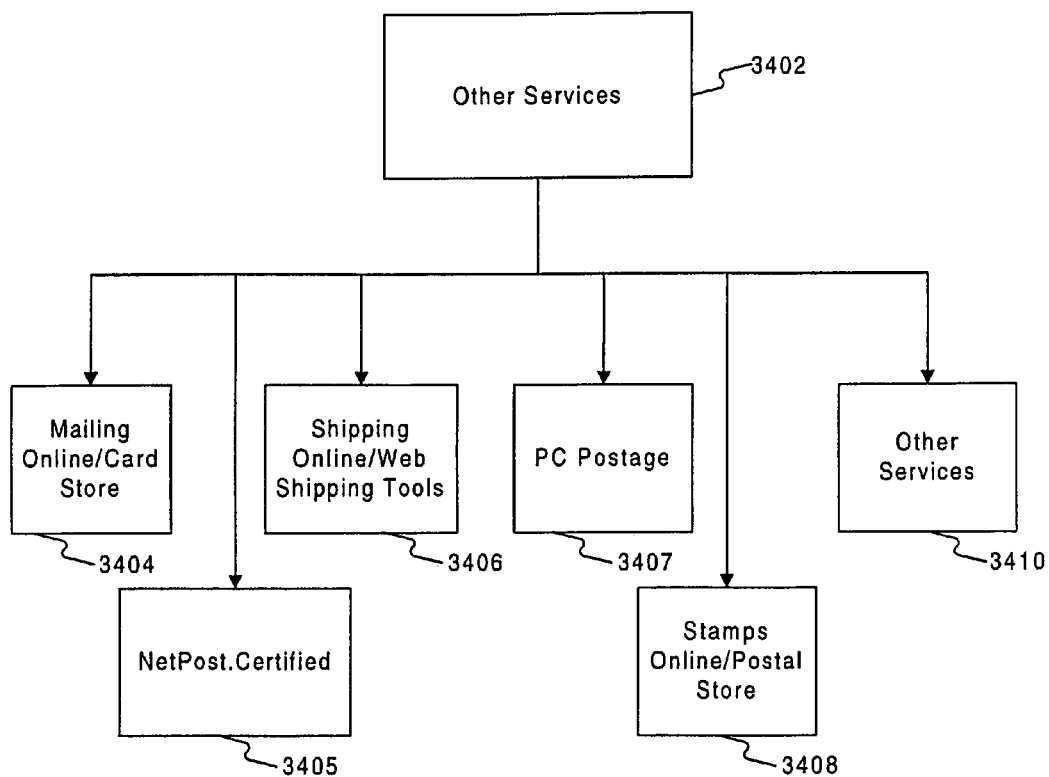
FIG. 34 illustrates additional services that can be provided through an electronic account consistent with the present invention.

FIG. 34 illustrates additional services that can be provided through an electronic account consistent with the present invention. Other services 3402 that can be provided via an electronic account include mailing online 3404, NetPost.Certified 3405, shipping online 3406, stamps online 3408, PC Postage 3409, and other services 3410. Mailing online 3404 is a service that receives a content file and an address list from a customer and produces a mailing to each address on the address list. Mailing online can include a Card Store product. NetPost.Certified 3405 enables a customer to download a digital certificate onto a Smart Card for use in authenticating electronic transactions. Shipping online 3406 is a service that enables a customer to ship packages automatically and privately. Stamps online 3408 enables a customer to purchase stamps. PC Postage 3408 enables a customer to purchase and print postage using a computer.

F. Certificate Authority for Proofing Identities

Systems consistent with the present invention provide a certificate authority for proofing the identity of an electronic customer. Using digital certificate software, the electronic account system provides a digital certificate, described in detail below, to a customer after the customer has been verified in-person as part of the electronic account registration process. In this way, a digital certificate consistent with the present invention authenticates the customer's identity in a way that is not available in conventional systems.

Figure 35:
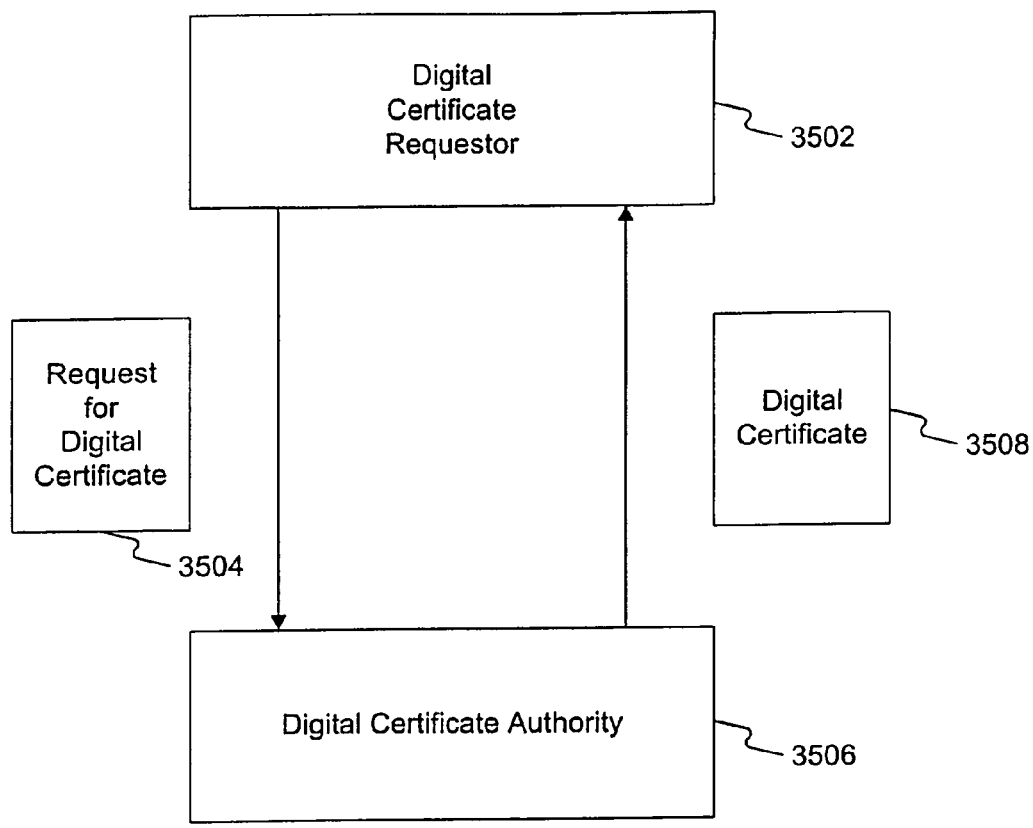
FIG. 35 is a block diagram of a system for providing a certificate authority for proofing identities consistent with the present invention.

FIG. 35 is a block diagram of a system for providing a certificate authority for proofing identities consistent with the present invention. A digital certificate requestor 3502 sends a request for digital certificate 3504 to a digital certificate authority 3506. Digital certificate requestor 3502 can be, for example, certificate software or a proofing workstation. In response to request for digital certificate 3504, digital certificate authority 3506 sends a digital certificate 3508 to digital certificate requestor 3502.

Figure 36:
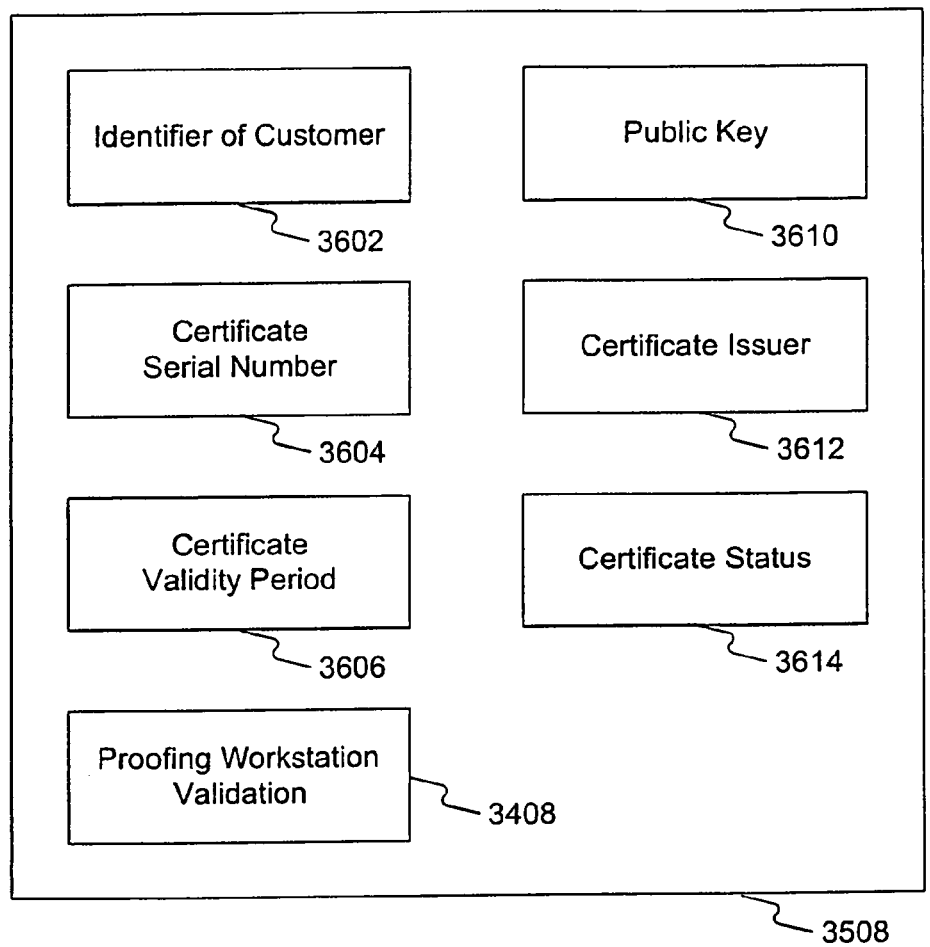
FIG. 36 is a block diagram of a digital certificate consistent with the present invention.

FIG. 36 is a block diagram of a digital certificate consistent with the present invention. Digital certificate 3508 includes an identifier of the customer 3602, a certificate serial number 3604, a certificate validity period 3606, a proofing workstation validation 3608, a public key 3610, a certificate issuer identifier 3612, and a certificate status 3614. Certificate status 3614 can be, for instance, active, on hold, or revoked. The digital certificate can be, for example, a well-known CCITT X.500 Section 509 Version 3 certificate.

Figure 37:
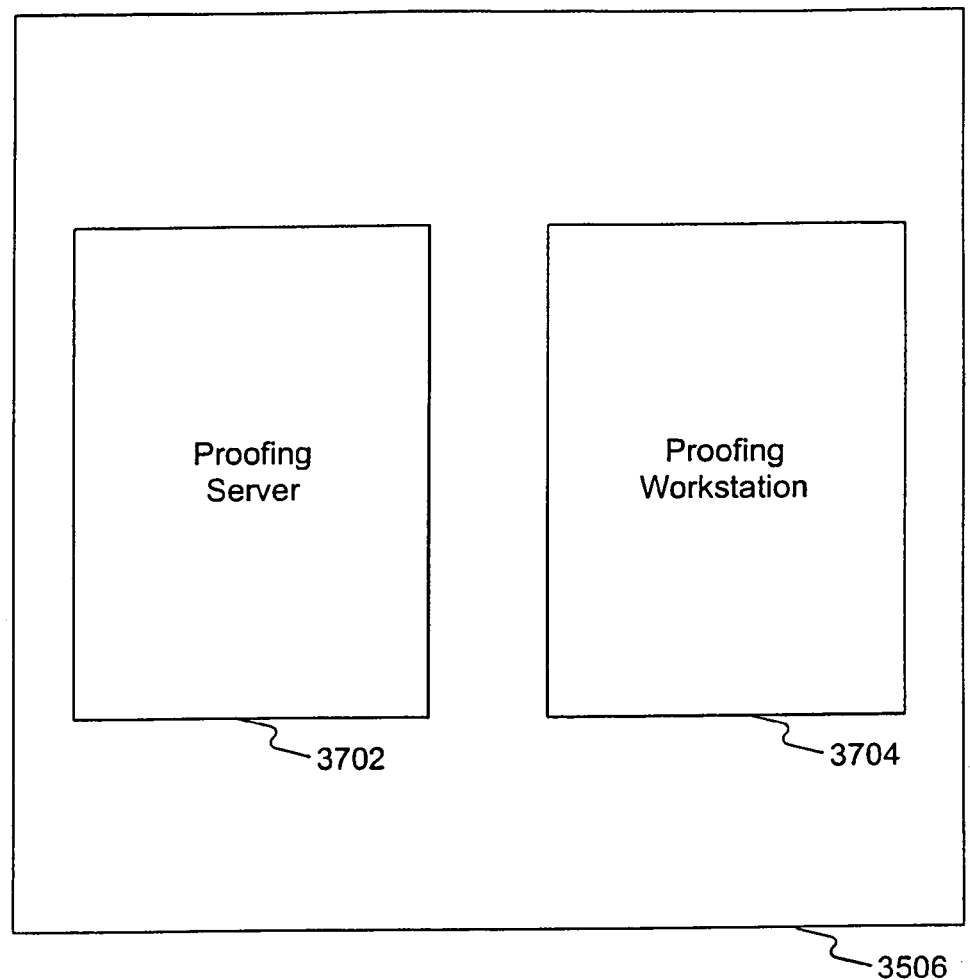
FIG. 37 is a block diagram of a certificate authority consistent with the present invention.

FIG. 37 is a block diagram of a certificate authority consistent with the present invention. Certificate authority 3506 contains known software to generate digital certificates as described above. In addition, certificate authority 3506 includes at least one proofing server 3702 and at least one proofing workstation 3704. As described above, a customer having an electronic account can conduct electronic transactions and provide a digital certificate to third parties to verify the customer's identity. A third party can request verification of the digital certificate via proofing workstation 3704, such as a kiosk available in a Post Office. Proofing workstation 3704 communicates with proofing server 3702 to verify the digital certificate and returns the verification to the third party via proofing workstation 3704. Thus, certificate authority 3506 enables third parties to proof the customer's identity using a digital certificate.

Figure 38:
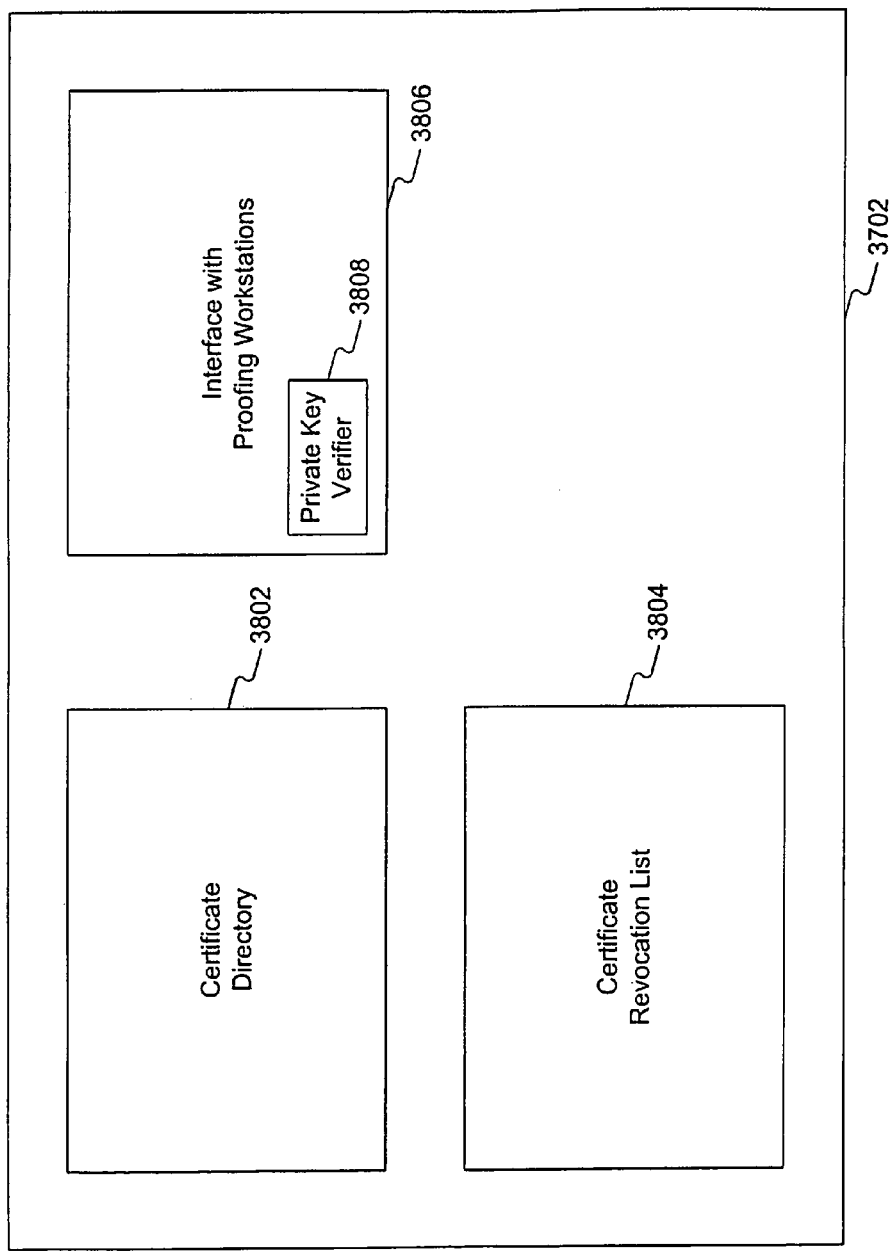
FIG. 38 is a block diagram of a proofing server consistent with the present invention.

FIG. 38 is a block diagram of a proofing server consistent with the present invention. Proofing server 3702 includes a certificate directory 3802, a certificate revocation list 3804, and an interface with proofing workstations 3806. Certificate directory 3802 is a list of digital certificates that have been issued by proofing server 3602, e.g., using known digital certificate software. Certificate revocation list 3804 is a list of certificates that have been revoked, e.g., for fraudulent use generated by an electronic account system or a third party. Interface with proofing workstations 3806 includes a private key verifier 3808 that provides security by verifying a private key sent with a verification request from a proofing workstation.

Figure 39:
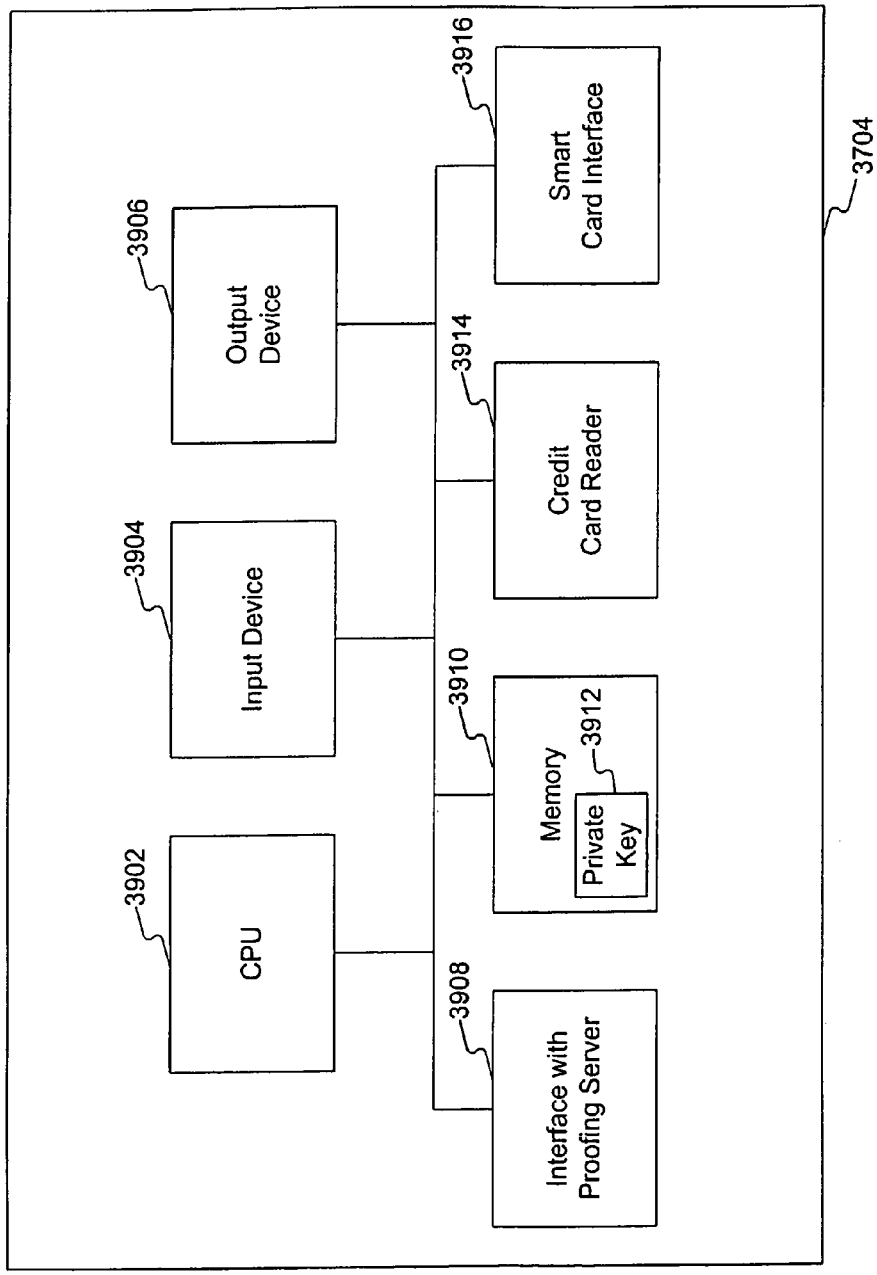
FIG. 39 is a block diagram of a proofing workstation consistent with the present invention.

FIG. 39 is a block diagram of a proofing workstation consistent with the present invention. Proofing workstation 3704 can be, for example, a computer or kiosk available in a public place, such as a Post Office. A third party wishing to proof a digital certificate can submit a request to proofing workstation 3704, perhaps accompanied by a fee paid by credit card or smart card. Proofing workstation 3704 communicates with proofing server 3702 to proof the digital certificate and return a validation to the third party. Proofing workstation 3704 includes a central processing unit (CPU) 3902, an input device 3904 (e.g., a keyboard), an output device 3906 (e.g., a printer or monitor), an interface with proofing servers 3908, a memory 3910, a credit card reader 3914, and a smart card interface 3916. Memory 3910 includes a private key 3912. Private key 3912 is sent with proofing requests from proofing workstation 3704 to proofing server 3702 to provide security.

While digital certificates consistent with the present invention use in-person identity validation using identification documents, many different types of identity validation may be used consistent with the present invention. For example, biometric identification, such as fingerprinting or retinal scans, could be used.

Although the preferred embodiments of the present invention have been described in detail herein, it is to be understood that these descriptions are merely illustrative. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A method for establishing an electronic account over a network, using a computer system, comprising the steps of:
   receiving, by the computer system, a request from a user to initiate an electronic account over the network;
   matching, by the computer system, a physical address of the user from an address database, the physical address corresponding to a location where the user receives mail;
   linking, by the computer system, the electronic account to the physical address;
   receiving a message directed to the physical address of the user; and sending a copy of the message to the electronic account of the user based on the physical address of the user.

2. The method of claim 1, wherein the matching step occurs by matching a physical address from a United States Postal Service address database.

3. The method of claim 1, wherein the location is a geographic location.

4. A method for establishing electronic mail services over a network using an electronic account, using a computer system, comprising the steps of:
   receiving, by the computer system, a request for electronic mail services from a user, the request including a physical address of the user;
   generating, by the computer system, an electronic address for the user, wherein the user can receive electronic mail at the electronic address;
   initiating, by the computer system, an electronic account over the network for the user, wherein the electronic account has a unique electronic customer account number corresponding to the user;
   linking, by the computer system, the physical address and the electronic address using the electronic account;
   receiving a message directed to the physical address of the user; and
   sending a copy of the message to the electronic address of the user based on the physical address of the user.

5. The method of claim 4, wherein the electronic address is a United States Postal Service electronic e-mail address.

6. The method of claim 4, wherein the electronic address is a United States Postal Service user-chosen e-mail address.

7. The method of claim 4, wherein the request further includes a preferred electronic address.

8. A method for processing electronic mail services over a network using an electronic account, using a computer system, comprising the steps of:
   linking, by the computer system, the electronic account to a physical address of a user;
   linking, by the computer system, the electronic account to an electronic address of the user;
   receiving, by the computer system, a request from a service provider to access the electronic account over the network;
   receiving, from the service provider, a message directed to the physical address of the user; and
   sending a copy of the message to the electronic address of the user based on the physical address of the user.

9. The method of claim 8, further comprising the steps of:
   presenting, by the computer system, an identifier of the service provider to the user, the identifier including at least one service delivery option;
   receiving, by the computer system, a request for a service from the user, the request including a preferred service delivery option; and
   providing, by the computer system, the service to the user via the preferred service delivery option.

10. The method of claim 9, wherein the preferred service delivery option is delivery to the physical address.

11. The method of claim 9, wherein the preferred service delivery option is delivery to the electronic address.

12. A method for delivering mail, using a computer system, comprising the steps of:
   receiving, by the computer system, mail for delivery to a customer with an electronic account, where the electronic account has both an electronic address for the customer and a physical address for the customer, both the electronic address and the physical address being linked by the electronic account;
   querying for the electronic address of the customer in a database based on the physical address of the customer; and
   delivering a copy of the mail to the electronic address of the customer.

13. The method of claim 12, wherein the mail is received in physical format by the United States Postal Service.

14. The method of claim 12, wherein the mail is received electronically by the United States Postal Service.

15. The method of claim 12, further comprising:
receiving a message directed to the electronic address of the customer; querying for the physical address of the customer in the database based on the electronic address of the customer; and
sending a copy of the message to the physical address of the customer.

16. A system for establishing an electronic account over a network, comprising:
a receiving component configured to receive a request from a user to initiate an electronic account over the network;
a matching component configured to match a physical address of the user from an address database, the physical address corresponding to a location where the user receives mail;
a linking component configured to link the electronic account to the physical address; and
a delivery component configured to receive a message directed to the physical address of the user and send a copy of the message to the electronic account of the user based on the physical address of the user.

17. The system of claim 16, wherein the matching component matches a physical address from a United States Postal Service address database.

18. The system of claim 16, wherein the location is a geographic location.

19. A system for establishing electronic mail services over a network using an electronic account, comprising:
a receiving component configured to receive a request for electronic mail services from a user, the request including a physical address of the user;
a generating component configured to generate an electronic address for the user, wherein the user can receive electronic mail at the electronic address;
an initiating component configured to initiate an electronic account over the network for the user, wherein the electronic account has a unique electronic customer account number corresponding to the user;
a linking component configured to link the physical address and the electronic address using the electronic account; and
a delivery component configured to receive a message directed to the physical address of the user and send a copy of the message to the electronic address of the user based on the physical address of the user.

20. The system of claim 19, wherein the electronic address is a United States Postal Service electronic e-mail address.

21. The system of claim 19, wherein the electronic address is a United States Postal Service user-chosen e-mail address.

22. The system of claim 19, wherein the request further includes a preferred electronic address.

23. A system for processing electronic mail services over a network using an electronic account, comprising:
a physical linking component configured to link the electronic account to a physical address of a user;
an electronic linking component configured to link the electronic account to an electronic address of the user;
a service request receiving component configured to receive a request from a service provider to send a message directed to the physical address of the user access the electronic account over the network; and
a delivery component configured to send a copy of the message to the electronic address of the user via the electronic account based on the physical address of the user.

24. The system of claim 23, further comprising:
a presenting component configured to present an identifier of the service provider to the user, the identifier including at least one service delivery option;
a preferred delivery request receiving component configured to receive a request for a service from the user, the request including a preferred service delivery option; and
a providing component configured to provide the service to the user via the preferred service delivery option.

25. The system of claim 24, wherein the preferred service delivery option is delivery to the physical address.

26. The system of claim 24, wherein the preferred service delivery option is delivery to the electronic address.

27. A system for delivering mail, comprising:
a database configured to store an electronic account of a customer, the electronic account including an electronic address for the customer and a physical address for the customer, the electronic address and the physical address being linked by the electronic account;
a receiving component configured to receive mail for delivery to the physical address of the customer a query component configured to query for the electronic address of the customer in the database based on the physical address of the customer; and a delivering component configured to deliver a copy of the mail to the electronic address of the customer.

28. The system of claim 27, wherein the mail is received in physical format by the United States Postal Service.

29. The system of claim 27, wherein the mail is received electronically by the United States Postal Service.

30. The system of claim 27, wherein the receiving component is further configured to receive a message directed to the electronic address of the customer;
the query component is further configured to query for the physical address of the customer in the database based on the electronic address of the customer; and the delivery component is further configured to send a copy of the message to the physical address of the customer.

31. A non-transitory computer usable medium having computer readable code embodied therein for establishing an electronic account over a network, the computer readable code comprising:
a receiving module configured to receive a request from a user to initiate an electronic account over the network;
a matching module configured to match a physical address of the user from an address database, the physical address corresponding to a location where the user receives mail;
a linking module configured to link the electronic account to the physical address; and
a delivery module configured to receive a message directed to the physical address of the user and send a copy of the message to the electronic account of the user based on the physical address of the user.

32. A non-transitory computer usable medium having computer readable code embodied therein for establishing electronic mail services over a network using an electronic account, the computer readable code comprising:
a receiving module configured to receive a request for electronic mail services from a user, the request including a physical address of the user;
a generating module configured to generate an electronic address for the user, wherein the user can receive electronic mail at the electronic address;
an initiating module configured to initiate an electronic account over the network for the user, wherein the electronic account has a unique electronic customer account number corresponding to the user;
a linking module configured to link the physical address and the electronic address using the electronic account;
a message receiving module configured to receive a message directed to the physical address of the user; and
a message sending module configured to send a copy of the message to the electronic address of the user based on the physical address of the user.

33. A non-transitory computer usable medium having computer readable code embodied therein for processing electronic mail services over, a network using an electronic account, the computer readable code comprising:
a physical linking module configured to link the electronic account to a physical address of a user;
an electronic linking module configured to link the electronic account to an electronic address of the user;
a service request receiving module configured to receive a request from a service provider to access the electronic account over the network;
a message receiving module configured to receive, from the service provider, a message directed to the physical address of the user; and
a message sending module configured to send a copy of the message to the electronic address of the user based on the physical address of the user.

34. A non-transitory computer usable medium having computer readable code embodied therein for delivering mail, the computer readable code comprising:
a database module configured to store an electronic account of a customer in a database, the electronic account including an electronic address for the customer and a physical address for the customer, the electronic address and the physical address being linked by the electronic account;
a receiving module configured to receive mail for delivery to the physical address of the customer;
a query module configured to query for the electronic address of the customer in the database based on the physical address of the customer; and
a delivering module configured to deliver a copy of the mail to the electronic address of the customer.

35. A system for establishing an electronic account over a network, comprising:
means for receiving a request from a user to initiate an electronic account over the network;
means for matching a physical address of the user from an address database, the physical address corresponding to a location where the user receives mail;
means for linking the electronic account to the physical address;
means for receiving a message directed to the physical address of the user; and
means for sending a copy of the message to the electronic account of the user based on the physical address of the user.

36. A system for establishing electronic mail services over a network using an electronic account, comprising:
means for receiving a request for electronic mail services from a user, the request including a physical address of the user;
means for generating an electronic address for the user, wherein the user can receive electronic mail at the electronic address;
means for initiating an electronic account over the network for the user,
wherein the electronic account has a unique electronic customer account number corresponding to the user;
means for linking the physical address and the electronic address using the electronic account;
means for receiving a message directed to the physical address of the user; and
means for sending a copy of the message to the electronic address of the user based on the physical address of the user.

37. A system for processing electronic mail services over a network using an electronic account, comprising:
means for linking the electronic account to a physical address of a user;
means for linking the electronic account to an electronic address of the user;
means for receiving a request from a service provider to access the electronic account over the network;
means for receiving, from the service provider, a message directed to the physical address of the user; and
means for sending a copy of the message to the electronic address of the user based on the physical address of the user.

38. A system for delivering mail, comprising:
means for storing an electronic account of a customer in a database, the electronic account including an electronic address for the customer and a physical address for the customer, the electronic address and the physical address being linked by the electronic account;
means for receiving mail for delivery to a physical address of the means for querying for the electronic address of the customer in the database based on the physical address of the customer; and
means for delivering a copy of the mail to the electronic address of the customer.

39. The method of claim 1, wherein the message is received from one of: a mailing online service, a NetPost.Certified service, a shipping online service, a stamps online service, and a PC Postage service.

40. The method of claim 1, wherein the message is received from a secure service provided by one of: an online merchant, a government agency, and a bank.

41. The method of claim 1, wherein the message is received from a non-secure service provided by one of: an online merchant, a government agency, and a bank.

42. The method of claim 4, wherein the message is received from one of: a mailing online service, a NetPost.Certified service, a shipping online service, a stamps online service, and a PC Postage service.

43. The method of claim 4, wherein the message is received from a secure service provided by one of: an online merchant, a government agency, and a bank.

44. The method of claim 4, wherein the message is received from a non-secure service provided by one of: an online merchant, a government agency, and a bank.

45. The method of claim 9, wherein the service includes one of:
a mailing online service, a NetPost.Certified service, a shipping online service, a stamps online service, and a PC Postage service.

46. The method of claim 8, wherein the service provider provides electronic service is a secure service and includes provided by one of:
an online merchant, a government agency, and a bank.

47. The method of claim 8, wherein the service provider provides a non-secure service and includes one of: an online merchant, a government agency, and a bank.

48. The method of claim 12, wherein the mail is generated by one of: a mailing online service, a NetPost.Certified service, a shipping online service, a stamps online service, and a PC Postage service.

49. The method of claim 12, wherein the mail is generated by a secure service provided by one of: an online merchant, a government agency, and a bank.

50. The method of claim 12, wherein the mail is generated by a non-secure service provided by one of: an online merchant, a government agency, and a bank.

51. The method of claim 1, further comprising:
   establishing, by the computer system, an e-mail address for the electronic account; and
   allowing, by the computer system, the user to access the e-mail address and an electronic service using the electronic account.

52. The method of claim 4, further comprising: allowing, by the computer system, the user to access the electronic address and an electronic service using the electronic account.

53. The method of claim 12, further comprising: allowing, by the computer system, the user to access the electronic address and an electronic service using the electronic account.

54. The system of claim 16, further comprising:
   an establishing component configured to establish an e-mail address for the electronic account; and
   an accessing component configured to allow the user to access the e-mail address and an electronic service using the electronic account.

55. The system of claim 19, further comprising: an accessing component configured to allow the user to access the electronic address and an electronic service using the electronic account.

56. The system of claim 27, further comprising: an accessing component configured to allow the user to access the electronic address and an electronic service using the electronic account.

57. The non-transitory computer usable medium of claim 32, wherein the computer readable code further comprising:
   an accessing module configured to allow the user to access the electronic address and an electronic service using the electronic account.

58. The non-transitory computer usable medium of claim 34, wherein the computer readable code further comprising:
   an accessing module configured to allow the user to access the electronic e-mail address and an electronic service using the electronic account.

* * * * *

UNITED STATES PATENT AND TRADEMARK OFFICE
CERTIFICATE OF CORRECTION

PATENT NO.        : 8,429,234 B2
APPLICATION NO.   : 12/155912
DATED             : April 23, 2013
INVENTOR(S)       : Leo J. Campbell et al.

Page 1 of 1

It is certified that error appears in the above-identified patent and that said Letters Patent is hereby corrected as shown below:

In the Claims:

Claim 23, Column 23, lines 62-63, "the user access the electronic account over the network; and" should read as --the user; and--.

Claim 27, Column 24, line 22, "the customer a query" should read as --the customer; a query--.

Claim 38, Column 26, line 31, "of the means" should read as --of the customer; means--.

Claim 46, Column 26, line 62, "provides electronic service is a" should read as --provides a--.

Claim 58, Column 28, line 22, "the electronic e-mail address" should read as --the electronic address--.

Signed and Sealed this
Twenty-eighth Day of May, 2013

Teresa Stanek Rea
*Acting Director of the United States Patent and Trademark Office*